(12) United States Patent
Yuasa et al.

(10) Patent No.: US 7,405,264 B2
(45) Date of Patent: Jul. 29, 2008

(54) POLYCARBOXYLIC ACID COPOLYMER, PRODUCTION METHOD AND USE THEREOF

(75) Inventors: Tsutomu Yuasa, Osaka (JP); Tomotaka Nishikawa, Osaka (JP); Noboru Sakamoto, Osaka (JP); Tsuyoshi Hirata, Osaka (JP); Hiroko Izukashi, Osaka (JP); Tomiyasu Ueta, Osaka (JP); Hiromichi Tanaka, Osaka (JP); Yoshiyuki Onda, Tokyo (JP); Toru Uno, Yokohama (JP)

(73) Assignee: Nippon Shokubai Co., Ltd., Osaka-shi (JP)

( * ) Notice: Subject to any disclaimer, the term of this patent is extended or adjusted under 35 U.S.C. 154(b) by 273 days.

(21) Appl. No.: 10/921,148

(22) Filed: Aug. 19, 2004

(65) Prior Publication Data

US 2005/0131110 A1    Jun. 16, 2005

Related U.S. Application Data

(62) Division of application No. 10/025,588, filed on Dec. 26, 2001, now Pat. No. 6,864,337.

(30) Foreign Application Priority Data

Dec. 27, 2000  (JP) .............................. 2000-399466
Aug. 17, 2001  (JP) .............................. 2001-248276

(51) Int. Cl.
*C08F 16/12* (2006.01)
*C08F 20/06* (2006.01)

(52) U.S. Cl. ..................... 526/333; 526/224; 526/317.1; 526/319; 526/320; 526/328.5; 526/329.6; 526/332

(58) Field of Classification Search .............. 526/317.1, 526/319, 320, 328.5, 329.6, 332, 224
See application file for complete search history.

(56) References Cited

U.S. PATENT DOCUMENTS

| | | | |
|---|---|---|---|
| 4,471,100 A | 9/1984 | Tsubakimoto et al. | |
| 4,650,522 A | 3/1987 | Teraji et al. | |
| 4,910,268 A | 3/1990 | Kobayashi | |
| 5,034,444 A | 7/1991 | Yun et al. | |
| 5,162,475 A | * 11/1992 | Tang et al. .................. | 526/333 |
| 5,712,339 A | * 1/1998 | Guerin et al. ............... | 524/515 |
| 5,911,820 A | 6/1999 | Satoh et al. | |
| 6,114,464 A | 9/2000 | Reck et al. | |
| 6,756,471 B1 | 6/2004 | Kroner et al. | |

FOREIGN PATENT DOCUMENTS

| | | |
|---|---|---|
| CN | 1137283 A | 12/1996 |
| EP | 0 174 644 | 3/1986 |
| EP | 1 184 353 A1 | 3/2002 |
| JP | 2000603 A | 1/1990 |
| JP | 07-010943 | 1/1995 |
| JP | 7090034 A | 4/1995 |
| JP | 7-215746 | 8/1995 |
| JP | 07-247150 | 9/1995 |
| JP | 11-269239 | 10/1999 |
| JP | 2000-063164 | 2/2000 |
| JP | 2000-159555 | 6/2000 |
| JP | 2000-191356 | 7/2000 |
| JP | 2000-247706 | 9/2000 |
| JP | 2000-319054 | 11/2000 |
| JP | 2001-146447 | 5/2001 |
| JP | 2001-146449 | 5/2001 |
| JP | 2001-220440 | 8/2001 |
| WO | WO-95/16643 | 6/1995 |
| WO | WO-97 39037 | 10/1997 |
| WO | WO-01 40338 | 6/2001 |

OTHER PUBLICATIONS

International Search Report dated Apr. 17, 2002, Int'l Appl. No. PCt/JP01/11437, 2 pages.

* cited by examiner

*Primary Examiner*—Helen L Pezzuto
(74) *Attorney, Agent, or Firm*—Connolly Bove Lodge & Hutz, LLP

(57) ABSTRACT

It is an object of the present invention to provide a polycarboxylic acid polpolymer which improves the water reducing capacity and workability of cement compositions and the like and making them easier to handle when the fluidity and water reducing capacity are at the same levels, a method of producing the copolymer, and a cement additive and a cement composition comprising the copolymer. The present invention is further to provide a polycarboxylic acid copolymer and a cement additive which are capable of improving the strength and durability of hardening products of cement compositions, hence can advantageously be used in ultrahigh strength concrete. The present invention is polycarboxylic acid copolymers having high water reducing capacity, reducing the viscosity of cement compositions and improving the workability in applying cement.

The present invention is directed to a polycarboxylic acid copolymer which is obtained by copolymerization of monomer components comprising a polyalkyleneimine unsaturated monomer (A1) and an unsaturated carboxylic acid monomer (B).

12 Claims, 16 Drawing Sheets

Shaft side    Section of    Peripheral
              blade         side

POLYCARBOXYLIC ACID COPOLYMER, PRODUCTION METHOD AND USE THEREOF

This application is a division of U.S. patent application Ser. No. 10/025,588 filed Dec. 26, 2001 now U.S. Pat. No. 6,864,337.

TECHNICAL FIELD

The present invention relates to a polycarboxylic acid copolymer, a method of producing polycarboxylic acid copolymers, a cement additive and a cement composition. More particularly, it relates to a polycarboxylic acid copolymer which can advantageously be used as a water reducing agent for ultrahigh strength concrete, a method of producing polycarboxylic acid copolymers, a cement additive comprising a polycarboxylic acid copolymer, and a cement composition.

BACKGROUND ART

Polycarboxylic acid copolymers have been used as components of cement additives for cement compositions such as cement paste, mortar, and concrete. They are now essential in constructing civil engineering and building structures and the like from cement compositions. Cement additives comprising such polycarboxylic acid copolymers are used as water reducing agents; they increase the fluidity of cement compositions to thereby reduce the water requirement of the cement compositions and therefore are effective in improving the strength, durability, and the like, of hardening products. Such water reducing agents are superior in water reducing capacity to naphthalene-based and other conventional water reducing agents and thus have already led to good results in many cases as air-entraining and high-range water-reducing admixture.

Meanwhile, foundations and like parts of civil engineering and building structures are required to have high strength or durability and, therefore, the so-called ultrahigh strength concrete compositions having high performance characteristics among concrete species are used in constructing them. As water reducing agents for such ultrahigh strength concrete, use is made of water reducing agents for ultrahigh strength concrete, which are high in water reducing capacity, so that the amount of water in concrete can be reduced to a sufficient extent to attain high performance characteristics. Currently, copolymers of methacrylic acid and polyethylene oxide methacrylate, for instance, are in use as water reducing agents for ultrahigh strength concrete. However, when an ultrahigh strength concrete is produced using such a water reducing agent for ultrahigh strength concrete, the concrete shows a high viscosity. Therefore, water reducing agents for ultrahigh strength concrete which can improve the workability are demanded.

In the specification of Japanese Kokai Publication Hei-07-215746, there is disclosed the use, as water reducing agents, of copolymers of an alkenyl ether, which has oxyalkylene group containing 2 to 40 carbon atoms and its end essentially has an alkenyl group and a specific group containing 1 to 24 carbon atoms, and maleic anhydride. However, for their successful application as water reducing agents for ultrahigh strength concrete, in particular, there is room for contrivance concerning the copolymer structure and characteristics.

Japanese Kokai Publication 2000-191356 discloses that a cement dispersant whose main component is a water-soluble amphoteric copolymer obtained by copolymerization of a specific polyamine-derived monomer as compound A, a specific unsaturated carboxylic acid monomer as compound B and a specific polyalkylene glycol-derived monomer as compound C in the proportion compound A:compound B:compound C=10 to 40% by weight:10 to 40% by weight:50 to 80% by weight can be used as a dispersant for ultrahigh strength concrete and that it is excellent in field workability.

However, water-soluble amphoteric copolymers prepared in all Examples in this publication by copolymerizing compound A, compound B and compound C, when used in preparing high strength concrete, provide them with high viscosity, making the shovel work difficult; thus, they have a workability problem.

SUMMARY OF THE INVENTION

It is an object of the present invention, which has been made in view of the above-mentioned state of the art, to provide a polycarboxylic acid copolymer which improves the water reducing capacity and workability of cement compositions and the like and making them easier to handle when the fluidity and water reducing capacity are at the same levels, a method of producing the same, a cement additive, and a cement composition comprising the same. It is a further object to provide a polycarboxylic acid copolymer and a cement additive which are capable of improving the strength and durability of hardening products of cement compositions, hence can advantageously be used in ultrahigh strength concrete. A still further object is to provide a method of producing polycarboxylic acid copolymers having high water reducing capacity, reducing the viscosity of cement compositions and improving the workability in applying cement.

The present inventors made intensive investigations concerning polycarboxylic acid copolymers which can be used as water reducing agents for ultrahigh strength concrete and, as a result, they paid their attention to polycarboxylic acid copolymers obtained by copolymerization of monomer components comprising a polyalkyleneimine unsaturated monomer (A1) and an unsaturated carboxylic acid monomer (B) as essential components and got a notion that such copolymers are capable of providing cement compositions easier to handle when the fluidity and water reducing capacity are at the same levels, hence they are suited for use in ultrahigh strength concrete and the like. Further, they found that the polyalkyleneimine unsaturated monomer (A1) may have an oxyalkylene group and that polycarboxylic acid copolymers obtained by copolymerization of monomer components further comprising a polyalkylene glycol unsaturated monomer (A3) other than the above-mentioned monomer having an oxyalkylene group, as an essential component, can suitably be used in ultrahigh strength concrete and the like.

They also found that the same effects as mentioned above can also be accomplished with a monomer composition which comprises polycarboxylic acid copolymers obtained by copolymerization of monomer components comprising a polyalkylene glycol unsaturated monomer (A2) having a structure such that an oxyalkylene group is bound to a polyhydric alcohol residue and an unsaturated monocarboxylic acid monomer (B') or monomer components comprising a hydroxyl-terminated, polyalkylene glycol unsaturated monomer (A2') having a structure such that an oxyalkylene group is bound to a polyhydric alcohol residue and an unsaturated carboxylic acid monomer (B), and that polycarboxylic acid copolymers obtained by copolymerization of monomer components comprising, in addition to these monomers, a polyalkylene glycol unsaturated monomer (A3) other than the polyalkylene glycol unsaturated monomer (A2), as an essential component, are more suited for use in ultrahigh strength concrete and the like.

Furthermore, regarding the method of producing polycarboxylic acid copolymers which comprises copolymerizing a monomer mixture comprising a monomer (A) having an oxyalkylene group and an unsaturated carboxylic acid monomer (B), they found that when a hydrophobic group is introduced partly into the copolymers using a hydrophobic chain transfer agent, cement additives comprising the polycarboxylic acid copolymers obtained show high water reducing capacity, reduce the viscosity of cement compositions and improve the workability in the step of application of the cement compositions.

In addition, they found that cement compositions in which cement additives comprising those polycarboxylic acid copolymers or cement additives having a calcium transfer value of 10 to 900 mPa·s and/or a cement performance coefficient of 0.05 to 1.0 or cement additives which satisfy specific analytical values after adjusted its pH to 12 to 12.5 and then purified are easier to handle when the fluidity and water reducing capacity are the same levels. These findings have now led to completion of the present invention.

Therefore, the present invention is a polycarboxylic acid copolymer
which is obtained by copolymerization of monomer components comprising a polyalkyleneimine unsaturated monomer (A1) and an unsaturated carboxylic acid monomer (B).

The present invention is also a polycarboxylic acid copolymer
which is obtained by copolymerization of monomer components comprising a polyalkylene glycol unsaturated monomer (A2) having a structure such that an oxyalkylene group is bound to a polyhydric alcohol residue, and an unsaturated monocarboxylic acid monomer (B').

The present invention is also a polycarboxylic acid copolymer
which is obtained by copolymerization of monomer components comprising a hydroxyl-terminated, polyalkylene glycol unsaturated monomer (A2') having a structure such that an oxyalkylene group is bound to a polyhydric alcohol residue, and an unsaturated carboxylic acid monomer (B).

The present invention is also a method of producing a polycarboxylic acid copolymer
which comprises copolymerizing monomer components comprising a monomer (A) having an oxyalkylene group and an unsaturated carboxylic acid monomer (B) using a hydrophobic chain transfer agent.

The present invention is also a polycarboxylic acid copolymer
which is obtained by the above method of producing a polycarboxylic acid copolymer.

The present invention is also a cement additive
which comprises the above polycarboxylic acid copolymer.

Moreover, the present invention is a cement additive
which has a calcium transfer value of 10 to 900 mPa·s and/or a cement performance coefficient of 0.05 to 1.0.

The present invention is also a cement additive
which has, when purified following adjustment to pH 12 to 12.5, a nitrogen content of 0.1 to 20% by weight as determined by elemental analysis,
allows detection of morpholine, 4-(2-hydroxyethyl)morpholine and 1,4-dioxane upon pyrolysis GC-MASS,
shows a peak having no shoulder in GPC,
has a weight average molecular weight (Mw) of 5,000 to 300,000,
shows, in IR measurement, an absorption peak at 1640 to 1660 $cm^{-1}$ whose intensity is not more than 20% of the intensity of the absorption peak occurring at 1710 to 1630 $cm^{-1}$,
allows detection, in $^{13}$C-NMR, of signals at chemical shift positions of 60 to 61 ppm and 69 to 68 ppm,
has an NMR-PEG content of 10 to 99% by weight and has a TCAV of 3 to 900 mg KOH/g.

Finally, the present invention is also a cement composition which comprises at least water, cement and a cement additive,
the above cement additive being used as said cement additive.

DETAILED DISCLOSURE OF THE INVENTION

In the following, the present invention is described in detail.

The polycarboxylic acid copolymer of the invention has (1) the form obtained by copolymerization of monomer components comprising a polyalkyleneimine unsaturated monomer (A1) and an unsaturated carboxylic acid monomer (B), (2) the form obtained by copolymerization of monomer components comprising a polyalkylene glycol unsaturated monomer (A2) having a structure such that an oxyalkylene group is bound to a polyhydric alcohol residue (hereinafter referred to sometimes as "polyalkylene glycol unsaturated monomer (A2)" for short), and an unsaturated monocarboxylic acid monomer (B') or (3) the form obtained by copolymerization of monomer components comprising a hydroxyl-terminated, polyalkylene glycol unsaturated monomer (A2') having a structure such that an oxyalkylene group is bound to a polyhydric alcohol residue (hereinafter referred to sometimes as "polyalkylene glycol unsaturated monomer (A2')" for short), and an unsaturated carboxylic acid monomer (B). Such a polycarboxylic acid copolymer may be a product obtained by subjecting a monomer (A1) and a monomer (A2) or monomer (A2') combinedly to copolymerization. Thus, it may have the form obtained by copolymerization of monomer components comprising, as essential components, a polyalkyleneimine unsaturated monomer (A1) and/or a polyalkylene glycol unsaturated monomer (A2) or (A2'), and an unsaturated carboxylic acid monomer (B). These monomers each may comprise one single species or a combination of two or more species. In the present specification, the polyalkylene glycol unsaturated monomer (A2) includes the hydroxyl-terminated, polyalkylene glycol unsaturated monomer (A2'), and the unsaturated carboxylic acid monomer (B) includes the unsaturated monocarboxylic acid monomer (B'). The polyalkylene glycol unsaturated monomer (A2) means a polyalkylene glycol unsaturated monomer (A2) or a hydroxyl-terminated, polyalkylene glycol unsaturated monomer (A2') according to the above-mentioned form (1), (2) or (3), and the unsaturated carboxylic acid monomer (B) means an unsaturated carboxylic acid monomer (B) or an unsaturated monocarboxylic acid monomer (B') according to the above-mentioned form (1), (2) or (3).

In a preferred embodiment of the present invention, the above-mentioned polyalkyleneimine unsaturated monomer (A1) has an oxyalkylene group. In the polycarboxylic acid copolymer having the form (1), (2) or (3) mentioned above, the weight ratios of those monomers are such that the monomer (A1) and/or monomer (A2) accounts for 1 to 99% by weight and the monomer (B) for 99 to 1% by weight. When the weight ratios of these monomers are out of the above ranges, the functions of the repeating units formed by the respective monomers as mentioned later herein cannot be performed effectively, hence the effects of the present invention cannot be produced to a satisfactory extent. More preferably, the monomer (A1) and/or monomer (A2) accounts for 20 to 95% by weight, and the monomer (B) for 80 to 5% by weight. The above-mentioned weight ratios of monomers (A1) and/or (A2) and (B) are given in terms of percent by weight with the total weight of the monomers (A1) and/or (A2) and (B) being taken as 100% by weight.

In the practice of the invention, it is preferred that the above monomer components further comprise a polyalkylene glycol unsaturated monomer (A3) other than the above-mentioned monomer having an oxyalkylene group. The above monomer having an oxyalkylene group is the polyalkyleneimine unsaturated monomer (A1) having an oxyalkylene group in the form (1) or, in the form (2) or (3), it is the polyalkylene glycol unsaturated monomer (A2) having a structure such that an oxyalkylene group is bound to a polyhydric alcohol residue. When such polyalkylene glycol unsaturated monomer (A3) is involved, the effects of the present invention can be produced more effectively. In this case, the monomer (A1) and/or (A2) preferably accounts for 1 to 98% by weight, the monomer (B) for 1 to 98% by weight, and the monomer (A3) for 1 to 98% by weight. More preferably, the monomer (A1) and/or (A2) accounts for 1 to 80% by weight, the monomer (B) for 1 to 50% by weight, and the monomer (A3) for 30 to 98% by weight. Still more preferably, the monomer (A1) and/or (A2) accounts for 1 to 50% by weight, the monomer (B) for 1 to 40% by weight, and the monomer (A3) for 30 to 98% by weight. It is particularly preferred that the monomer (A1) and/or (A2) account for 1 to 35% by weight, the monomer (B) for 1 to 30% by weight, and the monomer (A3) for 25 to 98% by weight. Further particularly preferably, the monomer (A1) and/or (A2) accounts for 1 to 20% by weight, the monomer (B) for 1 to 30% by weight, and the monomer (A3) for 25 to 95% by weight. The above-mentioned weight ratios of monomers (A1) and/or (A2) or (A2'), (B) and (A3) are given in terms of percent by weight with the total weight of the monomers (A1) and/or (A2), (B) and (A3) being taken as 100% by weight. In the practice of the invention, another monomer(s) in addition to the above-mentioned monomers may also be used, as mentioned later herein. In cases where another monomer(s) is used, it is preferred that the monomers (A1) and/or (A2), (B) and (A3), in total, serve as main components in the monomer components.

With the polycarboxylic acid copolymer according to the present invention, it is presumable that the repeating units formed by the polyalkyleneimine unsaturated monomer (A1) and/or polyalkylene glycol unsaturated monomer (A2) perform the function thereof in improving the water reducing capacity and workability of cement compositions in cooperation with the function of the unsaturated carboxylic acid monomer (B) and/or polyalkylene glycol unsaturated monomer (A3), that the repeating units formed by the unsaturated carboxylic acid monomer (B) perform the function thereof in causing the polycarboxylic acid copolymer to be adsorbed on cement particles and that the repeating units formed by the polyalkylene glycol unsaturated monomer (A3) perform the function thereof in improving the dispersibility of a cement composition or the like owing to the hydrophilicity of the oxyalkylene group and the steric repulsion thereof. Further, the repeating units formed by the polyalkyleneimine unsaturated monomer (A1) have a number of nitrogen atoms in each molecule and the repeating units formed by the polyalkylene glycol unsaturated monomer (A2) have a number of oxygen atoms in each molecule, and these are monomer units each further has a branched structure; presumably the above-mentioned functions are effectively performed owing to these facts. When these functions are performed, the water reducing capacity and workability of cement compositions are improved and, when the fluidity and water reducing capacity are at the same levels, cement compositions easier to handle can be provided. In addition, the strength and durability of the hardening products thereof can be improved. Therefore, cement additives comprising the polycarboxylic acid copolymer of the present invention are suited for use as water reducing agents for ultrahigh strength concrete which can suitably be used not only in ordinary strength concrete and high strength concrete but also in ultrahigh strength concrete. The term "ultrahigh strength concrete" means the one generally so called in the field of cement compositions, namely that kind of concrete which, in strength of the hardening products thereof, is comparable to or higher than that of conventional concrete species even when the water/cement ratio is reduced as compared with conventional levels. For example, even when the water/cement ratio is not higher than 25% by weight, further not higher than 20% by weight, in particular not higher than 18% by weight, particularly not higher than 14% by weight, especially about 12% by weight, that kind of concrete shows that level of workability at which any trouble will not arise in ordinary use, and the hardening product shows a compressive strength of not lower than 60 N/mm$^2$, further not lower than 80 N/mm$^2$, further more not lower than 100 N/mm$^2$, in particular not lower than 120 N/mm$^2$, particularly not lower than 160 N/mm$^2$, especially not lower than 200 N/mm$^2$.

Now, the monomers constituting the monomer components to form the polycarboxylic acid copolymer of the present invention is described in the following.

The polyalkyleneimine unsaturated monomer (A1) in the present invention may be any polyalkyleneimine having a polymerizable unsaturated group and can be obtained, for example, by reacting a polyalkyleneimine with an unsaturated compound having a functional group capable of reacting with the amino or imino group of the above polyalkyleneimine. In the present invention, it is preferred that the polyalkyleneimine unsaturated monomer (A1) has an oxyalkylene group. Such a polyalkyleneimine unsaturated monomer (A1) may be any polyalkyleneimine having an unsaturated group and an oxyalkylene group and can be obtained, for example, by reacting a compound obtained by addition of an alkylene oxide to the nitrogen atom of an amino and/or imino group of a polyalkyleneimine with an unsaturated compound having a functional group capable of reacting with a hydroxyl, amino and/or imino group of the above compound. The nitrogen atom of the amino or imino group to which the alkylene oxide is to add is the one having an active hydrogen atom.

As for the method of introducing an unsaturated group into a compound obtained by addition of an alkylene oxide to a polyalkyleneimine for obtaining the above-mentioned polyalkyleneimine unsaturated monomer (A1) having an oxyalkylene group, the method comprising subjecting the hydroxyl group(s) of the compound obtained by addition of an alkylene oxide to a polyalkyleneimine and an unsaturated compound such as (meth)acrylic acid or alkyl(meth)acrylate to transesterification for unsaturated group introduction, the method comprising subjecting the amino group(s) of the compound obtained by addition of an alkylene oxide to a polyalkyleneimine and an unsaturated compound such as (meth)acrylic acid or an alkyl(meth)acrylate to amidation for unsaturated group introduction, and the method comprising reacting the hydroxyl group(s) of the compound obtained by addition of an alkylene oxide to polyalkyleneimine with an epoxy compound such as glycidyl(meth)acrylate or (meth) allyl glycidyl ether for unsaturated group introduction, are suitably used.

Suited for use as the above polyalkyleneimine are alkyleneimine homopolymers and copolymers obtained by polymerization, in the conventional manner, of one or two or more of alkyleneimines containing 2 to 8 carbon atoms, such as ethyleneimine, propyleneimine, 1,2-butyleneimine, 2,3-butyleneimine and 1,1-dimethylethyleneimine, etc. These may be used singly or two or more of them may be used in combination. Such a polyalkyleneimine forms the polyalkyleneimine chain of the polyalkyleneimine unsaturated monomer (A1), and the above polyalkyleneimine chain may have any of the straight chain structure, branched chain structure and three-dimensionally crosslinked structure. Furthermore, ethylenediamine, diethylenetriamine, triethylenetetramine, tetraethylenepentamine or the like may also be used. Such polyalkyleneimines generally have, in their structure, not only tertiary amino groups but also primary amino and secondary amino (imino) groups having an active hydrogen atom, respectively.

Suited for use as the above unsaturated compound are unsaturated carboxylic acids such as (meth)acrylic acid, maleic acid, fumaric acid and citraconic acid; unsaturated carboxylic acid anhydrides such as (meth)acrylic anhydride and maleic anhydride; unsaturated carboxylic acid halides such as (meth)acrylic chloride; unsaturated carboxylic acid esters such as alkyl(meth)acrylates which have an alkyl group containing 1 to 30 carbon atoms, maleic acid monoesters which have an alkyl group containing 1 to 30 carbon atoms and maleic acid diesters which have an alkyl group containing 1 to 30 carbon atoms; and epoxy compounds such as glycidyl (meth)acrylate and (meth)allyl glycidyl ether. These may be used singly or two or more of them may be used in combination.

Suited for use as the alkylene oxide which is to add to the above polyalkyleneimine are alkylene oxides containing 2 to 8 carbon atoms such as ethylene oxide, propylene oxide, butylene oxide, isobutylene oxide, 1-butene oxide, 2-butene oxide, trimethylethylene oxide, tetramethylene oxide, tetramethylethylene oxide, butadiene monoxide and octylene oxide and, further, aliphatic epoxides such as dipentaneethylene oxide and dihexaneethylene oxide; alicyclic epoxides such as trimethylene oxide, tetramethylene oxide, tetrahydrofuran, tetrahydropyran and octylene oxide; and aromatic epoxides such as styrene oxide, 1,1-diphenylethylene oxide and the like. These may be used singly or two or more of them may be used in combination.

Shown below, as an example of the reaction formula for obtaining the above-mentioned polyalkyleneimine unsaturated monomer (A1) having an oxyalkylene group, is the reaction formula according to which polyethyleneimine is synthesized from ethyleneimine using an initiator, a polyethyleneimine-ethylene oxide adduct is then produced by addition of ethylene oxide to an nitrogen atom bearing active hydrogen atom(s) of the polyethyleneimine and the transesterification reaction with methacrylic acid is carried out. There is also available the method which comprises synthesizing polyethyleneimine, then causing ethylene oxide to add to nitrogen atoms bearing active hydrogen atom(s) of the polyethyleneimine and then reacting the resulting polyethyleneimine-ethylene oxide adduct with glycidyl methacrylate.

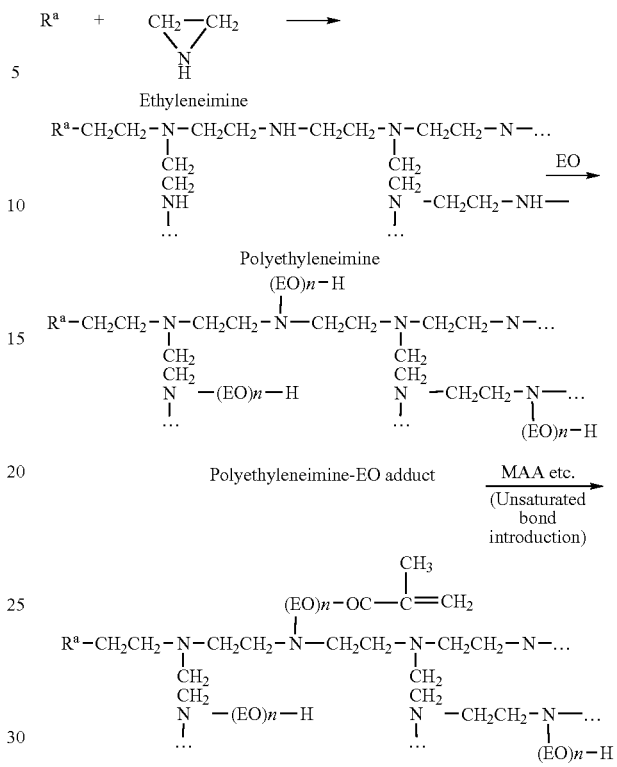

In the above reaction formula, $R^a$ represents an initiator, EO represents ethylene oxide, -(EO)n-H indicates that the group is a result of addition of n ethylene oxide molecules to the active hydrogen-bearing nitrogen atom of the polyethyleneimine, and MAA represents methacrylic acid. The symbol "..." in the chemical formula means that the polymer chain continues in the same manner.

The above-mentioned polyalkyleneimine unsaturated monomer (A1) or polyalkyleneimine unsaturated monomer (A1) having an oxyalkylene group has a polyalkyleneimine chain. Preferably, such polyalkyleneimine chain is mainly formed of ethyleneimine. In this case, "mainly" means that when the polyalkyleneimine chain is made of two or more alkyleneimines, the alkyleneimine in question accounts for a majority relative to the number of moles of all the alkyleneimines. In the present invention, when it is ethyleneimine that accounts for a majority of the polyalkyleneimine chain-forming alkyleneimines, the polycarboxylic acid copolymer is provided with improved hydrophilicity and thus can produce its functional effects satisfactorily, so that the use of ethyleneimine as a polyalkyleneimine chain-forming alkyleneimine in an extent sufficient to produce the above functional effects results in its accounting for "a majority" so referred to above, hence that chain is "mainly" formed thereof.

When ethyleneimine accounts for "a majority", in the above sense, of the above-mentioned polyalkyleneimine chain-forming alkyleneimines, the proportion thereof as expressed in terms of mole percent per 100 mole percent of all the alkyleneimines is preferably 50 to 100 mole percent. If it is less than 50 mole percent, the hydrophilicity of the polyalkyleneimine chain may possibly decrease. More preferably, it is not less than 60 mole percent, still more preferably not less than 70 mole percent, particularly preferably not less than 80 mole percent, most preferably not less than 90 mole percent.

As regards the above-mentioned polyalkyleneimine unsaturated monomer (A1) or polyalkyleneimine unsaturated monomer (A1) having an oxyalkylene group, the average number of polymerization of the alkyleneimine in each polyalkyleneimine chain is preferably not less than 2 but not more than 300. If it is less than 2, the functions of the polyalkyleneimine unsaturated monomer (A1) may not be fully performed and, if it exceeds 300, the polymerizability of the polyalkyleneimine unsaturated monomer (A1) may possibly decrease. In particular, it is preferably not less than 3 and, more preferably, it is not more than 200, still more preferably not more than 100, particularly preferably not more than 75, most preferably not more than 50. In this case, the average number of polymerization of diethylenetriamine is regarded as 2 and the average number of polymerization of triethylenetetramine is regarded as 3.

In the present invention, the polyalkylene glycol unsaturated monomer (A2) is an unsaturated monomer having a structure such that an oxyalkylene group is bound to a polyhydric alcohol residue. The polyalkylene glycol unsaturated monomer (A2') is a hydroxyl-terminated unsaturated monomer among the polyalkylene glycol unsaturated monomer (A2).

The polyhydric alcohol residue mentioned above means a group having a structure such that an active hydrogen atom(s) is(are) removed from a hydroxyl group(s) of a polyhydric alcohol but is not particularly limited to groups formed upon reaction with the polyhydric alcohol. As for the alkylene oxide(s) to be added to the hydroxyl group(s) of the polyhydric alcohol, the same ones as those mentioned hereinabove may be mentioned.

As the method of producing the above polyalkylene glycol unsaturated monomer (A2), there may be mentioned, for example, (1) the method comprising introducing an unsaturated group into a compound obtained by addition of an alkylene oxide to a polyhydric alcohol and (2) the method comprising subjecting each mole of an unsaturated alcohol or an unsaturated alcohol-polyalkylene glycol adduct and not less than 1 mole of glycidol to add to thereby generate not less than two hydroxyl groups in each molecule and then subjecting an alkylene oxide to add to the resulting product.

Suitable method of introducing an unsaturated group in the above method (1) are the method comprising subjecting the hydroxyl group(s) of the compound obtained by addition of an alkylene oxide to a polyhydric alcohol and an unsaturated compound such as (meth)acrylic acid or methyl(meth)acrylate or a like alkyl(meth)acrylate to esterification or transesterification for unsaturated group introduction, the method comprising reacting the hydroxyl group(s) of the compound obtained by addition of an alkylene oxide to a polyhydric alcohol with an epoxy compound containing 2 to 5 carbon atoms such as glycidyl(meth)acrylate or (meth)allyl glycidyl ether for unsaturated group introduction, and the method comprising etherification with a halogenated alkenyl compound containing 2 to 5 carbon atoms such as (meth)allyl chloride, for unsaturated group introduction. Suited for use as the unsaturated compound for unsaturated group introduction are unsaturated carboxylic acids such as (meth)acrylic acid, maleic acid, fumaric acid and citraconic acid; unsaturated carboxylic acid anhydrides such as (meth)acrylic anhydride and maleic anhydride; unsaturated carboxylic acid halides such as (meth)acrylic chloride; unsaturated carboxylic acid esters such as alkyl(meth)acrylates which have an alkyl group containing 1 to 30 carbon atoms, maleic acid monoesters which have an alkyl group containing 1 to 30 carbon atoms and maleic acid diesters which have an alkyl group containing 1 to 30 carbon atoms; and epoxy compounds such as glycidyl (meth)acrylate and (meth)allyl glycidyl ether. These may be used singly or two or more of them may be used in combination. In particular, an unsaturated group containing not less than 4 carbon atoms is preferred and an unsaturated group containing not less than 5 carbon atoms is more preferred as the unsaturated group of the alkenyl compound type. Methallyl and isoprenyl(3-methyl-3-butenyl) groups are preferred to an allyl group. Further, (meth)acryloyl group is also preferred.

The above polyhydric alcohol may be any compound having, on average, not less than three hydroxyl groups in each molecule, without any particular restriction. In a preferred embodiment, the compound of which polyhydric alcohol residue is constituted of three elements, namely carbon, hydrogen and oxygen.

The number of hydroxyl groups of the above polyhydric alcohol is preferably not less than 3 and preferably not more than 300. If it is less than 3, the function of the polyalkylene glycol unsaturated monomer (A2) may not be fully performed and, if it exceeds 300, the polymerizability of the polyalkylene glycol unsaturated monomer (A2) may possibly decrease. Preferably, it is not less than 4, more preferably not less than 5, particularly preferably not less than 6. It is preferably not more than 100, more preferably not more than 50, particularly preferably not more than 25.

Suited for use as the polyhydric alcohol are polyglycidol, glycerol, polyglycerol, trimethylolethane, trimethylolpropane, 1,3,5-pentanetriol, erythritol, pentaerythritol, dipentaerythritol, sorbitol, sorbitan, sorbitol-glycerol condensates, adonitol, arabitol, xylitol, mannitol and the like. Also suited for use are saccharides, for example hexose saccharides such as glucose, fructose, mannose, indose, sorbose, gulose, talose, tagatose, galactose, allose, psicose and altrose; pentose saccharides such as arabinose, ribulose, ribose, xylose, xylulose and lyxose; tetrose saccharides such as threose, erythrulose and erythrose; other saccharides such as rhamnose, cellobiose, maltose, isomaltose, trehalose, sucrose, raffinose, gentianose and melezitose; sugar alcohols and sugar acids derived from these (saccharide: glucose; sugar alcohol: glucitol; sugar acid: gluconic acid); and the like. Furthermore, partially etherified or partially esterified derivatives of the compounds specifically mentioned above are also suitable. These may be used singly or two or more of them may be used.

The polyhydric alcohol residue of the polyalkylene glycol unsaturated monomer (A2) is formed from such a compound. As the unsaturated compound, the same ones as those mentioned above can be used singly or two or more of them can be used.

In the method mentioned above under (2), vinyl alcohol, (meth)allyl alcohol, 3-buten-1-ol, isoprene alcohol (3-methyl-3-buten-1-ol), 3-methyl-2-buten-1, 2-methyl-3-buten-2-ol, 2-methyl-2-buten-1-ol, 2-methyl-3-buten-1-ol and the like are suited for use as the unsaturated alcohol. As the unsaturated alcohol-polyalkylene glycol adduct, compounds having a structure such that a polyalkylene glycol chain is added to such unsaturated alcohols can be used.

In the above-mentioned polyalkyleneimine unsaturated monomer (A1) or polyalkylene glycol unsaturated monomer (A2) each having an oxyalkylene group, there is a group formed by addition of one oxyalkylene group or a group formed by addition of two or more oxyalkylene groups. The group formed by addition of two or more oxyalkylene groups may be formed by one or two or more oxyalkylene group species and, when the group is formed by two or more oxyalkylene group species, two or more oxyalkylene group species may be in any addition mode, namely random addition, block addition, alternate addition and the like. In cases where a plurality of groups formed by the above oxyalkylene groups occur in each molecule, they may be the same or different. The group formed by addition of two or more oxyalkylene groups is referred to also as "polyalkylene glycol chain".

The group formed by the above-mentioned oxyalkylene group(s) is preferably a group mainly formed of an oxyethylene group(s). In this case, "mainly" means, in the same manner as mentioned hereinabove, that when two or more oxyalkylene group species occur in the monomer, the oxyethylene group accounts for a majority relative to the number of all the oxyalkylene groups occurring. By this, the hydrophilicity of the polycarboxylic acid copolymer is improved and the functional effects thereof can be fully produced.

When the oxyethylene group accounts for "a majority", in the above sense, of the above oxyalkylene groups, the proportion thereof as expressed in terms of mole percent per 100 mole percent of all the oxyalkylene groups is preferably 50 to 100 mole percent. If it is less than 50 mole percent, the hydrophilicity of the group formed by the oxyalkylene groups may possibly decrease. More preferably, it is not less than 60 mole percent, still more preferably not less than 70 mole percent, particularly preferably not less than 80 mole percent, most preferably not less than 90 mole percent.

As regards the above-mentioned polyalkyleneimine unsaturated monomer (A1) and polyalkylene glycol unsaturated monomer (A2) each having an oxyalkylene group, the average number of moles of the oxyalkylene group(s) added is preferably 0 to 300. If it exceeds 300, the polymerizability of these monomers may possibly decrease. More preferably, it is not less than 0.3, still more preferably not less than 0.5, particularly preferably not less than 1, most preferably not less than 2, but more preferably not more than 270, still more preferably not more than 250, particularly preferably not more than 220, most preferably not more than 200. If the average number of moles of oxyalkylene groups added in the polyalkyleneimine unsaturated monomer (A1) or polyalkylene glycol unsaturated monomer is outside such range, the polycarboxylic acid copolymer may possibly fail to fully produce its functional effects in improving the fluidity of cement compositions and the like. The above-mentioned average number of moles added means the average value for the number of moles of the oxyalkylene group(s) in question added in each mole of the group formed by the oxyalkylene group(s) of the polyalkyleneimine unsaturated monomer (A1) or polyalkylene glycol unsaturated monomer (A2), or the average value for the number of moles of the oxyalkylene group(s) in question added to each mole of the active hydrogen-bearing nitrogen atom of the polyalkyleneimine which is to form the polyalkyleneimine unsaturated monomer (A1) or the average value for the number of moles of the oxyalkylene group(s) in question added to each mole of the hydroxyl group of the polyhydric alcohol which is to form the polyalkylene glycol unsaturated monomer (A2). The polyalkyleneimine unsaturated monomer (A1) or polyalkylene glycol unsaturated monomer (A2) in which the above-mentioned average number of moles added is 0 has no oxyalkylene group.

Regarding the above polyalkylene glycol unsaturated monomer (A2), when the monomer components to be used in producing the polycarboxylic acid copolymer contain an unsaturated monocarboxylic acid monomer (B'), it is preferred that at least one of the termini of the oxyalkylene groups having a structure such that it binds to the polyhydric alcohol residue be a hydroxyl group. More preferably, all the oxyalkylene group termini are hydroxyl groups. When at least one of the termini of the oxyalkylene group is an alkyl group, the water reducing capacity of the cement additive comprising the polycarboxylic acid copolymer may possibly decrease. In the above-mentioned polyalkylene glycol unsaturated monomer (A2'), all the oxyalkylene group termini are hydroxyl groups.

The above-mentioned polyalkyleneimine unsaturated monomer (A1), or polyalkyleneimine unsaturated monomer (A1) or polyalkylene glycol unsaturated monomer (A2) each having an oxyalkylene group preferably has a weight average molecular weight of not lower than 500 but not higher than 500,000, more preferably not lower than 1,000, still more preferably not lower than 5,000, further more preferably not lower than 8,000, particularly preferably 10,000, but, more preferably not higher than 300,000, still more preferably not higher than 200,000, further more preferably not higher than 100,000, particularly preferably not higher than 80,000.

In the present invention, the unsaturated carboxylic acid monomer (B) may be any of those monomers which have a polymerizable unsaturated group and a group capable of forming a carbanion. Suited are, however, an unsaturated monocarboxylic acid monomer (B') and an unsaturated dicarboxylic acid monomer and the like.

The above unsaturated monocarboxylic acid monomer (B') may be a monomer having one unsaturated group and one group capable of forming an carbanion within the molecule. In a preferred embodiment, it is a compound represented by the following general formula (1):

In the above general formula (1), R represents a hydrogen atom or a methyl group, and M represents a hydrogen atom, a metal atom, an ammonium group or an organic amine group.

Suitable as the metal atom M in the above general formula (1) are univalent metal atoms, for example alkali metal atoms such as lithium, sodium and potassium; bivalent metal atoms, for example alkaline earth metal atoms such as calcium and magnesium; and trivalent metal atoms such as aluminum and iron. Suitable as the organic amine group are alkanolamine groups such as an ethanolamine group, diethanolamine group and triethanolamine group, and a triethylamine group. Further, it may be an ammonium group. Suitable as such unsaturated monocarboxylic acid monomer are acrylic acid, methacrylic acid, crotonic acid and the like; monovalent metal salts, divalent metal salts, ammonium salts and organic amine salts thereof, and so forth. Among these, methacrylic acid; monovalent metal salts, divalent metal salts, ammonium salts and organic amine salts thereof and the like are preferably used and suitable as the unsaturated carboxylic acid monomer (B) from the viewpoint of improved cement dispersing ability.

The above-mentioned unsaturated dicarboxylic acid monomer may be any of those monomers which have one unsaturated group and two groups capable of forming a carbanion within the molecule. Suitable are maleic acid, itaconic acid, citraconic acid, fumaric acid and the like, and monovalent metal salts, divalent metal salts, ammonium salts and organic amine salts thereof, or anhydrides thereof.

In addition to these, also suitable as the above unsaturated carboxylic acid monomer (B) are half esters of unsaturated dicarboxylic acid monomers with an alcohol containing 1 to 22 carbon atoms, half amides of unsaturated dicarboxylic acids with an amine containing 1 to 22 carbon atoms, half esters of unsaturated dicarboxylic acid monomers with a glycol containing 2 to 4 carbon atoms, and half amides of maleamic acid with glycols containing 2 to 4 carbon atoms, etc.

In the present invention, the polyalkylene glycol unsaturated monomer (A3) other than the above-mentioned monomers having an oxyalkylene group has a polymerizable unsaturated group and a polyalkylene glycol chain and, in the form obtained by copolymerization of monomer components comprising the polyalkyleneimine unsaturated monomer (A1) and unsaturated carboxylic acid monomer (B), it is a monomer different from the above-mentioned polyalkyleneimine unsaturated monomer (A1) having an oxyalkylene group and, in the form obtained by copolymerization of monomer components comprising the polyalkylene glycol unsaturated monomer (A2) having a structure such that an oxyalkylene group is bound to a polyhydric alcohol residue, and the unsaturated monocarboxylic acid monomer (B), it is a monomer different from the above-mentioned polyalkylene glycol monomer (A2) and, further, in the form obtained by copolymerization of monomer components comprising the hydroxyl-terminated, polyalkylene glycol unsaturated monomer (A2') having a structure such that an oxyalkylene group is bound to a polyhydric alcohol residue, and the unsaturated carboxylic acid monomer (B), it may be a monomer different from the above polyalkylene glycol monomer (A2), and suitable are a polyalkylene glycol ester monomer and an unsaturated alcohol-polyalkylene glycol adduct. The above polyalkylene glycol ester monomer may be a monomer having a structure such that the unsaturated group and polyalkylene glycol chain are bound together via an ester bond. Suitable are unsaturated polyalkylene glycol carboxylate compounds, in particular (alkoxy)polyalkylene glycol mono(meth)acrylates.

The above-mentioned unsaturated alcohol-polyalkylene glycol adduct may be a compound having a structure such that a polyalkylene glycol chain is added to an alcohol having an unsaturated group. Suitable are vinyl alcohol-alkylene oxide adducts, (meth)allyl alcohol-alkylene oxide adducts, 3-buten-1-ol-alkylene oxide adducts, isoprene alcohol (3-methyl-3-buten-1-ol)-alkylene oxide adducts, 3-methyl-2-buten-1-ol-alkylene oxide adducts, 2-methyl-3-buten-2-ol-alkylene oxide adducts, 2-methyl-2-buten-1-ol-alkylene oxide adducts, and 2-methyl-3-buten-1-ol-alkylene oxide adducts, and the like. Also preferred as such unsaturated alcohol-polyalkylene glycol adduct are compounds represented by the following general formula (2):

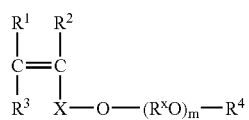
(2)

In the above general formula (2), $R^1$, $R^2$ and $R^3$ are the same or different and each represents a hydrogen atom or a methyl group. $R^4$ represents a hydrogen atom or a hydrocarbon group containing 1 to 20 carbon atoms. $R^x$ may be the same or different and each represents an alkylene group containing 2 to 18 carbon atoms, and m represents the average number of moles of the oxyalkylene group represented by $R^xO$ as added and is a number of 1 to 300. X represents a divalent alkylene group containing 1 to 5 carbon atoms or a vinyl group in which case the carbon atom and oxygen atom shown adjacently thereto are directly bound to each other.

In cases where two or more oxyalkylene group species represented by —($R^xO$)— in the above general formula (2) occur in one and the same unsaturated alcohol-polyalkylene glycol adduct, the oxyalkylene groups represented by —($R^xO$)— may be in any addition mode, namely random addition, block addition, alternate addition or the like.

The oxyalkylene group(s) represented —($R^xO$)— as mentioned above is an alkylene oxide adduct which consists of alkylene oxide groups containing 2 to 18 carbon atoms. Such alkylene oxide adduct has a structure formed by one or two or more of alkylene oxides such as ethylene oxide, propylene oxide, butylene oxide, isobutylene oxide, 1-butene oxide and 2-butene oxide. Among such alkylene oxide adducts, ethylene oxide, propylene oxide and butylene oxide adducts are preferred.

The average number m of moles of oxyalkylene groups represented by the above $R^xO$ as added is a number of 1 to 300. If m exceeds 300, the polymerizability of the monomer will decrease. A preferred range of m is not less than 2 and, in —($R^xO$)$_m$—, the average number of moles of the oxyalkylene group(s) added is preferably not less than 2. If m is less than 2 or the average number of moles of the oxyalkylene group(s) added is less than 2, sufficient levels of hydrophilicity and steric hindrance to disperse cement particles or the like may not be obtained, hence it may be impossible to obtain excellent fluidity. A preferred range of m is not less than 3 but not more than 280. More preferably, m is not less than 5, still more preferably not less than 10, particularly preferably not less than 20. On the other hand, m is more preferably not more than 250, particularly preferably not more than 150. As for the average number of moles of the oxyalkylene group(s) added, it is preferably not less than 3 but is preferably not more than 280. More preferably, it is not less than 10, still more preferably not less than 20. On the other hand, it is more preferably not more than 250, still more preferably not more than 200, particularly preferably not more than 150. The average number of moles added means the average value for the number of moles of the organic group(s) in question forming each mole of monomer by addition reaction. It is possible to use, as said monomer, a combination of two or more monomer species differing in the average number m of moles of the oxyalkylene group(s) added. As a suitable combination, there may be mentioned, for example, a combination of two monomer species (A3) differing in the average number m of moles added by not less than 10 (preferably a difference in m by not less than 20), or a combination of not less than three monomer species (A3) differing in m by not less than 10 (preferably a difference in m by not less than 20) from one another. Furthermore, as for the range of values of m for combined use, it is possible to combine a monomer (A3) having an average number m of moles added in the range of 40 to 300 with a monomer (A3) having the range of 1 to 40 (the difference in m being not less than 10, preferably not less than 20), or combine a monomer (A3) having an average number m of moles added in the range of 20 to 300 with a monomer species (A3) having the range of 1 to 20 (the difference in m being not less than 10, preferably not less than 20).

As for the above $R^4$, if the number of carbon atoms exceeds 20, the hydrophobicity of the polycarboxylic acid copolymer becomes excessively strong, so that no good dispersing capacity can be obtained. From the dispersing capacity viewpoint, a preferred embodiment of $R^4$ is a hydrocarbon group containing 1 to 20 carbon atoms or a hydrogen, more preferably a hydrocarbon group containing not more than 10 carbon atoms, still more preferably not more than 3 carbon atoms, particularly preferably not more than 2 carbon atoms. For attaining excellent segregation preventing capacity and rendering the amount of air entrained into cement compositions adequate, hydrocarbon groups containing not less than 5 carbon atoms are preferred, and hydrocarbon groups containing not more than 20 carbon atoms are preferred. More preferred are hydrocarbon groups containing 5 to 10 carbon atoms. Among the hydrocarbon groups, saturated alkyl groups and unsaturated alkyl groups are preferred. These alkyl groups may be straight chained or branched.

The above-mentioned unsaturated alcohol-polyalkylene glycol adduct may be the one as mentioned above. Suitable are polyethylene glycol monovinyl ether, polyethylene glycol monoallyl ether, polyethylene glycol mono(2-methyl-2-propenyl)ether, polyethylene glycol mono(2-butenyl)ether, polyethylene glycol mono(3-methyl-3-butenyl)ether, polyethylene glycol mono(3-methyl-2-butenyl)ether, polyethylene glycol mono(2-methyl-3-butenyl)ether, polyethylene glycol mono(2-methyl-2-butenyl)ether, polyethylene glycol mono(1,1-dimethyl-2-propenyl)ether, polyethylene-polypropylene glycol mono(3-methyl-3-butenyl)ether, methoxypolyethylene glycol mono(3-methyl-3-butenyl)ether, ethoxypolyethylene glycol mono(3-methyl-3-butenyl)ether, 1-propoxypolyethylene glycol mono(3-methyl-3-butenyl) ether, cyclohexyloxypolyethylene glycol mono(3-methyl-3-butenyl)ether, 1-octyloxypolyethylene glycol mono(3-methyl-3-butenyl)ether, nonylalkoxypolyethylene glycol mono(3-methyl-3-butenyl)ether, laurylalkoxypolyethylene glycol mono(3-methyl-3-butenyl)ether, stearylalkoxypolyethylene glycol mono(3-methyl-3-butenyl)ether, phenoxypolyethylene glycol mono(3-methyl-3-butenyl)ether, naphthoxypolyethylene glycol mono(3-methyl-3-butenyl)ether, methoxypolyethylene glycol monoallyl ether, ethoxypolyethylene glycol monoallyl ether, phenoxypolyethylene glycol monoallyl ether, methoxypolyethylene glycol mono(2-methyl-2-propenyl)ether, ethoxypolyethylene glycol mono(2-methyl-2-propenyl)ether, phenoxypolyethylene glycol mono(2-methyl-2-propenyl)ether and the like.

Preferred as the above-mentioned (alkoxy)polyalkylene glycol mono(meth)acrylate are compounds represented by the following general formula (3):

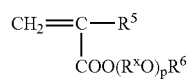

(2)

In the above general formula (3), $R^5$ represents a hydrogen atom or a methyl group, $R^x$ may be the same or different and each represents an alkylene group containing 2 to 18 carbon atoms, $R^6$ represents a hydrogen atom or a hydrocarbon group containing 1 to 30 carbon atoms, and p represents the average number of moles of the oxyalkylene group represented by $R^xO$ as added and is a number of 2 to 300.

As for the oxyalkylene group represented by $—(R^xO)—$ in the above general formula (3) and the average number p of moles of the oxyalkylene group represented by $R^xO$ as added, the same as mentioned above referring to the general formula (2) may be mentioned. From the viewpoint of esterification productivity improvement with (meth)acrylic acid, it is preferred that the ethylene oxide moiety be added to the site of the ester bond with (meth)acrylic acid.

The average number p of moles of oxyalkylene groups represented by the above $R^xO$ as added is a number of 2 to 300. If p exceeds 300, the polymerizability of the monomer will decrease. A preferred range of p is not less than 2 and, in $—(R^xO)_p—$, the average number of moles of the oxyalkylene group(s) added is preferably not less than 2. If p is less than 2 or the average number of moles of the oxyalkylene group(s) added is less than 2, sufficient levels of hydrophilicity and steric hindrance to disperse cement particles or the like may not be obtained, hence it may be impossible to obtain excellent fluidity. A preferred range of p is not less than 3 but not more than 280. More preferably, p is not less than 5, still more preferably not less than 10, particularly preferably not less than 20. On the other hand, p is more preferably not more than 250, still more preferably not more than 200, particularly preferably not more than 150. As for the average number of moles of the oxyalkylene group(s) added, it is preferably not less than 5 but is preferably not more than 250. More preferably, it is not less than 10, still more preferably not less than 20. On the other hand, it is not more than 150. The average number of moles added means the average value for the number of moles of the organic group(s) in question forming each mole of monomer by addition reaction. It is possible to use, as said monomer, a combination of two or more monomer species differing in the average number p of moles of the oxyalkylene group(s) added. As a suitable combination, there may be mentioned, for example, a combination of two monomer (A3) differing in p by not less than 10 (preferably a difference in p by not less than 20), or a combination of not less than three monomer species (A3) differing in the average number p of moles added by not less than 10 (preferably a difference in p by not less than 20) from one another. Furthermore, as for the range of values of p for combined use, it is possible to combine a monomer (A3) having an average number p of moles added in the range of 40 to 300 with a monomer (A3) having the range of 2 to 40 (the difference in p being not less than 10, preferably not less than 20), or combine a monomer species (A3) having an average number p of moles added in the range of 20 to 300 with a monomer species (A3) having the range of 2 to 20 (the difference in p being not less than 10, preferably not less than 20).

As for the above $R^6$, if the number of carbon atoms exceeds 30, the hydrophobicity of the polycarboxylic acid copolymer becomes excessively strong, so that no good dispersing capacity can be obtained. From the dispersing capacity viewpoint, a preferred embodiment of $R^6$ is a hydrocarbon group containing 1 to 20 carbon atoms or a hydrogen, more preferably a hydrocarbon group containing not more than 10 carbon atoms, still more preferably not more than 3 carbon atoms, particularly preferably not more than 2 carbon atoms. For attaining excellent segregation preventing capacity and rendering the amount of air entrained into cement compositions adequate, hydrocarbon groups containing not less than 5 carbon atoms are preferred, and hydrocarbon groups containing not more than 20 carbon atoms are preferred. More preferred are hydrocarbon groups containing 5 to 10 carbon atoms. Among the hydrocarbon groups, saturated alkyl groups and unsaturated alkyl groups are preferred. These alkyl groups may be straight chained or branched.

The above-mentioned (alkoxy)polyalkylene glycol mono(meth)acrylate may be the one mentioned above, but suitable are esterification products of (meth)acrylic acid with alkoxypolyalkylene glycols obtained by addition reaction of 1 to 300 moles of an alkylene oxide group(s) containing 2 to 18 carbon atoms to any of aliphatic alcohols containing 1 to 30 carbon atoms, such as methanol, ethanol, 1-propanol, 2-propanol, 1-butanol, 2-butanol, 1-pentanol, 2-pentanol, 3-pentanol, 1-hexanol, 2-hexanol, 3-hexanol, octanol, 2-ethyl-1-hexanol, nonyl alcohol, lauryl alcohol, cetyl alcohol and stearyl alcohol, alicyclic alcohols containing 3 to 30 carbon atoms, such as cyclohexanol, and unsaturated alcohols containing 3 to 30 carbon atoms, such as (meth)allyl alcohol, 3-buten-1-ol and 3-methyl-3-buten-1-ol.

Suitable as said esterification products are those (alkoxy)polyethylene glycol(poly)(alkylene glycol containing 2 to 4 carbon atoms) (meth)acrylates which are given below:

Methoxypolyethylene glycol mono(meth)acrylate, methoxy{polyethylene glycol-(poly)propylene glycol}mono(meth)acrylate, methoxy{polyethylene glycol-(poly)butylene glycol} mono(meth)acrylate, methoxy{polyethylene glycol-(poly)propylene glycol-(poly)butylene glycol} mono(meth)acrylate, ethoxypolyethylene glycol mono(meth)acrylate, ethoxy{polyethylene glycol-(poly)propylene glycol} mono(meth)acrylate, ethoxy{polyethylene glycol-(poly)butylene glycol} mono(meth)acrylate, ethoxy{polyethylene glycol-(poly)propylene glycol-(poly)butylene glycol} mono(meth)acrylate, propoxypolyethylene glycol mono(meth)acrylate, propoxy{polyethylene glycol-(poly)propylene glycol}mono(meth)acrylate, propoxy{polyethylene glycol-(poly)butylene glycol} mono(meth)acrylate, propoxy{polyethylene glycol-(poly)propylene glycol-(poly)butylene glycol} mono(meth)acrylate, butoxypolyethylene glycol mono(meth)acrylate, butoxy{polyethylene glycol-(poly)propylene glycol}mono(meth)acrylate, butoxy{polyethylene glycol-(poly)butylene glycol} mono(meth)acrylate, butoxy{polyethylene glycol-(poly)propylene glycol-(poly)butylene glycol} mono(meth)acrylate, pentoxypolyethylene glycol mono(meth)acrylate, pentoxy{polyethylene glycol-(poly)propylene glycol}mono(meth)acrylate, pentoxy{polyethylene glycol-(poly)butylene glycol} mono(meth)acrylate, pentoxy{polyethylene glycol-(poly)propylene glycol-(poly)butylene glycol} mono(meth)acrylate, hexoxypolyethylene glycol mono(meth)acrylate, hexoxy{polyethylene glycol-(poly)propylene glycol}mono(meth)acrylate, hexoxy{polyethylene glycol-(poly)butylene glycol} mono(meth)acrylate, hexoxy{polyethylene glycol-(poly)propylene glycol-(poly)butylene glycol} mono(meth)acrylate, heptoxypolyethylene glycol mono(meth)acrylate, heptoxy{polyethylene glycol-(poly)propylene glycol}mono(meth)acrylate, heptoxy{polyethylene glycol-(poly)butylene glycol} mono(meth)acrylate, heptoxy{polyethylene glycol-(poly)propylene glycol-(poly)butylene glycol} mono(meth)acrylate, octoxypolyethylene glycol mono(meth)acrylate, octoxy{polyethylene glycol-(poly)propylene glycol}mono(meth)acrylate, octoxy{polyethylene glycol-(poly)butylene glycol} mono(meth)acrylate, octoxy{polyethylene glycol-(poly)propylene glycol-(poly)butylene glycol} mono(meth)acrylate, nonanoxypolyethylene glycol mono(meth)acrylate, nonanoxy{polyethylene glycol-(poly)propylene glycol}mono(meth)acrylate, nonanoxy{polyethylene glycol-(poly)butylene glycol} mono(meth)acrylate, nonanoxy{polyethylene glycol-(poly)propylene glycol-(poly)butylene-glycol}mono(meth)acrylate, decanoxypolyethylene glycol mono(meth)acrylate, decanoxy{polyethylene glycol-(poly)propylene glycol}mono(meth)acrylate, decanoxy{polyethylene glycol-(poly)butylene glycol} mono(meth)acrylate, decanoxy{polyethylene glycol-(poly)propylene glycol-(poly)butylene glycol} mono(meth)acrylate, undecanoxypolyethylene glycol mono(meth)acrylate, undecanoxy{polyethylene glycol-(poly)propylene glycol}mono(meth)acrylate, undecanoxy{polyethylene glycol-(poly)butylene glycol} mono(meth)acrylate, undecanoxy{polyethylene glycol-(poly)propylene glycol-(poly)butylene glycol} mono(meth)acrylate, dodecanoxy-polyethylene glycol mono(meth)acrylate, dodecanoxy{polyethylene glycol-(poly)propylene glycol}mono(meth)acrylate, dodecanoxy{polyethylene glycol-(poly)butylene glycol} mono(meth)acrylate, dodecanoxy{polyethylene glycol-(poly)propylene glycol-(poly)butylene glycol} mono(meth)acrylate, tridecanoxypolyethylene glycol mono(meth)acrylate, tridecanoxy{polyethylene glycol-(poly)propylene glycol}mono(meth)acrylate, tridecanoxy{polyethylene glycol-(poly)butylene glycol} mono(meth)acrylate, tridecanoxy{polyethylene glycol-(poly)propylene glycol-(poly)butylene glycol} mono(meth)acrylate, tetradecanoxypolyethylene glycol mono(meth)acrylate, tetradecanoxy{polyethylene glycol-(poly)propylene glycol}mono(meth)acrylate, tetradecanoxy{polyethylene glycol-(poly)butylene glycol} mono(meth)acrylate, tetradecanoxy{polyethylene glycol-(poly)propylene glycol-(poly)butylene glycol} mono(meth)acrylate, pentadecanoxypolyethylene glycol mono(meth)acrylate, pentadecanoxy{polyethylene glycol-(poly)propylene glycol}mono(meth)acrylate, pentadecanoxy{polyethylene glycol-(poly)butylene glycol} mono(meth)acrylate, pentadecanoxy{polyethylene glycol-(poly)propylene glycol-(poly)butylene glycol} mono(meth)acrylate, hexadecanoxypolyethylene glycol mono(meth)acrylate, hexadecanoxy{polyethylene glycol-(poly)propylene glycol}mono(meth)acrylate, hexadecanoxy{polyethylene glycol-(poly)butylene glycol} mono(meth)acrylate, hexadecanoxy{polyethylene glycol-(poly)propylene glycol-(poly)butylene glycol} mono(meth)acrylate, heptadecanoxypolyethylene glycol mono(meth)acrylate, heptadecanoxy{polyethylene glycol-(poly)propylene glycol}mono(meth)acrylate, heptadecanoxy{polyethylene glycol-(poly)butylene glycol} mono(meth)acrylate, heptadecanoxy{polyethylene glycol-(poly)propylene glycol-(poly)butylene glycol} mono(meth)acrylate, octadecanoxypolyethylene glycol mono(meth)acrylate, octadecanoxy{polyethylene glycol-(poly)propylene glycol}mono(meth)acrylate, octadecanoxy{polyethylene glycol-(poly)butylene glycol} mono(meth)acrylate, octadecanoxy{polyethylene glycol-(poly)propylene glycol-(poly)butylene glycol} mono(meth)acrylate, nonadecanoxypolyethylene glycol mono(meth)acrylate, nonadecanoxy{polyethylene glycol-(poly)propylene glycol}mono(meth)acrylate, nonadecanoxy{polyethylene glycol-(poly)butylene glycol} mono(meth)acrylate, nonadecanoxy{polyethylene glycol-(poly)propylene glycol-(poly)butylene glycol} mono(meth)acrylate, cyclopentoxypolyethylene glycol mono(meth)acrylate, cyclopentoxy{polyethylene glycol-(poly)propylene glycol}mono(meth)acrylate, cyclopentoxy{polyethylene glycol-(poly)butylene glycol} mono(meth)acrylate, cyclopentoxy{polyethylene glycol-(poly)propylene glycol-(poly)butylene glycol} mono(meth)acrylate, cyclohexoxypolyethylene glycol mono(meth)acrylate, cyclohexoxy{polyethylene glycol-(poly)propylene glycol}mono(meth)acrylate, cyclohexoxy{polyethylene glycol-(poly)butylene glycol} mono(meth)acrylate, cyclohexoxy{polyethylene glycol-(poly)propylene glycol-(poly)butylene glycol} mono(meth)acrylate.

As the above-mentioned (alkoxy)polyalkylene glycol mono(meth)acrylate, not only compounds represented by the above general formula (2), but also phenoxypolyethylene glycol mono(meth)acrylate, phenoxy{polyethylene glycol-(poly)propylene glycol} mono(meth)acrylate, phenoxy{polyethylene glycol-(poly)butylene glycol}mono(meth)acrylate, phenoxy{polyethylene glycol-(poly)propylene glycol-(poly)butylene glycol}mono(meth)acrylate, (meth)allyloxypolyethylene glycol mono(meth)acrylate, (meth)allyloxy{polyethylene glycol-(poly)propylene glycol} mono(meth)acrylate, (meth)allyloxy{polyethylene glycol-(poly)butylene glycol}mono(meth)acrylate and (meth) allyloxy{polyethylene glycol-(poly)propylene glycol-(poly) butylene glycol}mono(meth)acrylate are suitable.

Suitable as the above polyalkylene glycol ester monomer are not only the (alkoxy)polyalkylene glycol mono(meth) acrylate but also (alkoxy)polyalkylene glycol monomaleate, (alkoxy)polyalkylene glycol dimaleate and the like. As such monomers, the following ones are suitable.

Half esters and diesters derived from alkylpolyalkylene glycols obtained by addition of 1 to 300 moles of an oxyalkylene containing 2 to 4 carbon atoms to an alcohol containing 1 to 22 carbon atoms or an amine containing 1 to 22 carbon atoms and the above-mentioned unsaturated dicarboxylic acid monomers; half esters and diesters derived from the above-mentioned unsaturated dicarboxylic acid monomers and polyalkylene glycols having an average number of moles of a glycol(s) containing 2 to 4 carbon atoms as added of 2 to 300; (poly)alkylene glycol di(meth)acrylates such as triethylene glycol di(meth)acrylate, (poly)ethylene glycol di(meth)acrylate, polypropylene glycol di(meth)acrylate, and (poly)ethylene glycol-(poly)propylene glycol di(meth) acrylate; (poly)alkylene glycol dimaleates such as triethylene glycol dimaleate and polyethylene glycol dimaleate; and the like.

The monomer components for forming the polycarboxylic acid copolymer of the present invention may further contain, where necessary, another monomer(s) (C) in addition to the above-mentioned monomers (A1), (A2), (B) and (A3). Suitable as another monomer(s) (C) are the following. These may be used singly or two or more of them may be used in combination.

Styrenes such as styrene, bromostyrene, chlorostyrene and methylstyrene; dienes such as 1,3-butadiene, isoprene and isobutylene; (meth)acrylic acid esters such as methyl(meth) acrylate, ethyl(meth)acrylate, butyl(meth)acrylate, pentyl (meth)acrylate, hexyl(meth)acrylate, decyl(meth)acrylate and lauryl(meth)acrylate; α-olefins such as hexene, heptene and decene; alkyl vinyl ethers such as methyl vinyl ether, ethyl vinyl ether and butyl vinyl ether; vinyl esters such as vinyl acetate; and allyl esters such as allyl acetate;

diesters derived from the above unsaturated dicarboxylic acid monomers and alcohols containing 1 to 22 carbon atoms, diamides derived from the above unsaturated dicarboxylic acids and amines containing 1 to 22 carbon atoms and diesters derived from the above unsaturated dicarboxylic acid monomers and glycols containing 2 to 4 carbon atoms;

bifunctional (meth)acrylates such as hexanediol di(meth) acrylate, trimethylolpropane tri(meth)acrylate, and trimethylolpropane di(meth)acrylate; unsaturated sulfonic acids, such as vinylsulfonate, (meth)allylsulfonate, 2-(meth)acryloxyethylsulfonate, 3-(meth)acryloxypropyl-sulfonate, 3-(meth) acryloxy-2-hydroxypropylsulfonate, 3-(meth)acryloxy-2-hydroxypropylsulfophenyl ether, 3-(meth)acryloxy-2-hydroxypropyloxysulfobenzoate, 4-(meth) acryloxybutylsulfonate, (meth)acrylamidomethyl-sulfonic acid, (meth)acrylamidoethylsulfonic acid, 2-methylpropanesulfonic acid (meth)acrylamide and styrenesulfonic acid, as well as univalent metal salts, bivalent metal salts, ammonium salts and organic amine salts thereof;

unsaturated amides such as (meth)acrylamide, (meth)acrylalkylamides, N-methylol(meth)acrylamide and N,N-dimethyl(meth)acrylamide; allyl compounds such as allyl alcohol; unsaturated amino compounds such as dimethylaminoethyl(meth)acrylate; vinyl ethers and allyl ethers, such as methoxypolyethylene glycol monovinyl ether, polyethylene glycol monovinyl ether, methoxypolyethylene glycol mono(meth)allyl ether and polyethylene glycol mono (meth)allyl ether;

(meth)acrylate compounds such as hydroxyethyl(meth) acrylate, hydroxypropyl(meth)acrylate, methoxyethyl(meth) acrylate, ethoxyethyl(meth)acrylate, butoxyethylethyl(meth) acrylate, and methoxypropyl(meth)acrylate.

Now, regarding the method of producing the polycarboxylic acid copolymer of the present invention, the method of copolymerizing the monomer components is explained in the following.

As the above copolymerization, any known polymerization method can be used, such as solution polymerization or bulk polymerization using the monomer components and a polymerization initiator. As the polymerization initiator, the known ones can be used and suitable are persulfate salts such as ammonium persulfate, sodium persulfate and potassium persulfate; hydrogen peroxide; azo compounds such as azobis-2-methylpropionamidine hydrochloride and azobisisobutyronitrile; peroxides such as benzoyl peroxide, lauroyl peroxide and cumene hydroperoxide; and so forth. Further, as the promoter, reducing agents such as sodium hydrogensulfite, sodium sulfite, Mohr's salt, sodium pyrobisulfite, formaldehyde sodium sulfoxylate and ascorbic acid; and amine compounds such as ethylenediamine, sodium ethylenediaminetetraacetate and glycine, etc. can be used in combination. These polymerization initiators and promoters may be used singly or two or more species may be used in combination.

In the above method of copolymerization, a chain transfer agent may be used according to need. Usable as such chain transfer agent are one or two or more species of those known in the art. The use of a hydrophobic chain transfer agent is preferred, however.

In the above method of copolymerization, when the monomer components comprise one or more monomers (A) having an oxyalkylene group, namely the polyalkyleneimine unsaturated monomers (A1) and the polyalkylene glycol unsaturated monomers (A2) and (A3) each having an oxyalkylene group, the use of a hydrophobic chain transfer agent is preferred. It is more preferred when the monomer (A) having an oxyalkylene group is a polyalkylene glycol ester monomer and/or an unsaturated alcohol-polyalkylene glycol adduct. When the hydrophobic chain transfer agent is used, the hydrophobic group derived from the hydrophobic chain transfer agent is introduced into the copolymer. The method of producing polycarboxylic acid copolymers which comprises copolymerizing monomer components comprising an monomer (A) having an oxyalkylene group and an unsaturated carboxylic acid monomer (B) in the above manner using a hydrophobic chain transfer agent constitutes another aspect of the present invention.

The polycarboxylic acid copolymer obtained by such method of producing polycarboxylic acid copolymers can also produce the functional effects of the present invention and constitutes a further aspect of the present invention.

Suitable as the above hydrophobic chain transfer agent are thiol compounds having a hydrocarbon group containing not less than 3 carbon atoms or compounds whose solubility in water at 25° C. is not more than 10%. Suitable are the chain transfer agents mentioned above, thiol chain transfer agents such as butanethiol, octanethiol, decanethiol, dodecanethiol, hexadecanethiol, octadecanethiol, cyclohexyl mercaptan, thiophenol, octyl thioglycolate, octyl 2-mercaptopropionate, octyl 3-mercaptopropionate, 2-ethylhexyl mercaptopropionate, 2-mercaptoethyl octanoate, 1,8-dimercapto-3,6-dioxaoctane, decanetrithiol, and dodecyl mercaptan; halides such as carbon tetrachloride, carbon tetrabromide, methylene chloride, bromoform, and bromotrichloroethane; unsaturated hydrocarbon compounds such as α-methylstyrene dimer, α-terpinene, γ-terpinene, dipentene, and terpinolene; and the like. These may be used singly or two or more species may be used in combination. Among them, thiol chain transfer agents having a hydrocarbon group containing not less than 3 carbon atoms are preferably contained.

The above hydrophobic chain transfer agent may be used in combination with one or two or more hydrophilic chain transfer agents, if necessary. As such hydrophilic chain transfer agents, those known in the art can be used. Suitable as such are thiol chain transfer agents such as mercaptoethanol, thioglycerol, thioglycolic acid, mercaptopropionic acid, 2-mercaptopropionic acid, 3-mercaptopropionic acid, thiomalic acid, and 2-mercaptoethanesulfonic acid; primary alcohols such as 2-aminopropane-1-ol; secondary alcohols such as isopropanol; phosphorous acid, hypophosphorous acid and salts thereof (e.g. sodium hypophosphite, potassium hypophosphite), sulfurous acid, hydrosulfurous acid, dithionous acid, metabisulfurous acid, and salts thereof (e.g. sodium sulfite, sodium hydrogen sulfite, sodium dithionite, sodium metabisulfite, potassium sulfite, potassium hydrogen sulfite, potassium dithionite, potassium metabisulfite), and like lower oxides and salts thereof.

As for the method of adding the above chain transfer agent to the reaction vessel, such a continuous charging method as dripping and divided charging can be applied. The chain transfer agent may be introduced singly into the reaction vessel, or it may be admixed in advance with the monomer (A) having an oxyalkylene group or unsaturated carboxylic acid monomer (B) which constitute the monomer components, solvent and/or the like.

The above copolymerization may be carried out either batchwise or continuously. As the solvent which is used where necessary in the step of copolymerization, any of known ones may be used and suitable are water; alcohols such as methyl alcohol, ethyl alcohol and isopropyl alcohol; aromatic or aliphatic hydrocarbons such as benzene, toluene, xylene, cyclohexane and n-heptane; esters such as ethyl acetate; and ketones such as acetone and methyl ethyl ketone. These may be used singly or two or more species may be used in combination. Among them, one or two or more solvents selected from the group consisting of water and lower alcohols containing 1 to 4 carbon atoms are preferably used from the viewpoint of solubility of the monomer components and the product polycarboxylic acid copolymer.

As for the method of adding the monomer components, polymerization initiator, etc. to the reaction vessel in the above-mentioned method of copolymerization, suitable are the method comprising charging the reaction vessel with all monomer components and then adding the polymerization initiator thereto to conduct copolymerization; the method comprising charging the reaction vessel with some of monomer components and then adding the polymerization initiator and residual monomer components thereto to conduct copolymerization, and the method comprising charging the reaction vessel with the polymerization solvent and then adding the whole amount of the monomers and polymerization initiator thereto are suitable. Among such methods, the method comprising carrying out the copolymerization by adding dropwise the polymerization initiator and monomers successively to the reaction vessel is preferred since the molecular weight distribution of the product copolymer can be made narrow (sharp) and the cement dispersibility for increasing the fluidity of cement compositions and the like can be improved thereby.

In the above method of copolymerization, the copolymerization temperature and other copolymerization conditions are appropriately selected according to the copolymerization method, solvent, polymerization initiator, and chain transfer agent employed. It is generally preferred that the copolymerization temperature be not lower than 0° C. and not higher than 150° C. More preferably, it is not lower than 40° C., still more preferably not lower than 50° C., particularly preferably not lower than 60° C., while it is more preferably not higher than 120° C., still more preferably not higher than 100° C., particularly preferably not higher than 85° C.

The copolymer obtained by the above method of copolymerization as such can be used as the main component of cement additives. Where necessary, it may be used after further neutralization with an alkaline substance. Preferably used as the alkaline substance are inorganic salts such as monovalent and divalent metal hydroxides, chlorides and carbonates; ammonia; and organic amines, etc.

In the above method of copolymerization, the copolymerization of the monomer components is preferably carried out at a degree of neutralization of the above unsaturated carboxylic acid monomer (B) of 0 to 60 mole percent. The degree of neutralization of the unsaturated carboxylic acid monomer (B) is expressed in terms of the mole percent of the unsaturated carboxylic acid monomer (B) in a salt form with the total number of moles of the unsaturated carboxylic acid monomer (B) being taken as 100 mole percent. When the degree of neutralization of the unsaturated carboxylic acid monomer (B) exceeds 60 mole percent, the degree of polymerization in the copolymerization step will not rise, hence the product copolymer may possibly have a lower molecular weight and the production efficiency may possibly decrease. More preferably, it is not more than 50 mole percent, still more preferably not more than 40 mole percent, still more preferably not more than 30 mole percent, particularly preferably not more than 20 mole percent, most preferably not more than 10 mole percent.

Suitable as the method of carrying out the copolymerization using the above unsaturated carboxylic acid monomer (B) at a degree of neutralization of 0 to 60 mole percent are the method comprising subjecting the all acid form unsaturated carboxylic acid monomer (B), namely the whole unsaturated carboxylic acid monomer (B) in which M in the above general formula (1) is a hydrogen atom, to copolymerization without neutralization, and the method comprising subjecting the unsaturated carboxylic acid monomer (B) to copolymerization after neutralization with an alkaline substance to the form of a salt, such as sodium salt or ammonium salt, at a degree of neutralization of 0 to 60 mole percent and the like.

The polycarboxylic acid copolymer of the present invention is obtained by copolymerization of the monomer components, as mentioned above. As for the molecular weight of such copolymer, the weigh average molecular weight (Mw) as determined by gel permeation chromatography (hereinafter referred to as "GPC") and expressed on the polyethylene glycol equivalent basis is preferably not less than 500 and not more than 500,000. When it is less than 500, the water reducing capacity of the polycarboxylic acid copolymer may possibly decrease and, when it is above 500,000, the water reducing capacity and slump loss preventive effect of the polycarboxylic acid copolymer may possibly decrease. It is more preferably not less than 5,000, most preferably not less than 8,000. Also, it is more preferably not more than 300,000, most preferably not more than 100,000. In the present specification, the weight average molecular weight of the copolymer is a value determined under the GPC measurement conditions given below.

For analyzing cement additives, inclusive of the copolymer of the present invention, there are available (1) the method according to which the analysis is carried out without any treatment and (2) the method according to which the analysis is carried out after removing low molecular weight compounds, such as residual monomers, and water-insoluble substances such as antifoaming agents. The method shown below is suitable as the method of purifying the polymer.

Polymer Purification Conditions

Polymer Purification Condition 1
1. The pH is adjusted to 12 to 12.5 using 30% (by weight) NaOH aq.
2. The cement additive (aqueous polymer solution) is concentrated using an evaporator and then evaporated to dryness in a vacuum drier at 50° C.
3. The thus-obtained material is extracted with a solvent (e.g. diethyl ether, petroleum ether) using a Soxhlet extractor to separate into a soluble fraction and an insoluble fraction.
4. The insoluble fraction is made into a solution with a concentration of about 40 to 50% by weight, which is then subjected to dialysis or ultrafiltration to remove low molecular weight components, such as residual monomers and the like. The demarcation molecular weight is to be selected according to the molecular weights of the residual monomers in GPC (1,000, 3,500, 8,000, 15,000).

Polymer Purification Condition 2
1. The pH is adjusted to 12 to 12.5 using 30% (by weight) NaOH aq.
2. The cement additive (aqueous polymer solution) is concentrated using an evaporator and then evaporated to dryness in a vacuum drier at 50° C.
3. The thus-obtained material is extracted with a solvent (e.g. diethyl ether, petroleum ether) using a Soxhlet extractor to separate into a soluble fraction and an insoluble fraction.
4. The cement additive is subjected to ultrafiltration using an ultrafiltration membrane (demarcation molecular weight 6,000). The demarcation molecular weight is to be selected according to the molecular weights of the residual monomers in GPC (13,000). The rate of circulation of the polymer solution is adjusted so that the pressure at the ultrafiltration membrane outlet and the pressure at the ultrafiltration membrane inlet may be not less than 0.01 MPa.

Filtrate concentration: To be adjusted to 0.1 to 10% by weight.

Endpoint: Removal of the residual monomers is to be confirmed by NMR, liquid chromatography, etc.

Ultrafiltration Apparatus
Funakoshi: FILTRATION SYSTEM PS-24001
Pencil type module (product of Asahi Kasei Co.)
Model: AIP-0013
Material: Hollow fiber membrane: polyacrylonitrile (PAN)
  Housing: polysulfone
  Adhesive: epoxy resin
Specification: Membrane inside diameter (mm): 0.8 mm
  Number of membranes used: 100 membranes
  Effective membrane area ($cm^2$): 170
Nominal demarcation molecular weight: 6,000
Use conditions: Maximum use pressure (kPa): 100
  Usable temperature (° C.): 50
  Usable pH range: 2 to 10
  Module size (mm): 20Ø×130 L The polycarboxylic acid copolymer of the present invention is obtained by copolymerization of the monomers, as mentioned above. The TCAV (total carboxylic acid value), on the solid matter basis, of such copolymer or cement additive is preferably not less than 3 mg KOH/g and not more than 900 mg KOH/g. When it is less than 3 mg KOH/g, the adsorption of the polycarboxylic acid copolymer onto cement will become slow, so that a long time will be required for the water reducing capacity to be manifested and/or the water reducing capacity will possibly decrease. If it exceeds 900 mg KOH/g, the adsorption of the polycarboxylic acid copolymer onto cement will become excessively rapid, so that cement particles will aggregate and the water reducing capacity and slump loss preventing effect will possibly decrease. More preferably, it is not less than 5 mg KOH/g, more preferably not less than 10 mg KOH/g, still more preferably not less than 15 mg KOH/g, particularly preferably not less than 20 mg KOH/g, most preferably not less than 25 mg KOH/g, and it is more preferably not more than 500 mg KOH/g, still more preferably not more than 400 mg KOH/g, further mores preferably not more than 300 mg KOH/g, particularly preferably not more than 200 mg KOH/g, most preferably not more than 150 mg KOH/g. In the present specification, the TCAV is a value measured under the TCAV (total carboxylic acid value) measurement conditions given later herein.

As for the NMR-PEG content of the polycarboxylic acid copolymer of the present invention, it is preferably not less than 10% by weight and preferably not more than 99% by weight. If it is less than 10% by weight, the amount of dispersing groups for dispersing cement particles becomes small, so that cement particles may aggregate and the water reducing capacity and ease of handling will possibly decrease. When it exceeds 99% by weight, the adsorption of the polycarboxylic acid copolymer onto cement becomes slow, so that a long time will be required for the water reducing capacity to be manifested and/or the water reducing capacity will possibly decrease. It is more preferably not less than 50% by weight, still more preferably not less than 60% by weight, further more preferably not less than 65% by weight, particularly preferably not less than 70% by weight. And, it is more preferably not more than 98% by weight, still more preferably not more than 97% by weight, further more preferably not more than 95% by weight, particularly preferably not more than 93% by weight, most preferably not more than 93% by weight. In the present specification, the NMR-PEG content is a value measured by the NMR-PEG content measurement method shown later herein.

Among the polycarboxylic acid copolymers of the invention, the form obtained by copolymerization of monomer components comprising the polyalkyleneimine unsaturated monomer (A1) and the unsaturated carboxylic acid monomer (B) preferably has a nitrogen content of not less than 0.001% by weight and not more than 20.0% by weight. When it is less than 0.001% by weight, the weight percentage of the polyalkyleneimine unsaturated monomer becomes small and cement compositions in which such copolymer is used may become difficult to handle. When it exceeds 20% by weight, the amine content in the polycarboxylic acid copolymer becomes high, whereby it strongly interacts with carbonyl groups in the copolymer and possibly reduces the water reducing capacity. It is more preferably not less than 0.01% by weight, still more preferably not less than 0.05% by weight, further more preferably not less than 0.1% by weight, particularly preferably not less than 0.5% by weight, most preferably not less than 1.0% by weight. And, it is more preferably not more than 15.0% by weight, still more preferably not more than 10.0% by weight, further more preferably not more than 8.0% by weight, particularly preferably not more than 5.0% by weight, most preferably not more than 3.0%.

The GPC molecular weight measurement conditions, $^1$H-NMR (400 MHz, 200 MHz) measurement conditions, $^{13}$C-NMR measurement conditions, IR measurement conditions, pyrolysis GC-MASS measurement conditions, solid content measurement conditions and NMR-PEG content measurement conditions in the practice of the present invention are shown below.

GPC Molecular Weight Measurement Conditions

Column used: Tosoh TSK guard column SWXL+TSK gel G4000SWXL+G3000SWXL+G2000SWXL

Eluent: Sodium acetate trihydrate (115.6 g) is dissolved in a mixed solvent composed of 10,999 g of water and 6,001 g of acetonitrile, and the solution is further adjusted to pH 6.0 with a 30% aqueous solution of sodium hydroxide and used as the eluent.

Injection volume: 100 μL

Sample concentration: 0.5% by weight

Eluent flow rate: 0.8 mL/sec

Column temperature: 35° C.

Standard samples: Polyethylene glycol, weight average molecular weights (Mw) 272,500, 219,300, 85,000, 46,000, 24,000, 12,600, 4,250, 7,100, 1,470

Detector: Waters, Japan's differential refractive index detector

Analysis software: Waters, Japan's MILLENNIUM Ver. 2.18

<$^1$H-NMR Measurement Conditions (400 MHz)>

| | |
|---|---|
| Model: | Varian's Unity plus (400 MHz) |
| Probe: | Quadrupole auto switchable probe |
| Observation target nucleus: | Hydrogen nucleus (resonance frequency 400.0) |
| Measurement conditions: | 90-degree pulse 22.5 μsec (45-degree pulse irradiation) |
| | Waiting time 3.0 sec |
| | Accumulation 16 times |

<$^1$H-NMR Measurement Conditions (200 MHz)>

| | |
|---|---|
| Model: | Varian's Geminin 2000 (200 MHz) |
| Probe: | CH switchable probe |
| Observation target nucleus: | Hydrogen nucleus (resonance frequency 400.0) |
| Measurement conditions: | 90-degree pulse 10 μsec (45-degree pulse irradiation) |
| | Waiting time 1.25 sec |
| | Accumulation 16 times |

<$^{13}$C-NMR Measurement Conditions>

| | |
|---|---|
| Model: | Varian's Unity plus (400 MHz) |
| Probe: | Quadrupole auto switchable probe |
| Observation target nucleus: | Carbon nucleus (resonance frequency 100.6) |
| Measurement conditions: | 90-degree pulse 15.1 μsec (irradiated with ⅓ of 90-degree pulse) |
| | $^1$H pulse output 38 dB |
| | Waiting time 0.939 sec |
| | Accumulation 25,000 times |

<IR Measurement Conditions>

Model: BIO-RAD's FT-IR

Measurement method: Germanium plate thin film formation method

One drop (about 0.03 mL) of a 5% aqueous copolymer solution is dropped onto a germanium plate. Moisture is removed in a vacuum drier (a desiccator connected to a vacuum pump may be used alternatively) (25° C., 0.001 MPa or below, 10 minutes or longer).

<TCAV (Total Carboxylic Acid Value) Measurement Conditions>

Model: Hiranuma Sangyo's automatic titrator COM-550

0.1 mol/L sodium hydroxide Wako Pure Chemical Industries' reagent for volumetric analysis, fn (factor)

0.1 mol/L hydrochloric acid Wako Pure Chemical Industries' reagent for volumetric analysis Solvent: Deionized water/acetonitrile=50/50 (% by volume)

(1) One gram (0.2 to 0.5 g on the solid matter basis) of the cement additive as such is accurately (to the fourth decimal place) weighed in a 100-mL beaker (W g).

(2) The beaker contents are diluted with 50 mL of the solvent.

(3) The above aqueous hydrochloric acid solution (5 mL) is added and, after confirming that the pH is not higher than 3 (preferably not higher than 2.5), potentiometric titration is carried out using the above aqueous sodium hydroxide solution.

(4) The amount (V mL) of sodium hydroxide required during the period from the first inflection point to the second inflection point is determined.

fn: Factor of the 0.1 mol/L hydroxide

NV (weight %): Solid matter concentration in the cement additive

TCAV=(V×0.1×fn×56.11)/(W×NV) mg KOH/g

<Pyrolysis GC-MASS Measurement Conditions>

Pyrolysis Gas Chromatography—Mass Spectrometry

Model: Hitachi model N-5000, quadrupole type

Column: GL Science's DB-1 (0.25 mm×30 m×0.25 μm)

Curie point pyrolyzer measurement method 590° C.

Temperature programming: 50° C. (hold 5 min)–(5° C./min)–150° C.–(10° C./min)–250° C. (hold 5 min)

<Solid Content Measurement Conditions>

About 0.5 g of the cement additive is accurately weighed in an aluminum cup. After heating in a drier maintained at 130° C. under a nitrogen stream for 1 hour, the aluminum cup is taken out, cooled in a desiccator for 10 minutes and then weighed. The solid content is calculated from the weight of the cement additive weighed and the residual weight after heating.

<NMR-PEG Content Measurement Method>

The percentage by weight of the peak at 3.3 to 4.2 ppm (peak appearing at the same position as that of —OCH$_2$CH$_2$— of methoxypolyethylene glycol methacrylate) as observed in $^1$H NMR (200 MHz) is determined.

Measurement outline: The weight percentage of the peak at 3.3 to 4.2 ppm as contained in the polymer is determined from the weight ratio and NMR integrated value ratio between the polymer and internal reference material (trioxane) using a calibration curve.

Polymer preparation: After removal of residual monomers by dialysis or the like, the polymer is dried to a moisture content of not more than 0.1% by weight in a vacuum drier. Purification is made so that any other peak may not appear at 4.9 to 5.2 ppm in NMR.

Trioxane: Wako Pure Chemical Industries' first reagent grade, the moisture content is to be adjusted to not more than 0.05% by weight.

Moisture content measurement method: Karl Fischer method
Substance for calibration curve construction: The weight ratio of —$OCH_2CH_2$— relative to the total weight of polymer A or methoxypolyethylene glycol methacrylate is determined in advance.

The above polymer A: "Product of Shin-Nakamura Kagaku, M-90G/sodium methacrylate=70/30 (% by weight), Mw 20,000 to 30,000". The initiator, chain transfer agent, residual monomer(s), purities of raw materials and so forth are determined accurately and the weight ratio of —$OCH_2CH_2$-relative to the total weight is determined in advance.

Weight: Weighing is performed to the accuracy of 0.1 mg.

The polycarboxylic acid copolymer of the present invention can suitably be used as a main component of cement additives. A cement additive comprising the polycarboxylic acid copolymer of the invention also constitutes an aspect of the present invention.

A cement additive which has a calcium transfer value of 10 to 900 mPa·s and/or a cement performance coefficient of 0.05 to 1.0 can provide cement compositions easier to handle even when the fluidity and water reducing capacity are at the same levels. Such a cement additive also constitutes a further aspect of the present invention.

The methods of determining the calcium transfer value and cement performance coefficient so referred to herein are explained in the following.

<Cement Performance Coefficient Measurement Method>

Reagents and Apparatus Conditions

Ordinary portland cement (JIS R 5210): A Taiheiyo Cement's cement lot showing a viscosity μ (e) (defined below) of 5,000 to 6,000 mPa·s is used.

Antifoaming agent: Oxyalkylene antifoaming agent, nonyloxypolypropylene glycol-polyethylene glycol (average number of moles of propylene oxide added 20, average number of moles of ethylene oxide added 3)

Used in an amount of 0.5% by weight relative to the solid matter-based amount of addition of the cement additive.

Standard sand for cement strength testing: JIS R 5201
Mortar mixer: Howard model N-50, capacity 5 L
Rotation 1: Rotation 139 rpm, revolution 61 rpm
Rotation 2: Rotation 285 rpm, revolution 125 rpm
Spatula: Made of stainless steel, cf. FIG. 2
Teraoka's Newdes cup (300 mL): Cf. FIG. 3
Helipath rotational viscometer: Model TV-20 viscometer/ spindle T-A/10 rpm (product of Tohki Sangyo)
Cement additive amount of addition: Amount of addition on the solid matter basis in all the cases
Air content measurement method: About 450 mL of mortar is placed in a 500-mL graduated cylinder, and the volume and weight are measured. The air content is calculated based on the densities of the cement, sand and deionized water used.

Measurement Method

Ordinary portland cement (1,080 g) and 1,350 g of the standard sand for cement strength testing, each conditioned at 25° C., are placed in the mortar mixer and, after 10 seconds of stirring at Rotation 1, 270 g of deionized water (25° C.) with the predetermined amount of the cement additive and antifoaming agent added thereto is added, stirring is further carried out at Rotation 1 for 3 minutes, followed by 2 minutes of stirring at Rotation 2, to give a mixture C.

The whole mixture C is placed in a plastic-made cylindrical vessel (capacity 1.2 L, lower part diameter 90 mm, upper part diameter 110 mm, height 140 mm) and, 1 minute and 20 seconds after completion of mixing, the mixture is remixed 5 times to the right and 5 times to the left in 5 seconds using the spatula. One third of the mixture C is filled into a mini slump cone (upper part diameter 50 mm, lower part diameter 100 mm, height 150 mm) placed on a stainless steel plate, and pounded spirally 25 times with a glass rod. Another one-third portion is packed in the same manner and pounded 25 times with a glass rod. The remaining one-third portion is packed in the same manner. After a total time of 10 minutes from the start of mixing, each mini slump cone is lifted up vertically, and the "maximum length" and "length perpendicular thereto" of the mixture C spread on the stainless steel plate are measured, and the average values of these two values is reported as the flow value (mm).

Under conditions such that the air content is adjusted to 2.0 to 4.0% by volume, the amount of addition (on the solid matter basis) of the cement additive relative to ordinary portland cement is varied, a graph of the relation between the amount of addition and the flow value is drawn, and the amount of addition of the cement additive required to give a flow value of 200 mm is determined. (The amount of addition on that occasion is defined as "standard amount of addition".) The flow value measurement should be repeated for at least two amounts of addition within the flow value range of 200±25 mm or at least three amounts of addition within the flow value range of 200±50 mm. When the air content fails to fall within the range of 2.0 to 4.0% by volume, the amount of the antifoaming agent is varied from 0.5% by weight and those amounts of addition of the antifoaming agent and cement additive which cause both the flow value and air content to fall within the respective specified ranges are determined.

Then, 600 g of ordinary portland cement conditioned at 25° C. is placed in the mortar mixer and, after 10 seconds of stirring at Rotation 1, 150 g of deionized water (25° C.) with the cement additive and antifoaming agent added thereto at the respective standard amounts of addition determined as mentioned above is added. Mixing is carried out for 50 seconds and then once discontinued, and the cement paste adhering to the mortar mixer wall is scraped off over 30 seconds. Then, mixing is further performed at Rotation 1 for 3 minutes and 40 seconds, to give a mixture D.

The whole mixture D is placed in a Teraoka's Newdes cup (300 mL) and stirred 30 times to the right and 30 times to the left in 60 seconds using the spatula to attain uniform dispersion of the cement paste.

After a total time of 10 minutes from the start of mechanical kneading of the mixture D, the viscosity measurement is started on the Helipath rotational viscometer (with the position of the spindle adjusted to the graduation of 175 mL=3.8 cm from the bottom). The viscosity measured at 2 minutes after the start of viscosity measurement is reported as the viscosity μ (d).

600 g of ordinary portland cement and 240 g of deionized water are placed in the mortar mixer (without adding the cement additive and antifoaming agent) and stirred in the same manner as for the mixture D, to give a mixture E. Its viscosity is measured in the same manner as with the mixture D, and the viscosity after 2 minutes from the start of viscosity measurement is measured. The measurement is made twice and the average of the two values is reported as the viscosity μ (e). The ratio viscosity μ (d)/viscosity μ (e) is reported as the cement performance coefficient.

<Calcium Transfer Value Measurement Method>

Reagents and Apparatus Conditions

Calcium carbonate: Product of Nippon Funka Kogyo, SS # 80

Calcium hydroxide: Product of Wako Pure Chemical Industries

Toyoura silica sand: Product of Toyoura Keiseki Kogyo

Mortar mixer: Howard model N-50, capacity 5 L

Rotation 1: Rotation 139 rpm, revolution 61 rpm

Rotation 2: Rotation 285 rpm, revolution 125 rpm

Spatula: Made of stainless steel, cf. FIG. 2

Teraoka's PACK-ACE (600 mL)

Homomixer: 1,000 rpm; cf. FIG. 4

Type B viscometer: Number of rotations 6 rpm, rotor No. 2; rotation is started 30 seconds after rotor setting.

Cement additive amount of addition: Amount of addition on the solid matter basis in all the cases Measurement Method Calcium carbonate (300 g), 0.3 g of calcium hydroxide and 250 g of Toyoura silica sand, each conditioned at 25° C., are placed in the mortar mixer and, after 30 seconds of stirring at Rotation 1, 75 g of deionized water (25° C.) with the predetermined amount of the cement additive added thereto is added, and the whole is further stirred at Rotation 2 for 5 minutes to give a mixture A.

The whole mixture A is placed in a plastic-made cylindrical vessel (capacity 1.2 L, lower part diameter 90 mm, upper part diameter 110 mm, height 140 mm) and, 30 minutes and 58 minutes after the addition of deionized water, the mixture is stirred 15 times to the right and 15 times to the left in 30 seconds using the spatula.

The mixture A is filled into a hollow cylindrical vessel, 55 mm in diameter and 50 mm in height, placed on a stainless steel plate. After 1 hour from the addition of deionized water, the cylindrical vessel is lifted up vertically, and the "maximum length" and "length perpendicular thereto" of the mixture spread over the stainless steel plate are measured, and the average value of these two values is reported as the flow value (mm).

By varying the amount of addition (on the solid matter basis) of the cement additive relative to calcium carbonate, the amount of addition of the cement additive required to give a flow value of 160 mm is determined. (This amount of addition is defined as "calcium standard amount of addition".)

Then, 75 g of deionized water (25° C.) with 300 g of calcium carbonate and the cement additive at the calcium standard amount of addition, conditioned at 25° C. added thereto, is placed in Teraoka's PACK-ACE (600 mL) (plastic-made cylindrical vessel, upper part diameter 87 mm, lower part diameter 80 mm, height 120 mm), then stirred 90 times to the right and 90 times to the left in 3 minutes with a stainless steel rod (width 9 mm, thickness 2 mm), and further stirred with a homomixer for 9 minutes to give a mixture B.

The mixture B is conditioned at 25° C. in a constant temperature water tank until just before transfer to a 100-mL screw tube (glass container, diameter 35 mm, height 100 mm) and, further, stirred 180 times to the right and 180 times to the left in 3 minutes using a stainless steel rod (width 9 mm, thickness 2 mm) for attaining sufficient dispersion of the calcium carbonate sediment just before transfer to the 100-mL screw tube. The mixture B is placed in the 100-mL screw tube to the height of 80 mm. The viscosity of the mixture B is measured using the type B viscometer after 60 minutes from the start of stirring with a homomixer, and the value indicated at 180 seconds after start of rotation is reported as the calcium transfer value.

The above cement additive shows a calcium transfer value of 10 to 900 mPa·s and/or a cement performance coefficient of 0.05 to 1.0.

When a cement additive having the above cement performance coefficient exceeding 1.0 is used in a cement composition, the composition becomes poor in workability and difficult to handle. Cement compositions in which a cement additive having the cement performance coefficient lower than 0.05 is used will easily separate into a cement paste and an aggregate (sand, stone), allow bleeding of large amounts of water and become difficult to handle. The coefficient value is preferably not less than 0.05, more preferably not less than 0.1, still more preferably not less than 0.2. And, it is preferably not more than 0.95, more preferably not more than 0.90, still more preferably not more than 0.85, particularly preferably not more than 0.80.

When a cement additive having the above calcium transfer value exceeding 900 mPa·s is used in a cement composition, the composition acquires an increased viscosity and becomes difficult to handle. Cement compositions in which a cement additive having the calcium transfer value lower than 10 mPa·s is used will have a low viscosity, easily separate into a cement paste and an aggregate (sand, stone), allow bleeding of large amounts of water and become difficult to handle. The value is preferably not less than 10 mPa·s but not more than 850 mPa·s. It is particularly preferably not less than 50 mPa·s, most preferably not less than 100 mPa·s. And, it is more preferably not more than 800 mPa·s, still more preferably not more than 750 mPa·s, particularly preferably not more than 700 mPa·s, most preferably not more than 650 mPa·s.

A cement additive, when purified following adjustment to pH 12 to 12.5, having a nitrogen content of 0.1 to 20% by weight as determined by elemental analysis, allowing detection of morpholine, 4-(2-hydroxyethyl)morpholine and 1,4-dioxane upon pyrolysis GC-MASS, showing a peak having no shoulder in GPC, having a weight average molecular weight (Mw) of 5,000 to 300,000, showing, in IR measurement, an absorption peak at 1640 to 1660 $cm^{-1}$ whose intensity is not more than 20% of the intensity of the absorption peak occurring at 1710 to 1630 $cm^{-1}$, allowing detection, in $^{13}C$-NMR, of signals at chemical shift positions of 60 to 61 ppm and 69 to 68 ppm, having an NMR-PEG content of 10 to 99% by weight and having a TCAV of 3 to 900 mg KOH/g also can provide cement compositions easier to handle when the fluidity and water reducing capacity are at the same levels. Such a cement additive also constitutes a further aspect of the present invention.

When the above-mentioned nitrogen content, pyrolysis GC-MASS, IR and $^{13}C$-NMR measurement results are combinedly evaluated, it is shown that the cement additive contains the above-mentioned polyalkyleneimine unsaturated monomer (A1) having an oxyalkylene group. Thus, the cement additive for which these analytical values fall within the respective ranges specified above contains the above polyalkyleneimine unsaturated monomer (A1) having an oxyalkylene group. Further, that GPC gives one peak, namely a peak having no shoulder indicates that the polyalkyleneimine unsaturated monomer (A1) having an oxyalkylene group occurs in a copolymerized state, not in a merely mixed state. The IR measurement is for showing the absence of amide bonding and thus for showing that any polyamide monomer or acrylamide or the like is not copolymerized but that the polyalkyleneimine unsaturated monomer (A1) having an oxyalkylene group is copolymerized.

The above cement additive, when purified by the method mentioned below, gives analytical values falling within the respective ranges mentioned above.

(Cement Additive Purification Method)
1. The pH is adjusted to 12 to 12.5 using 30% (by weight) NaOH aq.
2. The cement additive (aqueous polymer solution) is concentrated using an evaporator and then evaporated to dryness in a vacuum drier at 50° C.
3. The thus-obtained material is extracted with a solvent (e.g. diethyl ether, petroleum ether) using a Soxhlet extractor to separate into a soluble fraction and an insoluble fraction.
4. The insoluble fraction is made into a solution with a concentration of about 40 to 50% by weight, which is then subjected to dialysis or ultrafiltration to remove low molecular weight components, such as residual monomers and the like. The demarcation molecular weight is to be selected according to the molecular weights of the residual monomers in GPC (1,000, 3,500, 8,000, 15,000).

In this aspect of the invention, the measurement conditions for pyrolysis GC-MASS, GPC, IR, $^{13}$C-NMR, TCAV and NMR-PEG content are the same as the conditions mentioned hereinabove referring to the polycarboxylic acid polymer.

The cement additive of the present invention, if it shows a nitrogen content lower than 0.1% by weight in elemental analysis after purification by the above method, may render cement compositions in which this cement additive is used difficult to handle and, if the nitrogen content exceeds 20% by weight, the water reducing capacity may possibly decrease. The nitrogen content is preferably not less than 0.5% by weight, more preferably not less than 1.0% by weight. And, it is preferably not more than 15% by weight, more preferably not more than 10% by weight, still more preferably not more than 8% by weight, particularly preferably not more than 3% by weight. The nitrogen content is the weight ratio of the nitrogen atom relative to 100% by weight of the solid matter in the cement additive.

When morpholine, 4-(2-hydroxyethyl)morpholine, and 1,4-dioxane are detected in a cement additive in the above pyrolysis GC-MASS, cement compositions in which this cement additive is used become easier to handle.

The above cement additive is required to show a peak having no shoulder in GPC. The term "peak having no shoulder" means that, in the GPC chart, there are only two inflection points from the peak starting point to the end of the peak, as shown in FIG. 1. As for the weight average molecular weight (Mw), if it is less than 5,000, the water reducing capacity may possibly decrease and, if it exceeds 300,000, the water reducing capacity and slump loss preventing effect may possibly decrease. It is preferably not less than 8,000, most preferably not less than 10,000. And, it is preferably not more than 300,000, most preferably not more than 500,000. The weight average molecular weight is a value determined under the GPC measurement conditions mentioned above.

It is required that the above cement additive, in IR measurement, shows the absorption peak at 1640 to 1660 cm$^{-1}$ whose intensity is not more than 20% of the intensity of the absorption peak occurring at 1710 to 1630 cm$^{-1}$. This means that almost no amide bonding occurs in the copolymer. Preferably, the intensity of the absorption peak occurring at 1640 to 1660 cm$^{-1}$ is not more than 15%, more preferably not more than 10%, still more preferably not more than 5%, particularly preferably not more than 3% of the intensity of the absorption peak occurring at 1710 to 1630 cm$^{-1}$.

When, in the above-mentioned $^{13}$C-NMR, signals are detected at chemical shift positions of 60 to 61 ppm and 69 to 68 ppm, cement compositions in which this cement additive is used become easier to handle.

When the above-mentioned NMR-PEG content is less than 10% by weight, the amount of dispersing groups for dispersing cement-particles becomes so insufficient that the aggregation of cement particles will occur, whereby the water reducing capacity and ease of handling will decrease. When it exceeds 99% by weight, a long period will be required to manifest the water reducing capacity or the water reducing capacity will decrease. It is preferably not less than 50% by weight, more preferably not less than 60% by weight, still more preferably not less than 65% by weight, particularly preferably not less than 70% by weight. And, it is preferably not more than 98% by weight, still more preferably not more than 97% by weight, further more preferably not more than 95% by weight, particularly preferably not more than 93%, most preferably not more than 93% by weight.

When the above-mentioned TCAV is less than 3 mg KOH/g, a long period will be required to manifest the water reducing capacity and the water reducing capacity will decrease. When it exceeds 900 mg KOH/g, cement particles may aggregate, whereby the water reducing capacity and slump loss preventing effect may possibly decrease. It is preferably not less than 5 mg KOH/g, more preferably not less than 10 mg KOH/g, still more preferably not less than 15 mg KOH/g, particularly preferably not less than 20 mg KOH/g, most preferably not less than 25 mg KOH/g. And, it is preferably not more than 500 mg KOH/g, more preferably not more than 400 mg KOH/g, still more preferably not more than 300 mg KOH/g, particularly preferably not more than 200 mg KOH/g, most preferably not more than 150 mg KOH/g.

As a preferred embodiment of the cement additive having the above-mentioned calcium transfer value of 10 to 900 mPa·s and/or cement performance coefficient of 0.05 to 0.9 or of the cement additive giving analytical values falling within the respective ranges mentioned above after adjusted its pH to not less than 12 to 12.5 and then purified, there may be mentioned the above-mentioned (1) one comprising the polycarboxylic acid copolymer obtained by copolymerization of monomer components comprising the polyalkyleneimine unsaturated monomer (A1) and unsaturated carboxylic acid monomer (B), (2) one comprising the polycarboxylic acid copolymer obtained by copolymerization of monomer components comprising the polyalkylene glycol unsaturated monomer (A2) and unsaturated monocarboxylic acid monomer (B'), (3) one comprising the polycarboxylic acid copolymer obtained by copolymerization of monomer components comprising the polyalkylene glycol unsaturated monomer (A2') and unsaturated carboxylic acid monomer (B), and (4) one comprising the polycarboxylic acid copolymer obtained by copolymerization of monomer components comprising the monomer (A) having an oxyalkylene group and the unsaturated carboxylic acid monomer (B) using a hydrophobic chain transfer agent. In this case, too, preferred embodiments of the polycarboxylic acid copolymer are the same as those mentioned hereinabove. Namely, in the embodiment (1), the above polyalkyleneimine unsaturated monomer (A1) preferably has an oxyalkylene group(s) and, further, in the embodiments (1), (2) and (3), the above monomer components preferably comprises a polyalkylene glycol unsaturated monomer (A3) other than the above-mentioned monomer having an oxyalkylene group. The embodiments (1), (2), (3) and (4) may be appropriately combined.

The cement additive of the present invention is described in the following.

Cement compositions such as cement paste, mortar, concrete or the like can be added with the above cement additives and used.

Suitable as the above cement composition are ones in general use which contain cement, water, fine aggregate, coarse aggregate and so on. These may be added with fine powders, such as fly ash, blast-furnace slag, silica fume, liquefied silica fume, and lime stone. Such a cement composition comprising at least water, cement and a cement additive(s), the above cement additive being used as said cement additive also constitutes an aspect of the present invention.

Suitable as the above cement are ordinary, high early strength, ultra high early strength, moderate heat, white or like portland cement; and blended portland cement species such as high-alumina cement, portland fly-ash cement, portland blast-furnace slag cement, silica fume cement, high flow cement and the like. As the formulation amount and the unit water content of said cement per 1 $m^3$ of concrete, for producing high durability and high strength concrete, the unit water content is preferably 100 to 185 $kg/m^3$ and the water/cement ratio is preferably 10 to 70%. More preferably, the unit water content is 100 to 175 $kg/m^3$, and water/cement ratio is 10 to 65%. Usable as the aggregate are gravel, crushed stone, water granulated slag, recycled aggregates, fireproof aggregates, and the like.

The method of addition of the above cement additive to the cement composition is not particularly restricted. As regards the addition amount of the cement additive to the cement composition, it is preferred that the polycarboxylic acid copolymer of the present invention amount to 0.01 to 10% by weight relative to the whole cement weight being taken as 100% by weight. If it is less than 0.01% by weight, insufficient performance characteristics may result. If it is in excess of 10% by weight, the economy will be poor. Said weight percentage values are on the solid matter basis.

The above cement composition, which shows a high level of fluidity, is useful not only in ultrahigh strength concrete but also in precast concrete, concrete for centrifugal molding, concrete for vibrating compacting, steam curing concrete, sprayed concrete, and the like, and also is useful in mortar or concrete species of which high fluidity is required, such as medium flowing concrete (concrete having a slump value within the range of 22 to 25 cm), high flowing concrete (concrete having a slump value of not less than 25 cm and a slump flow value within the range of 50 to 70 cm), self compacting concrete, and self leveling materials.

The above cement additive can be used in combinations with any of those cement dispersants which are in general use and well known in the art. The cement dispersants which are known in the art and can be used are not limited to any particular species but include various sulfonic acid dispersants having a sulfonic acid group(s) within the molecule and various polycarboxylic acid dispersants having a polyoxyalkylene chain(s) and carboxyl groups within the molecule.

As the sulfonic acid dispersant, there may be mentioned, for example, ligninsulfonates; polyol derivatives; naphthalenesulfonic acid-formaldehyde condensates; melaminesulfonic acid-formaldehyde condensates; polystyrenesulfonic acid salts; aminosulfonic acid compounds such as aminoarylsulfonic acid-phenol-formaldehyde condensates, etc. As the polycarboxylic acid dispersant, there may be mentioned, for example, aminosulfonic acid compounds such as aminoarylsulfonic acid-phenol-formaldehyde condensates as described in Japanese Kokai Publication Hei-01-113419; cement dispersants comprising, as component (a), a copolymer of a polyalkylene glycol mono(meth)acrylate compound and a (meth)acrylic acid compound and/or a salt of said copolymer, as component (b), a copolymer of a polyalkylene glycol mono(meth)allyl ether compound and maleic anhydride and/or a hydrolyzate of said copolymer and/or a salt thereof and, as component (c), a copolymer of a polyalkylene glycol mono(meth)allyl ether compound and a maleic acid ester of a polyalkylene glycol compound, and/or a salt thereof, as described in Japanese Kokai Publication Hei-07-267705; concrete additives comprising, as component A, a copolymer of a polyalkylene glycol(meth)acrylate and (meth)acrylic acid (or a salt thereof), as component B, a specific polyethylene glycol-polypropylene glycol compound and, as component C, a specific surfactant, as described in JP 2508113; copolymers of polyethylene(propylene)glycol (meth)acrylate or polyethylene(propylene)glycol mono(meth)allyl ether, (meth)allylsulfonic acid (or a salt thereof) and (meth)acrylic acid (or a salt thereof), as described in Japanese Kokai Publication Sho-62-216950;

copolymers of polyethylene(propylene)glycol (meth)acrylate, (meth)allylsulfonic acid (or a salt thereof) and (meth)acrylic acid (or a salt thereof), as described in Japanese Kokai Publication Hei-01-226757; copolymers of polyethylene (propylene)glycol(meth)acrylate, (meth)allylsulfonic acid (or a salt thereof) or p-(meth)allyloxybenzenesulfonic acid (or a salt thereof) and (meth)acrylic acid (or a salt thereof), as described in Japanese Kokoku Publication Hei-05-36377; copolymers of polyethylene glycol mono(meth)allyl ether and maleic acid (or a salt thereof), as described in Japanese Kokai Publication Hei-04-149056; copolymers of polyethylene glycol(meth)acrylate, (meth)allylsulfonic acid (or a salt thereof), (meth)acrylic acid (or a salt thereof), an alkanediol mono(meth)acrylate, a polyalkylene glycol mono(meth)acrylate and an α,β-unstated monomer having an amide group within the molecule, as described in Japanese Kokai Publication Hei-05-170501; copolymers of polyethylene glycol mono(meth)allyl ether, polyethylene glycol mono(meth)acrylate, an alkyl (meth)acrylate, (meth)acrylic acid (or a salt thereof) and (meth)allylsulfonic acid (or a salt thereof) or p-(meth)allyloxybenzenesulfonic acid (or a salt thereof), as described in JP Kokai H06-191918; copolymers of an alkoxypolyalkylene glycol monoallyl ether and maleic anhydride, or hydrolyzates thereof, or salts thereof, as described in Japanese Kokai Publication Hei-05-43288; copolymers of polyethylene glycol monoallyl ether, maleic acid and a monomer copolymerizable with these monomers, or salts thereof, or esters thereof, as described in Japanese Kokoku Publication Sho-58-38380;

copolymers of a polyalkylene glycol mono(meth)acrylate monomer, a (meth)acrylic acid monomer and a monomer copolymerizable with these monomers, as described in Japanese Kokoku Publication Sho-59-18338; copolymers of a (meth)acrylic acid ester having a sulfonic acid group and a monomer coplymerizable with these as necessary, or salts thereof, as described in Japanese Kokai Publication Sho-62-119147; esterification reaction products from a copolymer of an alkoxypolyalkylene glycol monoallyl ether and maleic anhydride and an alkenyl-terminated polyoxyalkylene derivative, as described in Japanese Kokai Publication Hei-06-271347; esterification reaction products from a copolymer of an alkoxypolyalkylene glycol monoallyl ether and maleic anhydride and a hydroxy-terminated polyoxyalkylene derivative, as described in Japanese Kokai Publication Hei-06-298555; copolymers of alkenyl ether monomer obtained by addition of an ethylene oxide to a specific unsaturated alcohol, such as 3-methyl-3-buten-1-ol, an unsaturated carboxylic acid monomer and a monomer copolymerizable with these, or salts thereof as described in Japanese Kokai Publication Sho-62-68806 or like polycarboxylic acids (or salts thereof). These cement dispersants may be used singly or two or more of them may be used in combination. In particular, among the above cement dispersants that can be used in combination, various polycarboxylic acid dispersants having a polyoxyalkylene chain(s) and carboxyl groups within the molecule are preferably used in combination and, as typical examples of the polycarboxylic acid dispersants, there may be mentioned those copolymers shown in Table 1.

TABLE 1

| Monomer 1 | | Monomer 2 | Proportions (weight %) | |
|---|---|---|---|---|
| Species | Average number of moles added | Species | Monomer 1 | Monomer 2 |
| PGM | 15 | SMAA | 70 | 30 |
| PGM | 25 | SMAA | 80 | 20 |
| PGM | 120 | SMAA | 90 | 10 |
| PGA | 15 | SA | 80 | 20 |
| PGA | 25 | SA | 85 | 15 |
| PGA | 120 | SA | 90 | 10 |
| IPN | 10 | SMA | 75 | 25 |
| IPN | 50 | SMA | 85 | 15 |
| IPN | 100 | SMA | 92 | 8 |
| PAL | 35 | SMA | 80 | 20 |
| PML | 75 | SMA | 90 | 10 |
| IPN | 10 | SA | 80 | 20 |
| IPN | 50 | SA | 85 | 15 |
| IPN | 100 | SA | 92 | 8 |
| PAL | 35 | SA | 80 | 20 |
| PAL | 150 | SA | 85 | 15 |
| PML | 75 | SA | 85 | 15 |
| PML | 120 | SA | 95 | 5 |

PAL: Polyethylene glycol monoallyl ether
PML: Polyethylene glycol monomethallyl ether
IPM: Polyethylene glycol mono(3-methyl-3-butenyl) ether
PGM: Methoxypolyethylene glycol methacrylate
PGA: Methoxypolyethylene glycol acrylate
SMAA: Sodium methacrylate
SA: Sodium acrylate
SMA: Sodium maleate In cases when said cement dispersant is used in combination, the formulation weight amount between the above cement additive and the above cement dispersant is preferably within the range of 5 to 95:95 to 5, more preferably 10 to 90:90 to 10, although it cannot be definitely determined according to the cement dispersant species and mix formulation employed, the test conditions and other factors.

Furthermore, the above cement additives can be used in combination with other cement additives. As said other cement additives, those known other cement additives (admixtures) shown below are suitable.

(1) Water-soluble macromolecular substances; unsaturated carboxylic acid polymers such as polyacrylic acid (sodium salt), polymethacrylic acid (sodium salt), polymaleic acid (sodium salt) and acrylic acid-maleic acid copolymer sodium salt; polyoxyethylene or polyoxypropylene polymers or copolymers thereof, such as polyethylene glycol and polypropylene glycol; nonionic cellulose ethers such as methylcellulose, ethylcellulose, hydroxymethylcellulose, hydroxyethylcellulose, carboxymethylcellulose, carboxyethylcellulose and hydroxypropylcellulose; polysaccharides produced by microbial fermentation, such as yeast glucans, xanthan gum, β-1,3-glucans (which may be straight chained or branched; e.g. curdlan, paramylum, pachyman, scleroglucan, laminaran); polyacrylamide; polyvinyl alcohol; starch; starch phosphate; sodium alginate; gelatin; amino-containing acrylic acid copolymers and quaternization products derived therefrom; and the like;

(2) Polymer emulsions; copolymers of various vinyl monomers such as alkyl(meth)acrylates; and the like;

(3) Retarders; oxycarboxylic acids (or salts thereof) and inorganic or organic salts, such as gluconic acid, glucoheptonic acid, arabonic acid, malic acid and citric acid, and sodium, potassium, calcium, magnesium, ammonium and triethanolamine salts thereof; saccharides, for example monosaccharides, disaccharides, trisaccharides and like oligosaccharides, such as glucose, fructose, galactose, saccharose, xylose, apiose, ribose and isomerized saccharide, oligosaccharides such as dextrin, polysaccharides such as dextran, molasses and like mixtures containing these; sugar alcohols such as sorbitol; magnesium fluorosilicate; phosphoric acid and salts thereof or borate esters; aminocarboxylic acids and salts thereof; alkali-soluble proteins; humic acid; tannic acid; phenols; polyhydric alcohols such as glycerol; phosphonic acids and derivatives thereof, such as aminotri (methylenephosphonic acid), 1-hydroxyethylidene-1,1-diphosphonic acid, ethylenediaminetetra(methylenephosphonic acid), diethylenetriaminepenta (methylenephosphonic acid) and alkali metal salts and alkaline earth metal salts of these; and the like;

(4) Accelerators or high-early-strength agents; soluble calcium salts such as calcium chloride, calcium nitrite, calcium nitrate, calcium bromide and calcium iodide; chlorides such as iron chloride and magnesium chloride; sulfate salts; potassium hydroxide; sodium hydroxide; carbonate salts; thiosulfate salts; formic acid and formate salts such as calcium formate; alkanolamines; alumina cement; calcium aluminosilicate; and the like;

(5) Mineral oil antifoaming agents; kerosene, liquid paraffin, etc.;

(6) Fat or oil antifoaming agents; animal/vegetable oils, sesame oil, castor oil, alkylene oxide adducts derived from these, and the like;

(7) Fatty acid antifoaming agents; oleic acid, stearic acid, alkylene oxide adducts derived from these, and the like;

(8) Fatty acid ester antifoaming agents; glycerol monoricinolate, alkenylsuccinic acid derivatives, sorbitol monolaurate, sorbitol trioleate, natural waxes, etc.;

(9) oxyalkylene antifoaming agents; polyoxyalkylenes such as (poly)oxyethylene-(poly)oxypropylene adducts; (poly) oxyalkyl ethers such as diethylene glycol heptyl ether, polyoxyethylene oleyl ether, polyoxypropylene butyl ether, polyoxyethylene-polyoxypropylene 2-ethylhexyl ether and oxyethylene-oxypropylene adducts of higher alcohols containing 12 to 14 carbon atoms; (poly)oxyalkylene (alkyl)aryl ethers such as polyoxypropylene phenyl ether and polyoxyethylene nonylphenyl ether; acetylene ethers derived from acetylene alcohol by addition polymerization of an alkylene oxide, such as 2,4,7,9-tetramethyl-5-decyne-4,7-diol, 2,5-dimethyl-3-hexyne-2,5-diol and 3-methyl-1-butyn-3-ol; (poly)oxyalkylene fatty acid esters such as diethylene glycol oleate, diethylene glycol laurate and ethylene glycol distearate; (poly)oxyalkylenesorbitan fatty acid esters such as polyoxyethylenesorbitan monolaurate and polyoxyethylenesorbitan trioleate; (poly)oxyalkylene alkyl(aryl)ether sulfate ester salts such as sodium polyoxypropylenemethyl ether sulfate and sodium polyoxyethylene dodecylphenol ether sulfate; (poly)oxyalkylenealkyl phosphate esters such as (poly)oxyethylenestearyl phosphate; (poly)oxyalkylenealkylamines such as polyoxyethylenelaurylamine; polyoxyalkyleneamides; etc.;

(10) Alcohol antifoaming agents; octyl alcohol, hexadecyl alcohol, acetylene alcohol, glycols, etc.;
(11) Amide antifoaming agents; acrylate polyamines etc.;
(12) Phosphate ester antifoaming agents; tributyl phosphate, sodium octyl phosphate, etc.;
(13) Metal soap antifoaming agents; aluminum stearate, calcium oleate, etc.;
(14) Silicone antifoaming agents; dimethylsilicone oils, silicone pastes, silicone emulsions, organic modified polysiloxanes (polyorganosiloxanes such as dimethylpolysiloxane), fluorosilicone oils, etc.;
(15) AE (air-entraining) agents; resin soaps, saturated or unsaturated fatty acids, sodium hydroxystearate, lauryl sulfate, ABSs (alkylbenzenesulfonates), LAS (linear alkylbenzenesulfonates), alkanesulfonates, polyoxyethylene alkyl(phenyl)ethers, polyoxyethylene alkyl(phenyl)ether sulfates and salts thereof, polyoxyethylene alkyl(phenyl) ether phosphates and salts thereof, proteinous materials, alkenylsulfosuccinic acids, α-olefinsulfonates, etc.;
(16) Other surfactants; polyalkylene oxide derivatives produced by addition of not less than 10 moles of an alkylene oxide, such as ethylene oxide and/or propylene oxide to monohydric aliphatic alcohol containing 6 to 30 carbon atoms, such as octadecyl alcohol or stearyl alcohol, a monohydric alicyclic alcohol containing 6 to 30 carbon atoms, such as abietyl alcohol, a monomercaptan containing 6 to 30 carbon atoms, such as dodecyl mercaptan, an alkylphenol containing 6 to 30 carbon atoms, such as nonylphenol, an amine containing 6 to 30 carbon atoms, such as dodecylamine, or a carboxylic acid containing 6 to 30 carbon atoms, such as lauric acid or stearic acid; alkyl diphenyl ether sulfonate salts containing two sulfo-containing phenyl groups, which may have an alkyl or alkoxy group as a substituent, bound together by ether bonding; various anionic surfactants, various cationic surfactants such as alkylamine acetates and alkyltrimethylammonium chlorides; various nonionic surfactants; various amphoteric surfactants; and the like;
(17) Water-proof agents; fatty acids (salts), fatty acid esters, fats and oils, silicones, paraffins, asphalts, waxes, etc.;
(18) Corrosion inhibitors; nitrite salts, phosphate salts, zinc oxide, etc.;
(19) Crack inhibitors; polyoxyalkylene alkyl ethers; alkanediols such as 2-methyl-2,4-pentanediol; etc.;
(20) Expansive additives; ettringite materials, coals, etc.

As other known cement additives (admixtures), there may be mentioned cement wetting agents, thickening agents, segregation inhibitors, flocculants, agents to reduce drying shrinkage, agents to increase strength, self-leveling agents, corrosion inhibitors, color difference agents, antifungal agents, blast-furnace slag, fly ash, cinder ash, clinker ash, husk ash, silica fume, silica powder, gypsum and so forth. These known cement additives (admixtures) may be used singly or two or more of them may be used in combination.

As particularly preferred embodiments of the components other than cement and water in the above cement composition, there may be mentioned following (1) to (7).
(1) A combination comprising two components as essential ones, namely ① the cement additive of the present invention and ② an oxyalkylene antifoaming agent. The formulation weight ratio of ② the oxyalkylene antifoaming agent is preferably within the range of 0.001 to 10% by weight relative to ① the cement additive.
(2) A combination comprising three components as essential ones, namely ① the cement additive of the invention, ② a polycarboxylic acid dispersant and ③ an oxyalkylene antifoaming agent. The formulation weight ratio between ① the cement additive and ② the copolymer is preferably within the range of 5/95 to 95/5, more preferably 10/90 to 90/10. The formulation weight ratio of ③ the oxyalkylene antifoaming agent is preferably within the range of 0.001 to 10% by weight relative to the total amount of ① the cement additive and ② polycarboxylic acid dispersant.
(3) A combination comprising two components as essential ones, namely ① the cement additive of the present invention and ② a sulfonic acid dispersant having sulfonic acid groups within the molecule. Usable as the sulfonic acid dispersant are ligninsulfonic acid salts, naphthalenesulfonic acid-formalin condensates, melaminesulfonic acid-formalin condensates, polystyrenesulfonic acid salts, aminoarylsulfonic acid-phenol-formaldehyde condensates and like aminosulfonic acid dispersants. The formulation weight ratio between ① the cement additive and ② the sulfonic acid dispersant having sulfonic acid groups within the molecule is preferably 5/95 to 95/5, more preferably 10/90 to 90/10.
(4) A combination comprising two components as essential ones, namely ① the cement additive of the present invention and ② a ligninsulfonic acid salt. The formulation weight ratio between ① the cement additive and ② the ligninsulfonic acid salt is preferably 5/95 to 95/5, more preferably 10/90 to 90/10.
(5) A combination comprising two components as essential ones, namely ① the cement additive of the present invention and ② a segregation reducing agent. Usable as the segregation reducing agent are nonionic cellulose ethers and like various thickening agents. The formulation weight ratio between ① the cement additive and ② the segregation reducing agent is preferably 10/90 to 0.99.99/0.01, more preferably 50/50 to 99.9/0.1. A cement composition comprising this combination is suitable as high-fluidity concrete, self compacting concrete and a self leveling material.
(6) A combination comprising two components as essential ones, namely ① the cement additive of the present invention and ② a retarder. Usable as the retarder are hydroxy carboxylic acids such as gluconic acid (salts) and citric acid (salts), saccharides such as glucose, sugar alcohols such as sorbitol, phosphonic acids such as aminotri(methylenephosphonic acid), and the like. The formulation weight ratio between ① the cement additive and ② the retarder is preferably within the range of 50/50 to 99.9 to 0.1, more preferably the range of 70/30 to 99/1.
(7) A combination comprising two components as essential ones, namely ① the cement additive of the present invention and ② an accelerator. Usable as the accelerator are soluble calcium salts such as calcium chloride, calcium nitrite and calcium nitrate, chlorides such as iron chloride and magnesium chloride, thiosulfates, formic acid and formic acid salts such as calcium formate, among others. The formulation weight ratio between ① the cement additive and ② the accelerator is preferably within the range of 10/90 to 99.9/0.1, more preferably 20/80 to 99/1.

The cement additive mentioned above may be used in combination not only with the above-mentioned cement dispersants and/or cement additives (admixtures) known in the art but also with additives for improving the dispersibility and/or foaming suppressing property of cement compositions.

As for the method of adding the above cement additive and the above cement dispersant to a cement composition, it is preferable to mix such cement additive and cement dispersant together to give a cement additive to thereby facilitate the incorporation thereof into the cement composition.

Cement compositions containing the above cement additive are excellent in fluidity and in fluidity retention properly, hence excellent in water reducing capacity and workability, and, in addition, give hardening products excellent in strength and durability. Therefore, the cement additive comprising the polycarboxylic acid copolymer of the present invention can suitably be used in ultrahigh strength concrete and can produce sufficient effects as a water reducing agent for ultrahigh strength concrete.

As regards the formulation, materials to be used and method of mixing of or in the above-mentioned ultrahigh strength concrete, the descriptions in Report of the Annual Meeting of Architectural Institute of Japan (Kanto) (2001-9.), pages 197-200, the Abstracts of Lectures in the 56th Annual Meeting of Japan Society of Civil Engineers, Part V, V-137 ("A Discussion on the strength manifestation in ultrahigh strength concrete") (2001), pages 274-275, and so forth may be referred to. For reference, several preferred embodiments of the present invention are given below in the following by way of example.

TABLE 2

Concrete formulations - 1 (designed air content 2.0% by volume)

| W/C (weight %) | s/a (volume %) | Unit weight (kg/m$^3$) | | | | Mortar mixing time (sec) |
|---|---|---|---|---|---|---|
| | | W | C | S | G | |
| 25.0 | 47.2 | 150 | 600 | 772 | 861 | 60 |
| 22.0 | 45.0 | | 682 | 703 | | |
| 20.0 | 42.9 | | 750 | 646 | | |
| 18.0 | 40.1 | | 833 | 577 | | |
| 16.0 | 36.3 | | 938 | 490 | | 90 |
| 14.0 | 30.5 | | 1071 | 378 | | 120 |

In the following, mention is made referring to Table 2.

"W/C (weight %)" is the weight percentage of water relative to cement and "s/a (volume %) is the volume percentage of the fine aggregate relative to the total aggregate (fine aggregate+coarse aggregate). W is the unit water content, C is the unit cement content, S is the unit fine aggregate content, and G is the unit coarse aggregate content. a is the absolute volume of the total aggregate (fine aggregate+coarse aggregate) and s is the absolute volume of fine aggregate.

(Materials Used)
Cement: Silica fume cement produced by Ube Mitsubishi Cement (density=3.08 g/cm$^3$, Blaine specific surface area=5,600 cm$^2$/g)
Fine aggregate: Ohigawa land sand (density in saturated surface-dry condition=2.57 g/cm$^3$, absorption=2.15%, F.M.=2.76)
Coarse aggregate: Oume crushed stone (density in saturated surface-dry condition=2.65 g/cm$^3$, solid content=0.59, F.M.=6.74, M.S.=20 mm)

(Mixing Method)
Each batch of 30 liters is mixed according to the following procedure using a 55-liter forced biaxial mixer.
The cement and fine aggregate are mixed together for 10 seconds, water with the cement additive added thereto is then admixed and the mixture is further mixed for a period defined in Table 2 as "mortar mixing time (sec)". Thereafter, the coarse aggregate is admixed, followed by 90 seconds of mixing to give an ultrahigh strength concrete mix.

TABLE 3

Concrete formulation - 2
Powder system compounded of low-heat portland cement and a fine silica fume powder in a weight ratio of 9:1
(designed air content 2.0% by volume)

| W/B (weight %) | s/a (volume %) | Unit weight (kg/m$^3$) | | | | |
|---|---|---|---|---|---|---|
| | | W | C | SF | S | G |
| 30.0 | 47.2 | 160 | 533 | 0 | 794 | 861 |
| 22.0 | 45.0 | 150 | 614 | 68 | 729 | |
| 18.0 | 42.9 | | 750 | 83 | 603 | |
| 15.0 | 40.1 | | 900 | 100 | 463 | |
| 12.0 | 36.3 | | 1125 | — | — | |

In the following, mention is made referring to Table 3.

W/B (weight %) is the weight percentage of water relative to the binders (cement and silica fume), and s/a (volume %) is the volume percentage of fine aggregate relative to total aggregates (fine aggregates and coarse aggregates). W is the unit water content, B is the unit binder content, namely the combined total of cement and the fine silica fume powder (B=C+SF), C is the unit cement content, SF is the unit fine silica fume powder content, S is the unit weight of the fine aggregate and G is the unit coarse aggregate content. a is the absolute volume of the total aggregates (fine aggregates and coarse aggregates) and s is the absolute volume of the fine aggregate.

(Materials Used)
Cement: Low-heat portland cement (density=3.22 g/cm$^3$, Blaine specific surface area=3,280 cm$^2$/q)
Fine aggregate: Ohigawa land sand (density in saturated surface-dry condition=2.57 g/cm$^3$, absorption=2.15%, F.M.=2.76)
Coarse aggregate: Oume crushed stone (density in saturated surface-dry condition=2.65 g/cm$^3$, solid content=0.59, F.M.=6.74, M.S.=20 mm)

(Mixing Method)
Each batch of 30 liters is mixed according to the following procedure using a 55-liter forced biaxial mixer.
The cement, fine silica fume powder and fine aggregate are mixed together for 60 seconds, water with the cement additive added thereto is then admixed therewith and, after confirmation of the uniformity of mixing of the mortar, mixing is further performed for 30 seconds. Thereafter, the coarse aggregate is admixed, followed by 90 seconds of mixing to give an ultrahigh strength concrete.

BEST MODES FOR CARRYING OUT THE INVENTION

Figure 1:
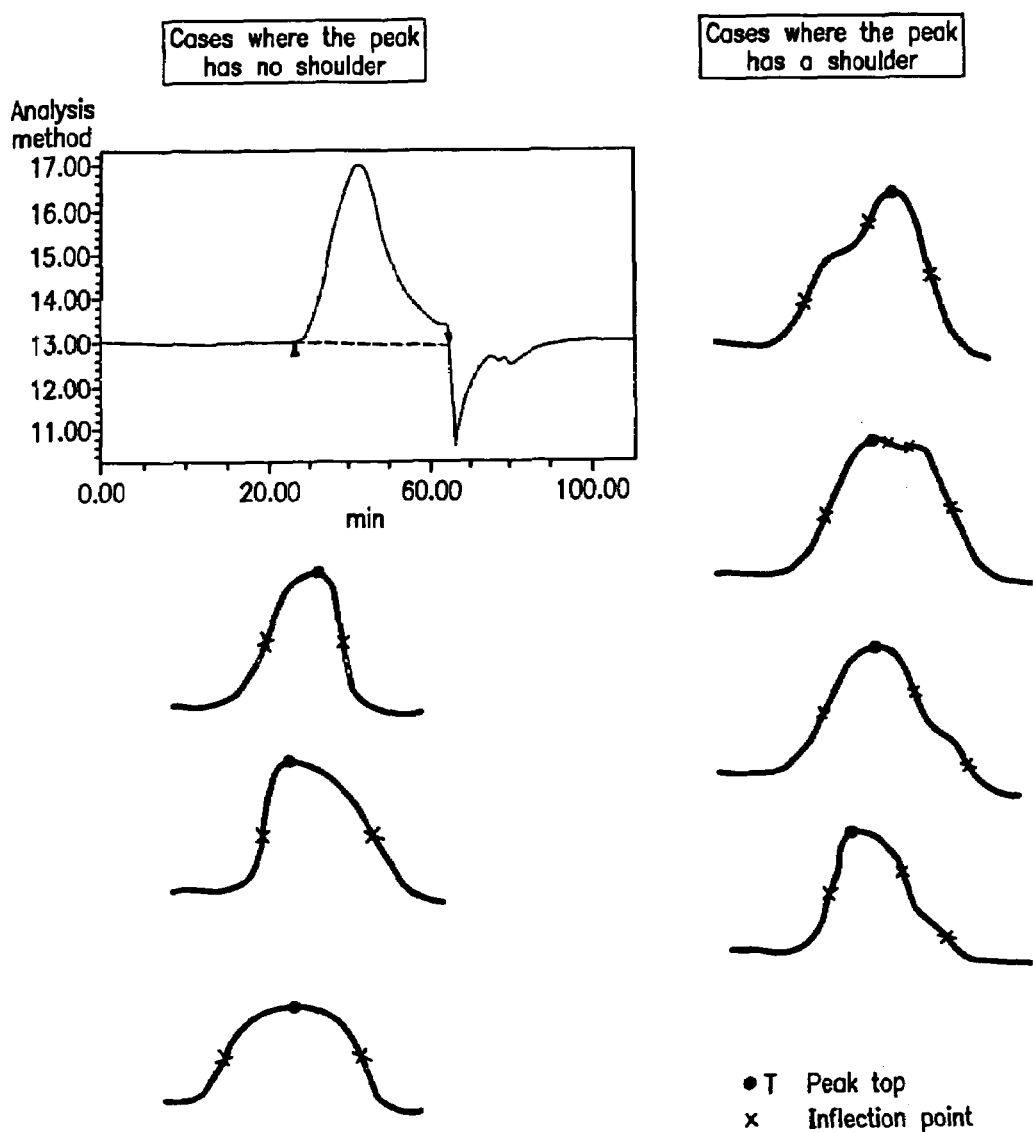
FIG. 1 is an example for explaining, referring to GPC peaks, the case of a peak having no shoulder and the case of a peak having a shoulder.
Figure 2:
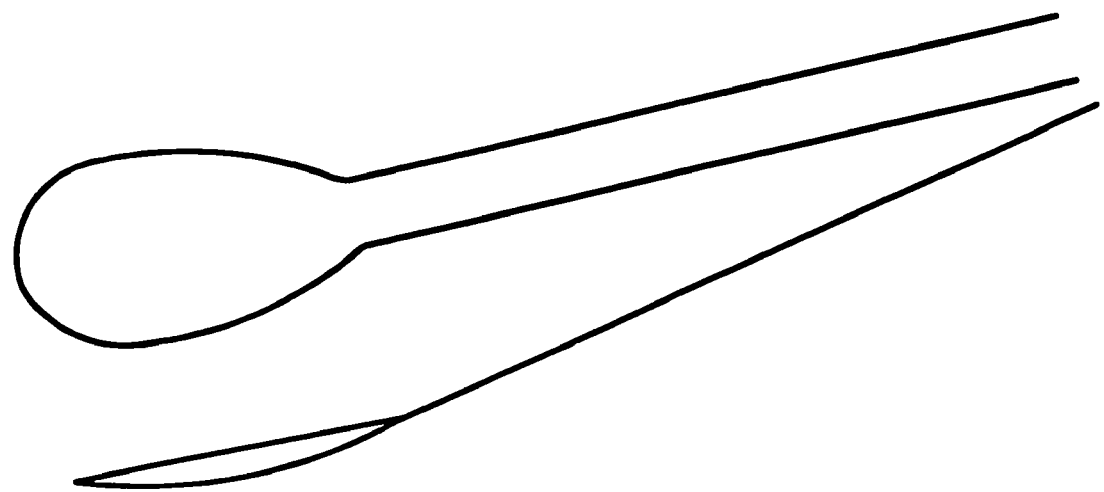
FIG. 2 is a schematic representation of a spatula (made of stainless steel) to be used in determining the cement performance coefficient and calcium transfer value.
Figure 2:
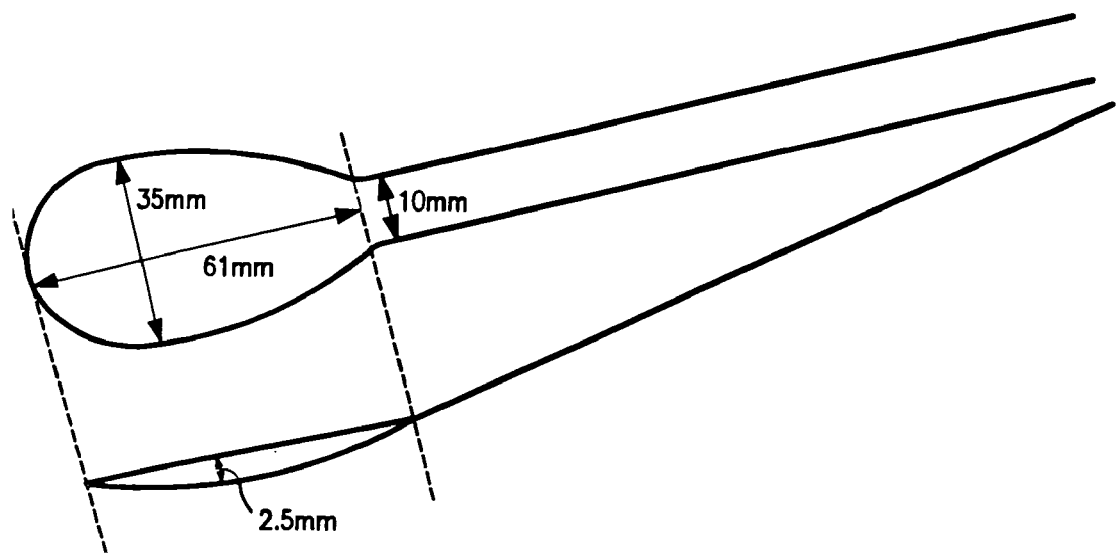
Figure 3:
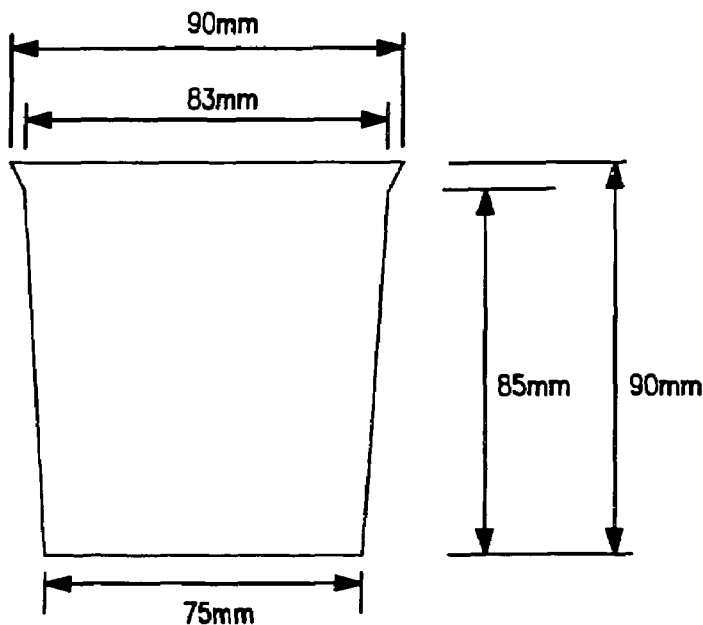
FIG. 3 is a schematic representation of a Newdes cup (300 mL) (product of Teraoka Co.) to be used in determining the cement performance coefficient and calcium transfer value.
Figure 4:
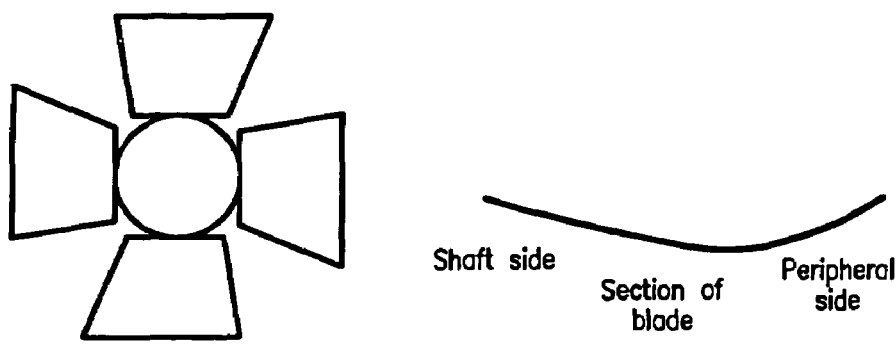
FIG. 4 is a schematic representation of the screw (four-blade) of a homomixer to be used in determining the calcium transfer value.
Figure 4:
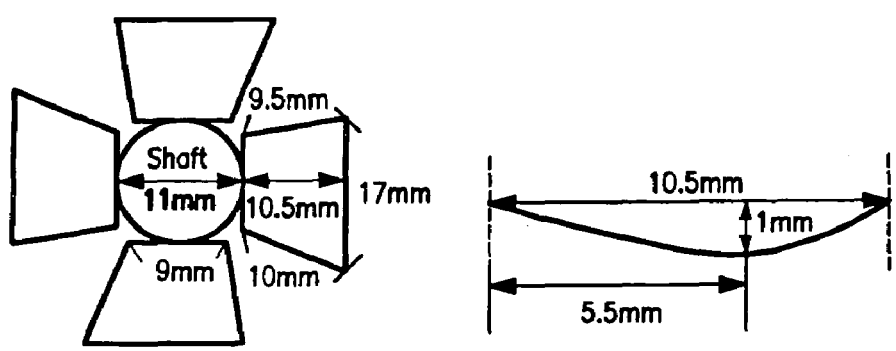

The following examples illustrate the present invention in further detail. These examples are by no means limitative of the scope of the present invention, however. Unless otherwise specified, "%" means "% by weight".

EXAMPLE 1

A glass-made reaction apparatus equipped with a thermometer, stirrer, dropping device, nitrogen inlet tube and reflux condenser was charged with 500 parts of a polyethyleneimine-ethylene oxide adduct (compound obtained by addition of 3 moles, on average, of ethylene oxide to active hydrogen atoms of polyethyleneimine with Mw 600), the reaction apparatus inside was purged with nitrogen with stirring, and the contents were cooled to 20° C. or below in a nitrogen atmosphere. While the reaction system was maintained at 20° C. or below, 44.3 parts of glycidyl methacrylate was added over 1 hour. After completion of the addition, stirring was continued at 20° C. or below for 1 hour to give a polyethyleneimine-ethylene oxide adduct monomer (polyethyleneimine-EO adduct macromer).

EXAMPLE 2

A glass-made reaction apparatus equipped with a thermometer, stirrer, dropping device, nitrogen inlet tube and reflux condenser was charged with 500 parts of a polyethyleneimine-ethylene oxide adduct (compound obtained by addition of 3 moles, on average, of ethylene oxide to active hydrogen atoms of polyethyleneimine with Mw 600), the reaction apparatus inside was purged with nitrogen with stirring, and the contents were cooled to 20° C. or below in a nitrogen atmosphere. While the reaction system was maintained at 20° C. or below, 51.2 parts of methacrylic acid anhydride was added over 1 hour. After completion of the addition, stirring was continued at 20° C. or below for 1 hour to give a polyethyleneimine-ethylene oxide adduct monomer (polyethyleneimine-EO adduct macromer).

EXAMPLE 3

A glass-made reaction apparatus equipped with a thermometer, stirrer, dropping device, nitrogen inlet tube and reflux condenser was charged with 984.3 parts of water, the reaction apparatus inside was purged with nitrogen with stirring, and the contents were heated to 80° C. in a nitrogen atmosphere. An aqueous monomer solution composed of 625.5 parts of methoxypolyethylene glycol monomethacrylate (average number of moles of ethylene oxide added 25), 166.0 parts of methacrylic acid, 208.5 parts of the polyethyleneimine-EO adduct macromer synthesized in Example 1, 250.0 parts of water and 15.7 parts of 3-mercaptopropionic acid as chain transfer agent, and 200.0 parts of a 10.4% aqueous solution of ammonium persulfate were added dropwise over 2 hours. After completion of the dripping, 50.0 parts of a 10.4% aqueous solution of ammonium persulfate was further added dropwise over 0.5 hour. Thereafter, the temperature was maintained at 80° C. for the succeeding 2 hours to drive the polymerization reaction to completion, whereby an aqueous solution of a polycarboxylic acid copolymer with a weight average molecular weight of 17,400 was obtained.

EXAMPLE 4

A glass-made reaction apparatus equipped with a thermometer, stirrer, dropping device, nitrogen inlet tube and reflux condenser was charged with 117.2 parts of water, the reaction apparatus inside was purged with nitrogen with stirring, and the contents were heated to 80° C. in a nitrogen atmosphere. An aqueous monomer solution composed of 69.5 parts of methoxypolyethylene glycol monomethacrylate (average number of moles of ethylene oxide added 25), 25.2 parts of methacrylic acid, 25.3 parts of the polyethyleneimine-EO adduct macromer synthesized in Example 1, 30.0 parts of water and 2.8 parts of 3-mercaptopropionic acid as chain transfer agent, and 24.0 parts of a 10.4% aqueous solution of ammonium persulfate were added dropwise over 2 hours. After completion of the dripping, 6.0 parts of a 10.4% aqueous solution of ammonium persulfate was further added dropwise over 0.5 hour. Thereafter, the temperature was maintained at 80° C. for the succeeding 2 hours to drive the polymerization reaction to completion, whereby an aqueous solution of a polycarboxylic acid copolymer with a weight average molecular weight of 14,000 was obtained.

EXAMPLE 5

A glass-made reaction apparatus equipped with a thermometer, stirrer, dropping device, nitrogen inlet tube and reflux condenser was charged with 1458.2 parts of water, the reaction apparatus inside was purged with nitrogen with stirring, and the contents were heated to 80° C. in a nitrogen atmosphere. An aqueous monomer solution composed of 581.7 parts of methoxypolyethylene glycol monoacrylate (average number of moles of ethylene oxide added 23), 149.5 parts of acrylic acid, 203.0 parts of water and 20.2 parts of 3-mercaptopropionic acid as chain transfer agent, an aqueous solution composed of 198.8 parts of the polyethyleneimine-EO adduct macromer synthesized in Example 1 and 198.8 parts of water, and 248.0 parts of a 15% aqueous solution of sodium persulfate were added dropwise over 2 hours. After completion of the dripping, 62.0 parts of a 15% aqueous solution of sodium persulfate was further added dropwise over 0.5 hour. Thereafter, the temperature was maintained at 80° C. for the succeeding 2 hours to drive the polymerization reaction to completion, whereby an aqueous solution of a polycarboxylic acid copolymer with a weight average molecular weight of 11,300 was obtained.

EXAMPLE 6

A glass-made reaction apparatus equipped with a thermometer, stirrer, dropping device, nitrogen inlet tube and reflux condenser was charged with 1455.3 parts of water, the reaction apparatus inside was purged with nitrogen with stirring, and the contents were heated to 80° C. in a nitrogen atmosphere. An aqueous monomer-solution composed of 539 parts of methoxypolyethylene glycol monoacrylate (average number of moles of ethylene oxide added 23), 189.2 parts of acrylic acid, 202.9 parts of water and 20.8 parts of 3-mercaptopropionic acid as chain transfer agent, an aqueous solution composed of 201.9 parts of the polyethyleneimine-EO adduct macromer synthesized in Example 1 and 201.9 parts of water, and 248 parts of a 15% aqueous solution of sodium persulfate were added dropwise over 2 hours. After completion of the dripping, 62 parts of a 15% aqueous solution of sodium persulfate was further added dropwise over 0.5 hour. Thereafter, the temperature was maintained at 80° C. for the succeeding 2 hours to drive the polymerization reaction to completion, whereby an aqueous solution of a polycarboxylic acid copolymer with a weight average molecular weight of 11,000 was obtained.

EXAMPLE 7

A glass-made reaction apparatus equipped with a thermometer, stirrer, dropping device, nitrogen inlet tube and reflux condenser was charged with 117.2 parts of water, the reaction apparatus inside was purged with nitrogen with stirring, and the contents were heated to 80° C. in a nitrogen atmosphere. An aqueous monomer solution composed of 69.5 parts of methoxypolyethylene glycol monomethacrylate (average number of moles of ethylene oxide added 25), 25.2 parts of methacrylic acid, 25.3 parts of the polyethyleneimine-EO adduct macromer synthesized in Example 2, 30 parts of water and 2.8 parts of 3-mercaptopropionic acid as chain transfer agent, and 24.0 parts of a 10.4% aqueous solution of ammonium persulfate were added dropwise over 2 hours. After completion of the dripping, 6.0 parts of a 10.4% aqueous solution of ammonium persulfate was further added dropwise over 0.5 hour. Thereafter, the temperature was maintained at 80° C. for the succeeding 2 hours to drive the polymerization reaction to completion, whereby an aqueous solution of a polycarboxylic acid copolymer with a weight average molecular weight of 12,000 was obtained.

EXAMPLE 8

A glass-made reaction apparatus equipped with a thermometer, stirrer, dropping device, nitrogen inlet tube and reflux condenser was charged with 984.3 g of water, the reaction apparatus inside was purged with nitrogen with stirring, and the contents were heated to 80° C. in a nitrogen atmosphere. An aqueous monomer solution composed of 603.9 g of methoxypolyethylene glycol monomethacrylate (average number of moles of ethylene oxide added 25), 187.6 g of methacrylic acid, 208.5 g of the polyethyleneimine-EO adduct macromer synthesized in Example 1, 250 g of water and 18 g of 3-mercaptopropionic acid, and 20.0 g of a 10.4% aqueous solution of ammonium persulfate were added dropwise over 2 hours. After completion of the dripping, 50 g of a 10.4% aqueous solution of ammonium persulfate was further added dropwise over 30 minutes. Thereafter, the temperature was maintained at 80° C. for the succeeding 2 hours to drive the polymerization reaction to completion, whereby an aqueous solution of a polycarboxylic acid copolymer with a weight average molecular weight of 12,300 was obtained.

EXAMPLE 9

A glass-made reaction apparatus equipped with a thermometer, stirrer, dropping device, nitrogen inlet tube and reflux condenser was charged with 187.3 g of deionized water, the reaction system was heated to 65° C. in a nitrogen atmosphere and 3.1 g of 30% aqueous solution of hydrogen peroxide was then added. Thereto were added dropwise over 3 hours a mixed solution composed of 532.0 g of a 80% aqueous solution of IPN-25, 1.2 g of L-ascorbic acid and 2.0 g of 1-octanethiol, and a mixed solution composed of 71.6 g of acrylic acid and 36.8 g of deionized water. After completion of the dripping, the mixture was matured at 65° C. for the succeeding 1.5 hours to drive the polymerization reaction to complete. This reaction mixture was adjusted to pH 7 with a 30% aqueous solution of sodium hydroxide to give an aqueous solution of a polycarboxylic acid copolymer with a weight average molecular weight of 36,300.

COMPARATIVE EXAMPLE 1

A glass-made reaction apparatus equipped with a thermometer, stirrer, nitrogen inlet tube and reflux condenser was charged with 99.7 g of water, the reaction apparatus inside was purged with nitrogen with stirring, and the contents were heated to 80° C. in a nitrogen atmosphere. An aqueous monomer solution composed of 79 g of methoxypolyethylene glycol monomethacrylate (average number of moles of ethylene oxide added 25), 21 g of methacrylic acid, 24.7 g of water and 0.66 g of 3-mercaptopropionic acid, and an aqueous initiator solution composed of 1.2 g of ammonium persulfate and 23.8 g of water were added dropwise to the reaction vessel over 4 hours and 5 hours, respectively. After completion of the dripping of the aqueous initiator solution, the temperature was maintained at 80° C. for the succeeding 1 hour to drive the polymerization reaction to completion. After completion of the reaction, the reaction mixture was neutralized to pH 7.0 with a 30% aqueous solution of sodium hydroxide to give a copolymer with a weight average molecular weight of 24,000.

Mortar Preparation Method

Taiheiyo ordinary portland cement (trademark, product of Taiheiyo Cement; 800 g) and 400 g of Toyoura silica sand were subjected to dry mixing in a mortar mixer (trademark: N-50, product of Tesco) at a low rotation speed for 30 seconds. Then, 180 g of water with the polycarboxylic acid copolymer produced in one of Examples or the copolymer produced in the Comparative Example as incorporated therein was added to the dry-mixed mixture of cement and sand, and mortar was prepared by 5 minutes of mixing at a high rotation speed. The polycarboxylic acid copolymer of each Example or the copolymer of Comparative Example was incorporated in an amount such that the solid matter weight percentage thereof relative to the cement weight amounted to the value shown in Table 4. The conditions of dry mixing and mixing in the mortar mixer were made equal in preparing the respective mortar mixtures.

Evaluation Methods (1) Mortar Homogenization Time

During the 5 minutes of high rotation speed mixing following addition of 180 g of water with the polycarboxylic acid copolymer or copolymer incorporated therein to the dry-mixed mixture of cement and sand, the time (seconds) required for the mortar to become homogeneous was determined by visual observation and reported as the mortar homogenization time. The results obtained are shown in Table 4.

(2) Flow Value

Six minutes after addition of water, the mortar prepared was poured into a hollow cylindrical vessel (diameter 55 mm, height 50 mm) placed on a stainless steel plate. Then, this hollow cylindrical vessel was lifted up vertically, and the diameters of the mortar spread on the stainless steel plate were measured in two directions perpendicular to each other and the average value thereof was reported as the flow value (mm). A higher flow value indicates a higher degree of fluidity. The results are shown in Table 4.

(3) Penetration Time

The mortar prepared was poured into a cement paste vessel defined in JIS R 5201 and, after 15 minutes or 75 minutes of standing, the tip of a Vicat needle apparatus equipped with a standard rod defined in JIS R 5201 was brought into contact with the mortar in the cement paste vessel and then allowed to fall. The time required for the standard rod to reach the bottom of the cement paste vessel was reported as the penetration time (seconds). A longer penetration time indicates that the mortar has a higher viscosity. The results are shown in Table 4.

TABLE 4

|  | Polycarboxylic acid copolymer | | | Copolymer |
| --- | --- | --- | --- | --- |
|  | Ex. 3 | Ex. 7 | Ex. 8 | Compar. Ex. 1 |
| Amount of addition (weight %/cement) | 0.53 | 0.53 | 0.49 | 0.32 |
| Flow value (mm) | 190 | 186 | 196 | 192 |
| Mortar penetration time (sec) after 15 minutes | 0.9 | 0.91 | 0.44 | 0.95 |
| Mortar penetration time (sec) after 75 minutes | 1.26 | 1.3 | 0.59 | 1.65 |

When the mortar penetration times after 15 minutes and after 75 minutes were compared between the copolymer of Comparative Example 1, which did not contain the polyethyleneimine-EO adduct macromer, and the polycarboxylic acid copolymers of Examples, which contained the polyethyleneimine-EO adduct macromer, the penetration time after 75 minutes was 1.65 seconds for the copolymer of Comparative Example 1 while the penetration times were very short, namely 0.59 to 1.30 seconds, for the polycarboxylic acid copolymers of Examples, indicating that the mortar viscosities are lower as compared with the mortar prepared using the copolymer of Comparative Example 1. It was thus found that the polyethyleneimine-EO adduct macromer-containing polycarboxylic acid copolymers are effective in reducing the viscosity of mortar.

EXAMPLE 10

A glass-made reaction apparatus equipped with a thermometer, stirrer, dropping device, nitrogen/air inlet tube and reflux condenser was charged with 300 parts of a sorbitol-ethylene oxide adduct (compound obtained by addition of 10 moles, on average, of ethylene oxide to hydroxyl groups of sorbitol) and 0.08 part of sodium hydroxide, and the temperature was raised to 90° C. in a nitrogen atmosphere. While the reaction system was maintained at 90° C., 22.9 parts of glycidyl methacrylate was added over 1 hour. After completion of the addition, stirring was continued at 90° C. for 2 hours to give a sorbitol-ethylene oxide adduct monomer (sorbitol-EO adduct macromer).

EXAMPLE 11

A glass-made reaction apparatus equipped with a thermometer, stirrer, dropping device, nitrogen inlet tube and reflux condenser was charged with 82.5 parts of water, the reaction apparatus inside was purged with nitrogen with stirring, and the contents were heated to 80° C. in a nitrogen atmosphere. An aqueous monomer solution composed of 72.3 parts of methoxypolyethylene glycol monomethacrylate (average number of moles of ethylene oxide added 25), 22.5 parts of methacrylic acid, 25.2 parts of the sorbitol-EO adduct macromer synthesized in Example 10, 64.6 parts of water and 2.88 parts of 3-mercaptopropionic acid as chain transfer agent, and 22.5 parts of a 4.6% aqueous solution of ammonium persulfate were added dropwise over 3 hours. After completion of the dripping, 7.5 parts of a 4.6% aqueous solution of ammonium persulfate was further added dropwise over 1 hour. Thereafter, the temperature was maintained at 80° C. for the succeeding 1 hour to drive the polymerization reaction to completion, whereby an aqueous solution of a polycarboxylic acid copolymer with a weight average molecular weight of 16,300 was obtained.

EXAMPLE 12

A glass-made reaction apparatus equipped with a thermometer, stirrer, dropping device, nitrogen/air inlet tube and reflux condenser was charged with 400 parts of a triethylenetetramine-ethylene oxide adduct (compound obtained by addition of 10 moles, on average, of ethylene oxide to —NH groups of triethylenetetramine), and the temperature was raised to 90° C. in an air atmosphere. While the reaction system was maintained at 90° C., 30.6 parts of glycidyl methacrylate was added over 1 hour. After completion of the addition, stirring was continued at 90° C. for 2 hours to give a triethylenetetramine-ethylene oxide adduct monomer (triethylenetetramine-EO adduct macromer).

EXAMPLE 13

A glass-made reaction apparatus equipped with a thermometer, stirrer, dropping device, nitrogen inlet tube and reflux condenser was charged with 83.6 parts of water, the reaction apparatus inside was purged with nitrogen with stirring, and the contents were heated to 80° C. in a nitrogen atmosphere. An aqueous monomer solution composed of 72.3 parts of methoxypolyethylene glycol monomethacrylate (average number of moles of ethylene oxide added 25), 22.5 parts of methacrylic acid, 25.2 parts of the triethylenetetramine-EO adduct macromer synthesized in Example 12, 64.6 parts of water and 1.78 parts of 3-mercaptopropionic acid as chain transfer-agent, and 22.5 parts of a 4.6% aqueous solution of ammonium persulfate were added dropwise over 3 hours. After completion of the dripping, 7.5 parts of a 4.6% aqueous solution of ammonium persulfate was further added dropwise over 1 hour. Thereafter, the temperature was maintained at 80° C. for the succeeding 1 hour to drive the polymerization reaction to completion, whereby an aqueous solution of a polycarboxylic acid copolymer with a weight average molecular weight of 17,000 was obtained.

EXAMPLE 14

A glass-made reaction apparatus equipped with a thermometer, stirrer, dropping device, nitrogen/air inlet tube and reflux condenser was charged with 300 parts of a poly(n=10) glycerol-ethylene oxide adduct (compound obtained by addition of 4 moles, on average, of ethylene oxide to hydroxyl groups of polyglycerol) and 0.08 part of sodium hydroxide, and the temperature was raised to 90° C. in an air atmosphere. While the reaction system was maintained at 90° C., 30.2 parts of glycidyl methacrylate was added over 1 hour. After completion of the addition, stirring was continued at 90° C. for 2 hours to give a polyglycerol-ethylene oxide adduct monomer (polyglycerol-EO adduct macromer).

EXAMPLE 15

A glass-made reaction apparatus equipped with a thermometer, stirrer, dropping device, nitrogen inlet tube and reflux condenser was charged with 82.5 parts of water, the reaction apparatus inside was purged with nitrogen with stirring, and the contents were heated to 80° C. in a nitrogen atmosphere. An aqueous monomer solution composed of 72.3 parts of methoxypolyethylene glycol monomethacrylate (average number of moles of ethylene oxide added 25), 22.5 parts of methacrylic acid, 25.2 parts of the polyglycerol-EO adduct macromer synthesized in Example 14, 64.6 parts of water and 2.88 parts of 3-mercaptopropionic acid as chain transfer agent, and 22.5 parts of a 4.6% aqueous solution of ammonium persulfate were added dropwise over 3 hours. After completion of the dripping, 7.5 parts of a 4.6% aqueous solution of ammonium persulfate was further added dropwise over 1 hour. Thereafter, the temperature was maintained at 80° C. for the succeeding 1 hour to drive the polymerization reaction to completion, whereby an aqueous solution of a polycarboxylic acid copolymer with a weight average molecular weight of 18,900 was obtained.

EXAMPLE 16

A glass-made reaction apparatus equipped with a thermometer, stirrer, dropping device, nitrogen inlet tube and reflux condenser was charged with 83.6 parts of water, the reaction apparatus inside was purged with nitrogen with stirring, and the contents were heated to 80° C. in a nitrogen atmosphere. An aqueous monomer solution composed of 72.3 parts of methoxypolyethylene glycol monomethacrylate (average number of moles of ethylene oxide added 100), 22.5 parts of methacrylic acid, 25.2 parts of the triethylenetetramine-EO adduct macromer synthesized in Example 12, 64.6 parts of water and 1.78 parts of 3-mercaptopropionic acid as chain transfer agent, and 22.5 parts of a 4.6% aqueous solution of ammonium persulfate were added dropwise over 3 hours. After completion of the dripping, 7.5 parts of a 4.6% aqueous solution of ammonium persulfate was further added dropwise over 1 hour. Thereafter, the temperature was maintained at 80° C. for the succeeding 1 hour to drive the polymerization reaction to completion, whereby an aqueous solution of a polycarboxylic acid copolymer with a weight average molecular weight of 47,000 was obtained.

EXAMPLE 17

A glass-made reaction apparatus equipped with a thermometer, stirrer, dropping device, nitrogen/air inlet tube and reflux condenser was charged with 400 parts of a triethylenetetramine-ethylene oxide adduct (compound obtained by addition of 10 moles, on average, of ethylene oxide to —NH groups of triethylenetetramine), and the temperature was raised to 90° C. in an air atmosphere. While the reaction system was maintained at 90° C., 24.6 parts of allylglycidyl ether was added over 1 hour. After completion of the addition, stirring was continued at 90° C. for 2 hours to give a triethylenetetramine-ethylene oxide adduct monomer (triethylenetetramine-EO adduct macromer (2)).

EXAMPLE 18

A glass-made reaction apparatus equipped with a thermometer, stirrer, dropping device, nitrogen inlet tube and reflux condenser was charged with 83.6 parts of water, the reaction apparatus inside was purged with nitrogen with stirring, and the contents were heated to 80° C. in a nitrogen atmosphere. An aqueous monomer solution composed of 72.3 parts of polyethylene glycol mono(3-methyl-3-butenyl) ether (average number of moles of ethylene oxide added 50), 22.5 parts of acrylic acid, 25.2 parts of the triethylenetetramine-EO adduct macromer (2) synthesized in Example 17, 64.6 parts of water and 1.78 parts of 3-mercaptopropionic acid as chain transfer agent, and 22.5 parts of a 4.6% aqueous solution of ammonium persulfate were added dropwise over 3 hours. After completion of the dripping, 7.5 parts of a 4.6% aqueous solution of ammonium persulfate was further added dropwise over 1 hour. Thereafter, the temperature was maintained at 80° C. for the succeeding 1 hour to drive the polymerization reaction to completion, whereby an aqueous solution of a polycarboxylic acid copolymer with a weight average molecular weight of 19,000 was obtained.

Using the copolymers of Examples 16 and 18, mortar were prepared, whereby fluid mortar were obtained. Mortar preparation condition: 800 g of Taiheiyo ordinary portland cement (trademark, product of Taiheiyo Cement) and 400 g of Toyoura standard sand were subjected to dry mixing in a mortar mixer (trademark: N-50, product of Tesco) at a low rotation speed for 30 seconds. Then, 180 g of water with 1.6 g (solid matter basis) of the copolymer produced in Example 26 or 28 as incorporated therein was added to the dry-mixed mixture of cement and sand, and mortar was prepared by 5 minutes of mixing at a high rotation speed.

Cement Performance Coefficient Measurement

According to the <cement performance coefficient measurement method> mentioned hereinabove, the standard amount of addition, viscosity $\mu$ and cement performance coefficient were determined.

Figure 5:
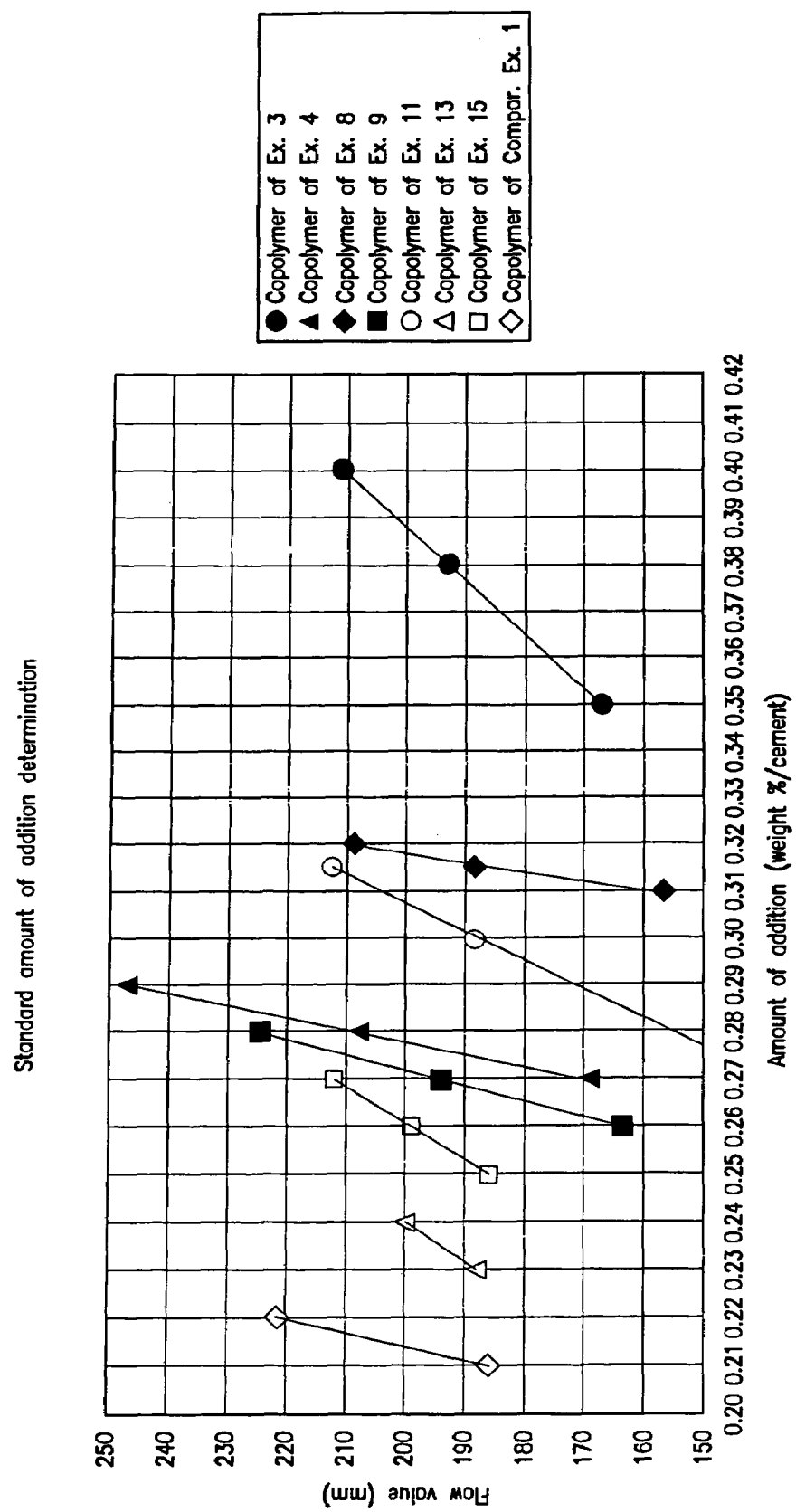
FIG. 5 is a graphic representation of the relationships between the amount of addition of the agent (copolymer) relative to cement and the flow value as found in Examples when the ordinary portland cement is used in determining the standard amount of addition according to the cement performance coefficient determination method.

The agent (copolymer) amount of addition relative to cement and the flow values at those levels as used or found in standard amount of addition determination are shown in Table 5, and the relationships therebetween are shown in FIG. 5. The standard amount of addition, flow values, viscosities after 2 minutes and cement performance coefficients are shown in Table 6.

TABLE 5

| Agent | Amount of addition (weight %/cement) | Flow value (mm) |
|---|---|---|
| Copolymer of Ex. 3 | 0.350 | 167.0 |
| | 0.380 | 193.0 |
| | 0.400 | 211.0 |
| Copolymer of Ex. 4 | 0.270 | 169.0 |
| | 0.280 | 208.0 |
| | 0.290 | 247.0 |
| Copolymer of Ex. 8 | 0.310 | 157.0 |
| | 0.315 | 188.5 |
| | 0.320 | 209.0 |
| Copolymer of Ex. 9 | 0.260 | 163.5 |
| | 0.270 | 194.0 |
| | 0.280 | 224.5 |
| Copolymer of Ex. 11 | 0.250 | 104.0 |
| | 0.300 | 188.5 |
| | 0.315 | 212.5 |
| Copolymer of Ex. 13 | 0.230 | 188.0 |
| | 0.240 | 200.0 |
| Copolymer of Ex. 15 | 0.250 | 186.0 |
| | 0.260 | 199.0 |
| | 0.270 | 212.0 |
| Copolymer of Compar. Ex. 1 | 0.210 | 186.0 |
| | 0.220 | 221.5 |

In Table 5, the amount of addition of the agent (cement additive) is, in all the cases, the amount of addition on the solid matter basis relative to cement.

TABLE 6

| | Standard amount of addition (weight %/cement) | Flow value (mm) | Viscosity $\mu$ (d) after 2 minutes (mPa·s) | Cement performance coefficient ($\mu(d)/\mu(e)$) |
|---|---|---|---|---|
| Copolymer of Ex. 3 | 0.387 | 200 | 5190 | 0.915 |
| Copolymer of Ex. 4 | 0.278 | 200 | 4700 | 0.829 |
| Copolymer of Ex. 8 | 0.318 | 200 | 4950 | 0.873 |
| Copolymer of Ex. 9 | 0.272 | 200 | 1840 | 0.325 |
| Copolymer of Ex. 11 | 0.307 | 200 | 4690 | 0.827 |
| Copolymer of Ex. 13 | 0.240 | 200 | 4520 | 0.797 |
| Copolymer of Ex. 15 | 0.262 | 200 | 1530 | 0.270 |
| Copolymer of Compar. Ex. 1 | 0.214 | 200 | 14200 | 2.504 |

Viscosity of mixture E after 2 minutes following completion of mixing:
5680 mPa·s
5660 mPa·s
$\mu(e) = 5670$ mPa·s In Table 6, the viscosity $\mu$ (e) of the mixture E after 2 minutes following completion of mixing was 5,670 mPa·s.

When the cement performance coefficients were compared between the copolymer of Comparative Example 1, which did not contain the EO adduct macromer, and the copolymers of the Examples 3, 4, 8, 11, 13 or 15, which contained each EO adduct macromer, the coefficient is 2.0 or higher for the copolymer of Comparative Example 1 while it is very low, namely 1.0 or below, for the copolymers of Examples 3, 4, 8, 11, 13 and 15. As for the copolymer of Example 9, the cement performance coefficient was also very low, namely 0.3 or below.

The specifications for Toyoura silica sand are shown below.
Toyoura silica sand

Standard mesh sieve, 300 microns, retained material not more than 1%
Standard mesh sieve, 106 microns, retained material not less than 95%
Bulk density (kg/L) not less than 1.50

The grain size distribution (materials retained on standard sieves: %) and the chemical composition are as shown in Table 7 and Table 8, respectively.

TABLE 7

| | Particle size distribution (materials retained on standard sieves) % | | | | |
|---|---|---|---|---|---|
| Item | 300 μm | 212 μm | 150 μm | 106 μm | Bulk density (kg/L) |
| Example | 0.1 | 50.0 | 95.7 | 99.5 | 1.52 |

TABLE 8

| | Chemical composition | | | | |
|---|---|---|---|---|---|
| Ig. loss | $SiO_2$ | $Al_2O_3$ | $Fe_2O_3$ | CaO | MgO |
| 0.5 | 92.6 | 3.7 | 0.7 | 0.5 | 0.2 |

Specific gravity = ca 2.64

Calcium Transfer Value

Figure 6:
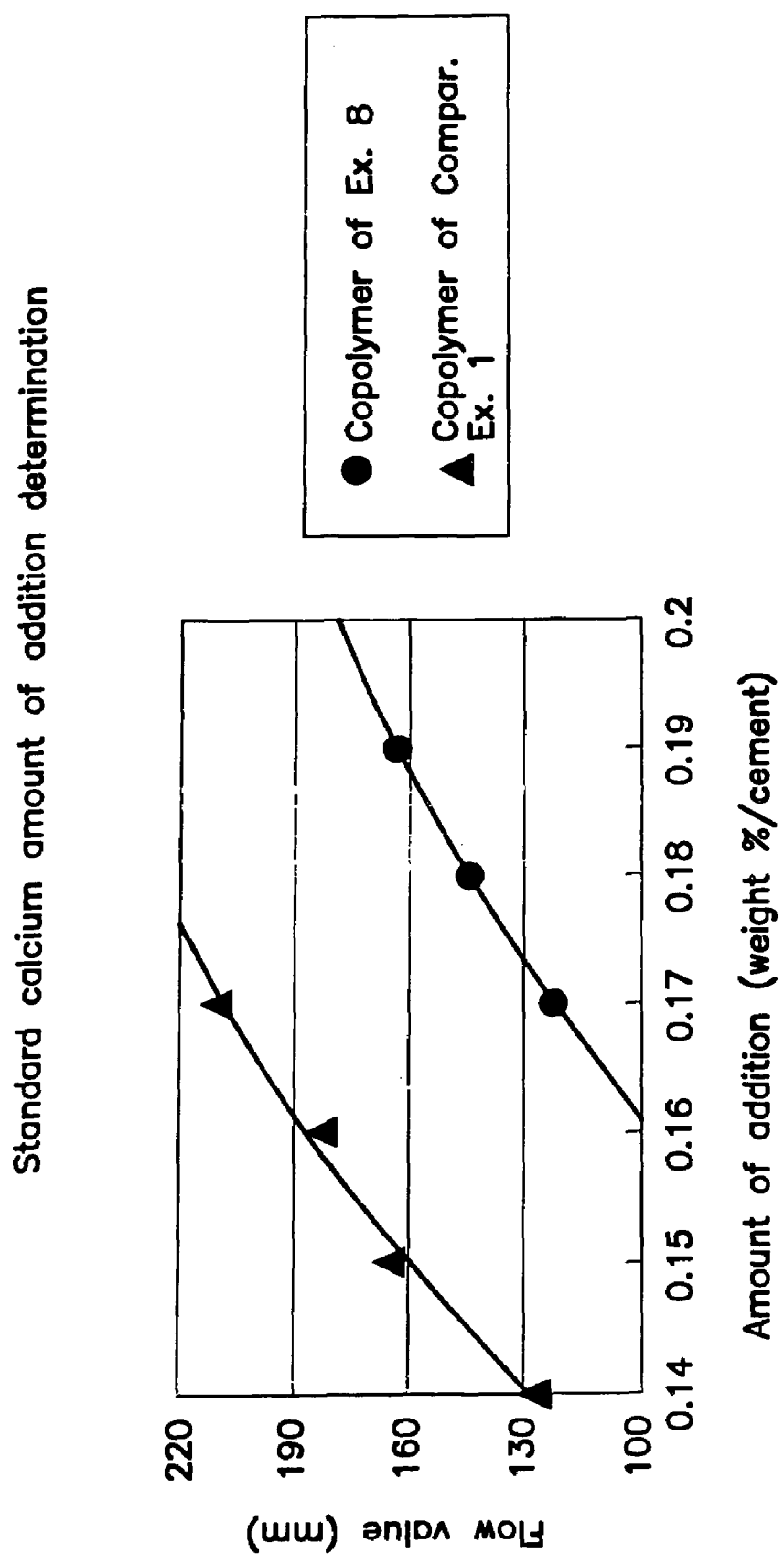
FIG. 6 is a graphic representation of the relationships between the amount of addition of the agent (copolymer) relative to cement as used and the flow value as found in Examples in determining the standard calcium amount of addition according to the calcium transfer value determination method.

Standard calcium amounts of addition and calcium transfer values were determined according to the <calcium tranfer value determination method> mentioned above. The amount of addition of the agents (copolymers) and the flow values found in determining the standard amounts of addition are shown in Table 9, and the relationships between these are shown in FIG. 6. The standard amounts of addition and calcium transfer values are shown in Table 10.

TABLE 9

| Agent | Amount of addition (weight %/cement) | Flow value (mm) |
|---|---|---|
| Copolymer of Ex. 8 | 0.16 | 97 |
| | 0.17 | 122 |
| | 0.18 | 144 |
| | 0.19 | 163 |
| Copolymer of Compar. Ex. 1 | 0.14 | 127 |
| | 0.15 | 165 |
| | 0.16 | 182 |
| | 0.17 | 210 |

In Table 9, the amounts of addition of the agents (cement additives) are all amounts of addition on the solid matter basis relative to cement.

TABLE 10

|  | Standard calcium amount of addition (weight %/cement) | Calcium transfer value (mPa · s) |
|---|---|---|
| Copolymer of Ex. 1 | 0.188 | 625 |
| Copolymer of Compar. Ex. 1 | 0.150 | 1780 |

Results

When the calcium transfer values were compared between the copolymer of Comparative Example 1, which did not contain polyethyleneimine-EO adduct macromer and the copolymer of Example 8, which contained polyethyleneimine-EO adduct macromer, it was 1,780 mPa·s for the copolymer of Comparative Example 1, while it was very low, namely 625 mPa·s for the copolymer of Example 8.

Comparisons were made with regard to the "mortar penetration time after 75 minutes", which is indicative of the viscosity of mortar, and the "cement performance coefficient" and "calcium transfer value", which are indicative of the performance characteristics of the cement additive.

TABLE 11

|  | Mortar penetration time after 75 minutes (sec) | Cement performance coefficient ($\mu(d)/\mu(e)$) | Calcium transfer value (mPa · s) |
|---|---|---|---|
| Copolymer of Ex. 8 | 0.59 | 0.873 | 625 |
| Copolymer of Ex. 9 | — | 0.325 | — |
| Copolymer of Compar. Ex. 1 | 1.65 | 2.504 | 1780 |

When the cement performance coefficients and calcium transfer values were compared between the copolymer of Comparative Example 1, which did not contain EO adduct macromer and the copolymer of Example 8, which contain EO adduct macromer, the cement performance coefficient and calcium transfer value for the copolymer of Comparative Example 1 were 2.0 or higher and 1,780 mPa·s, respectively, while the cement performance coefficient and calcium transfer value for the copolymer of Example 8 were very low, namely 1.0 or below and 625 mPa·s, respectively. When the cement performance coefficient and calcium transfer value were lower, the mortar penetration time after 75 minutes, which is indicative of the easiness of handling of ready mixed concrete, was shorter and ready mixed concrete easier to handle could be obtained. The cement performance coefficient for the copolymer of Example 9 was very low, namely 0.4 or below, and the copolymer could give ready mixed concrete easy to handle.

Analysis of the Polymer of Example 8

Unless otherwise specified, the measurement conditions described herein were employed.

Figure 7:
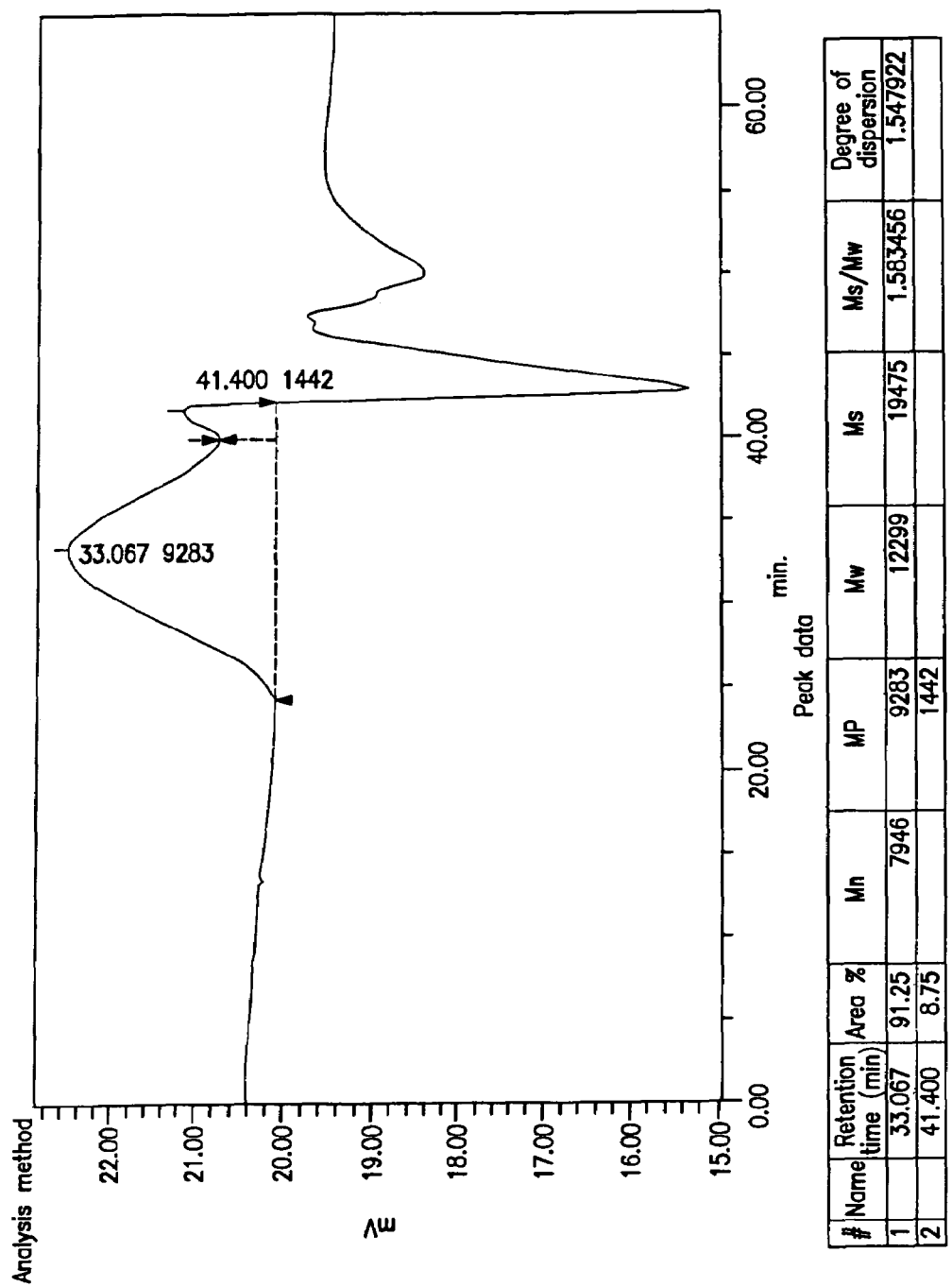
FIG. 7 shows the results of GPC measurement of the unpurified polycarboxylic acid copolymer produced in Example 8 (GPC chart and peak data for the unpurified product).
Figure 8:
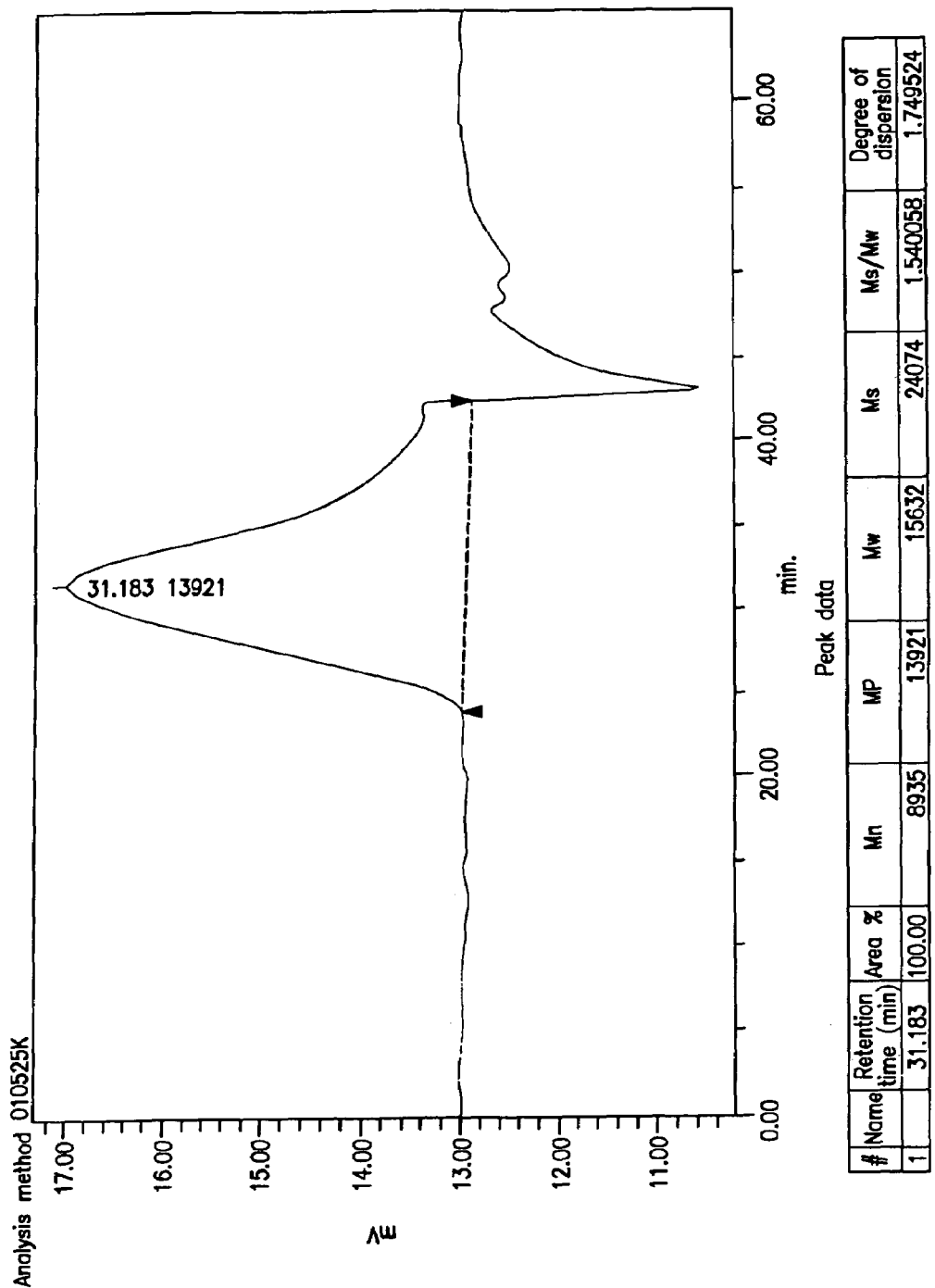
FIG. 8 shows the results of GPC measurement of the polycarboxylic acid copolymer produced in Example 8 and purified thereafter (GPC chart and peak data for the purified product).
Figure 9:
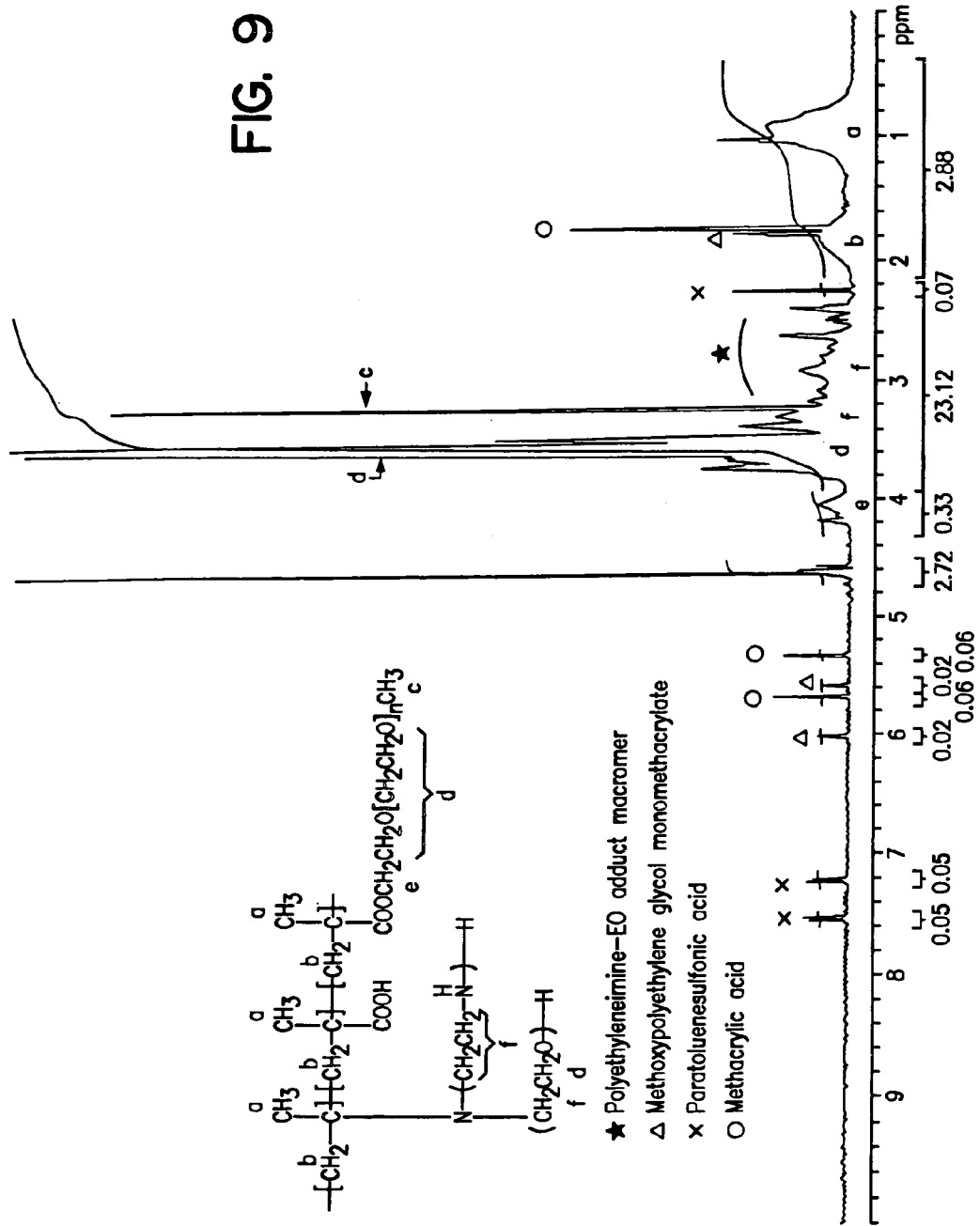
FIG. 9 shows the results of H-NMR measurement of the unpurified polycarboxylic acid copolymer produced in Example 8 (H-NMR chart for the unpurified product).
Figure 10:
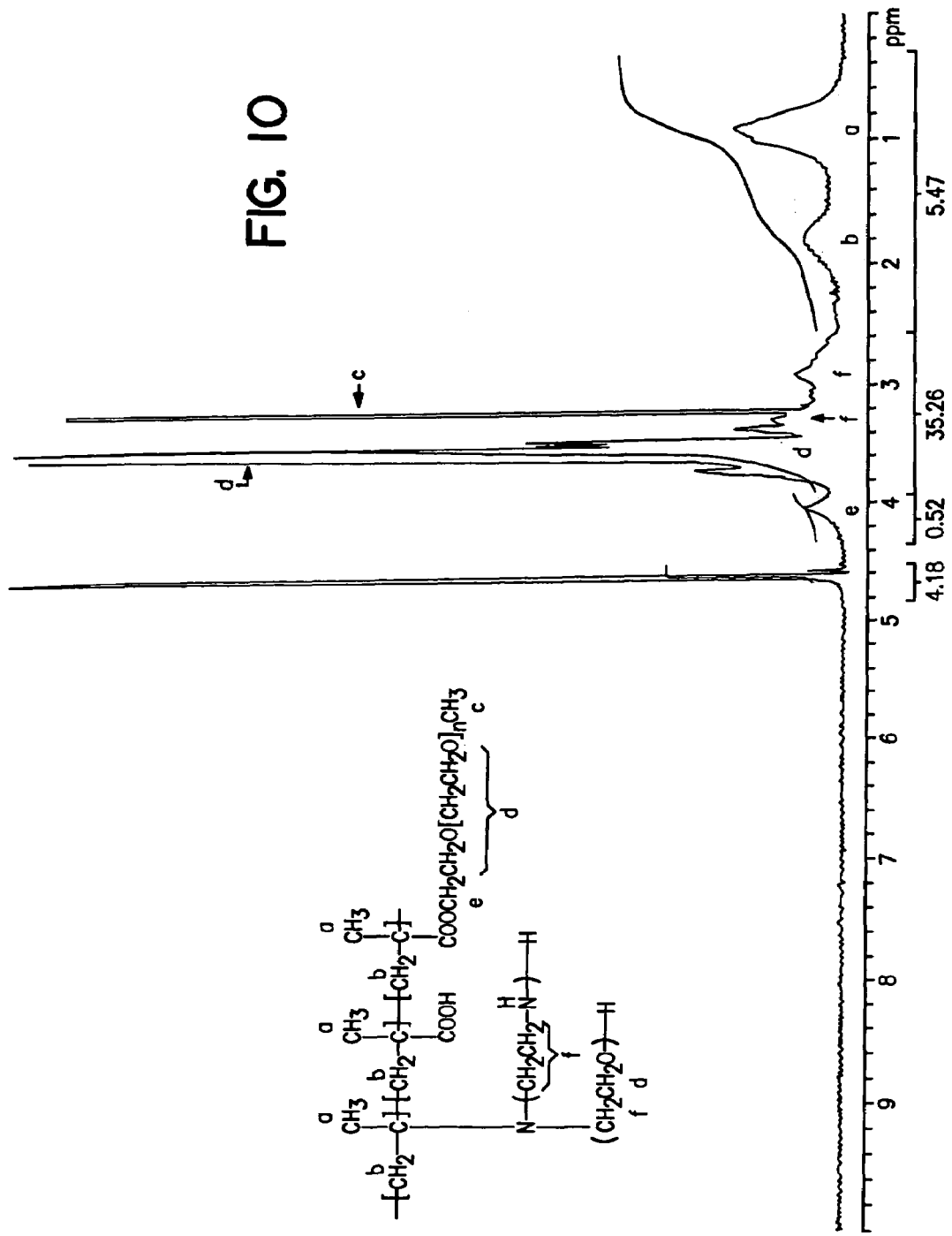
FIG. 10 shows the results of H-NMR measurement of the polycarboxylic acid copolymer produced in Example 8 and purified thereafter (H-NMR chart for the purified product).
Figure 11:
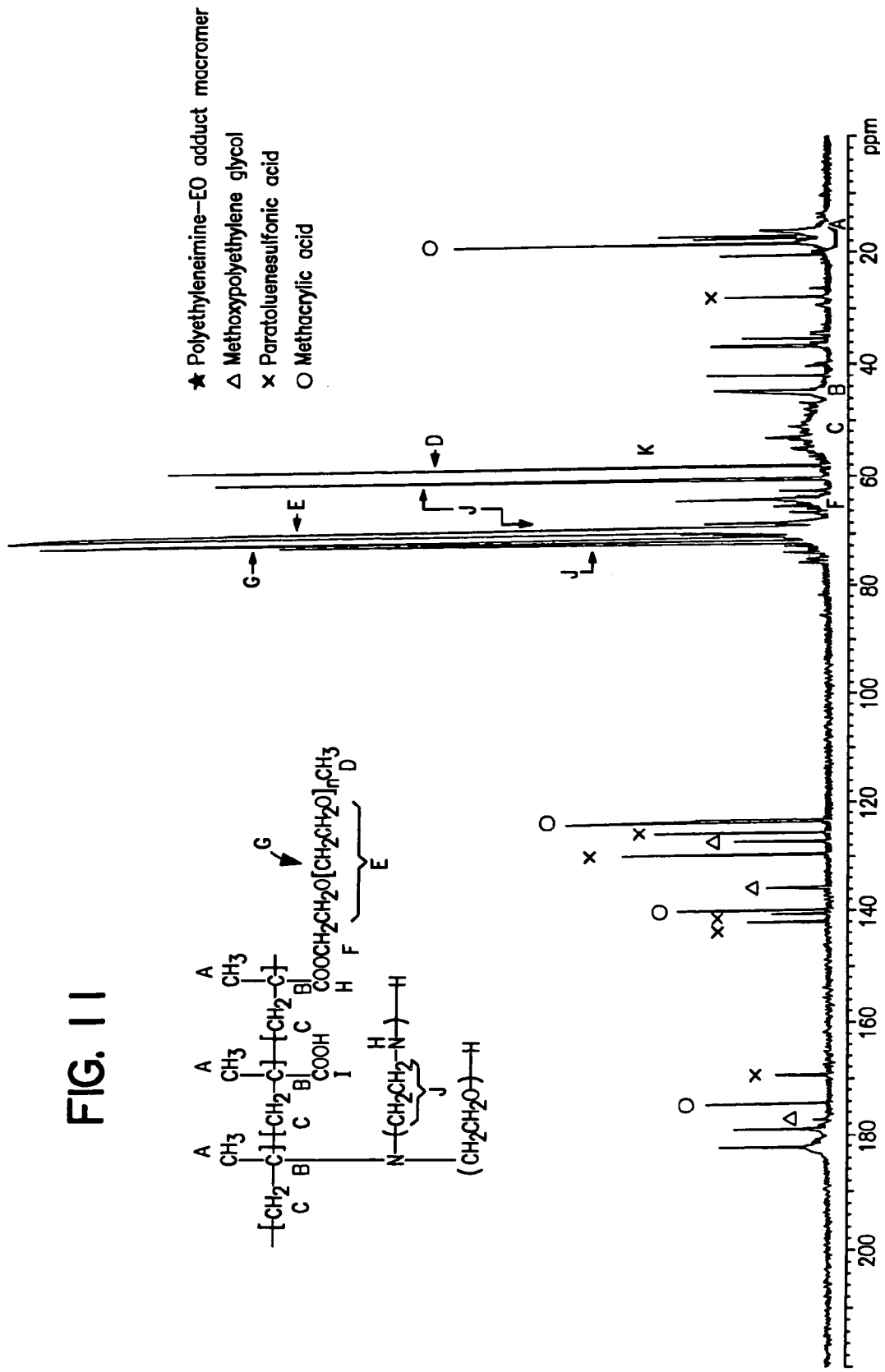
FIG. 11 shows the results of C-NMR measurement of the unpurified polycarboxylic acid copolymer produced in Example 8 (C-NMR chart for the unpurified product).
Figure 12:
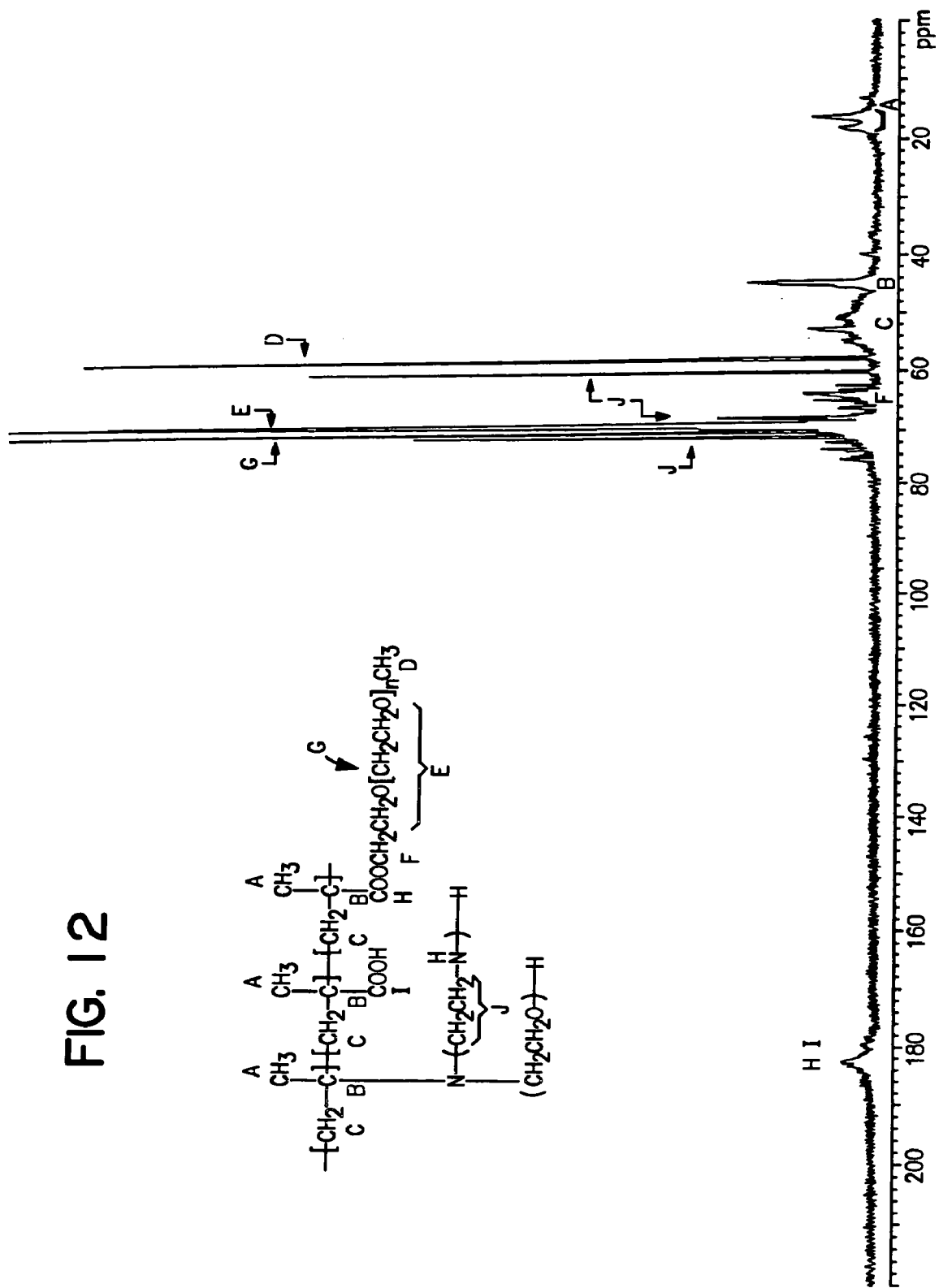
FIG. 12 shows the results of C-NMR measurement of the polycarboxylic acid copolymer produced in Example 8 and purified thereafter (C-NMR chart for the purified product).
Figure 13:
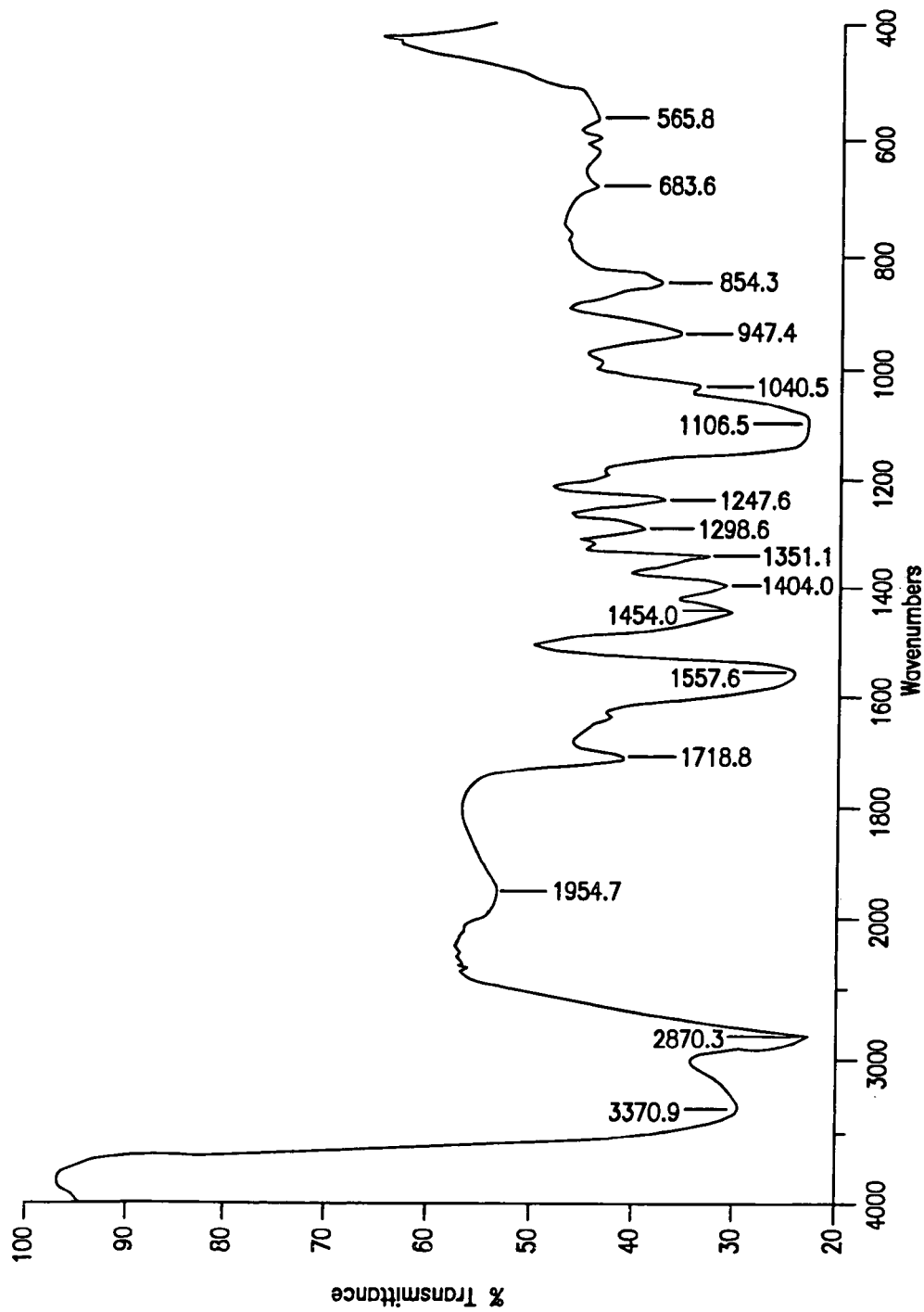
FIG. 13 shows the results of IR measurement of the unpurified polycarboxylic acid copolymer produced in Example 8 (IR chart for the unpurified product).
Figure 14:
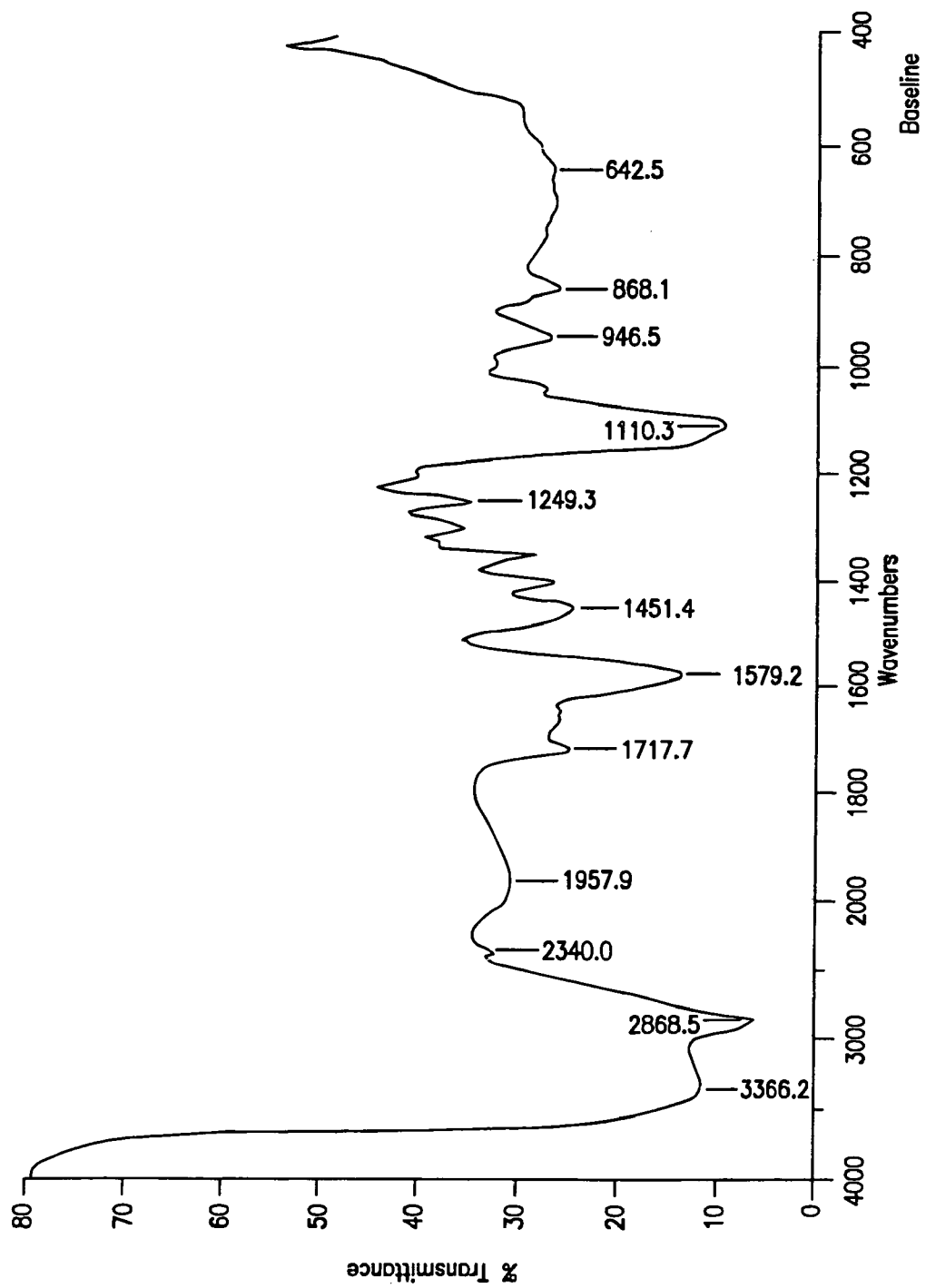
FIG. 14 shows the results of IR measurement of the polycarboxylic acid copolymer produced in Example 8 and purified thereafter (IR chart for the purified product).
Figure 15:
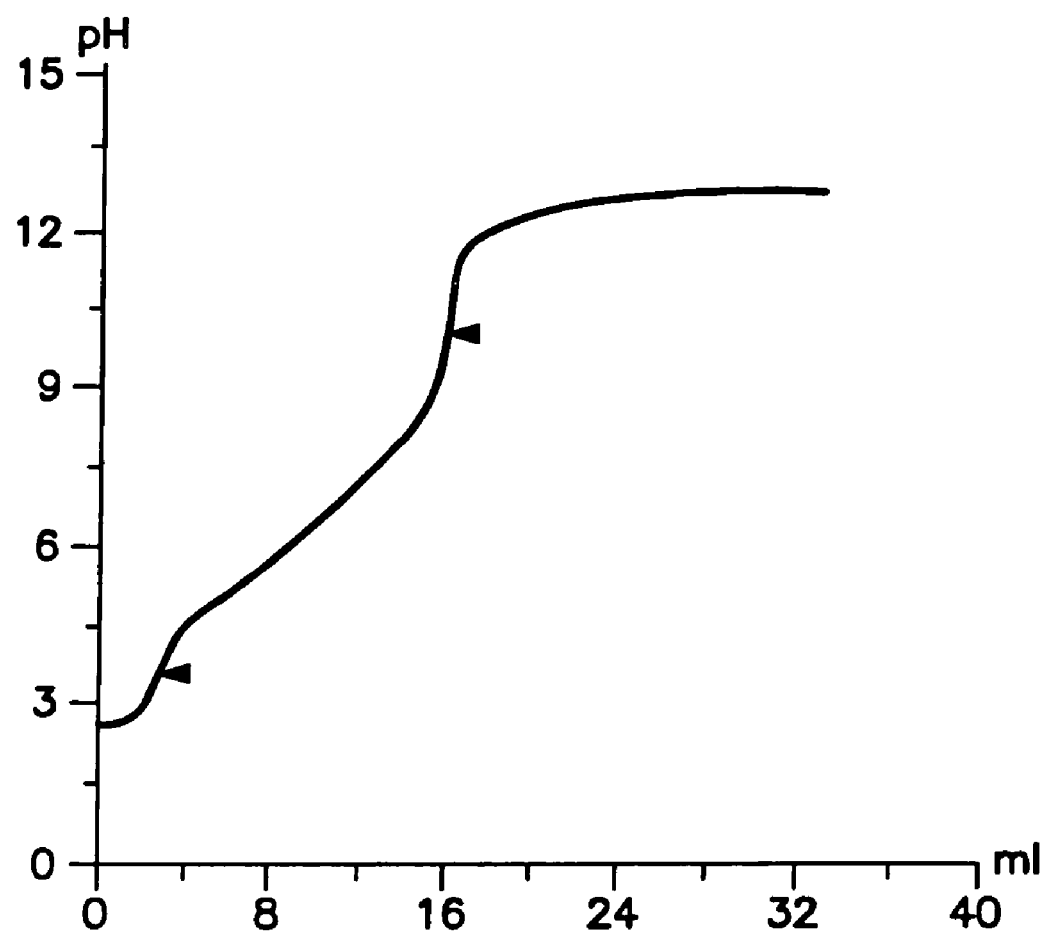
FIG. 15 is the titration curve obtained in that potentiometric titration of the unpurified polycarboxylic acid copolymer produced in Example 8 which was conducted according to the TCAV measurement method (potentiometric titration curve for the unpurified product).
Figure 16:
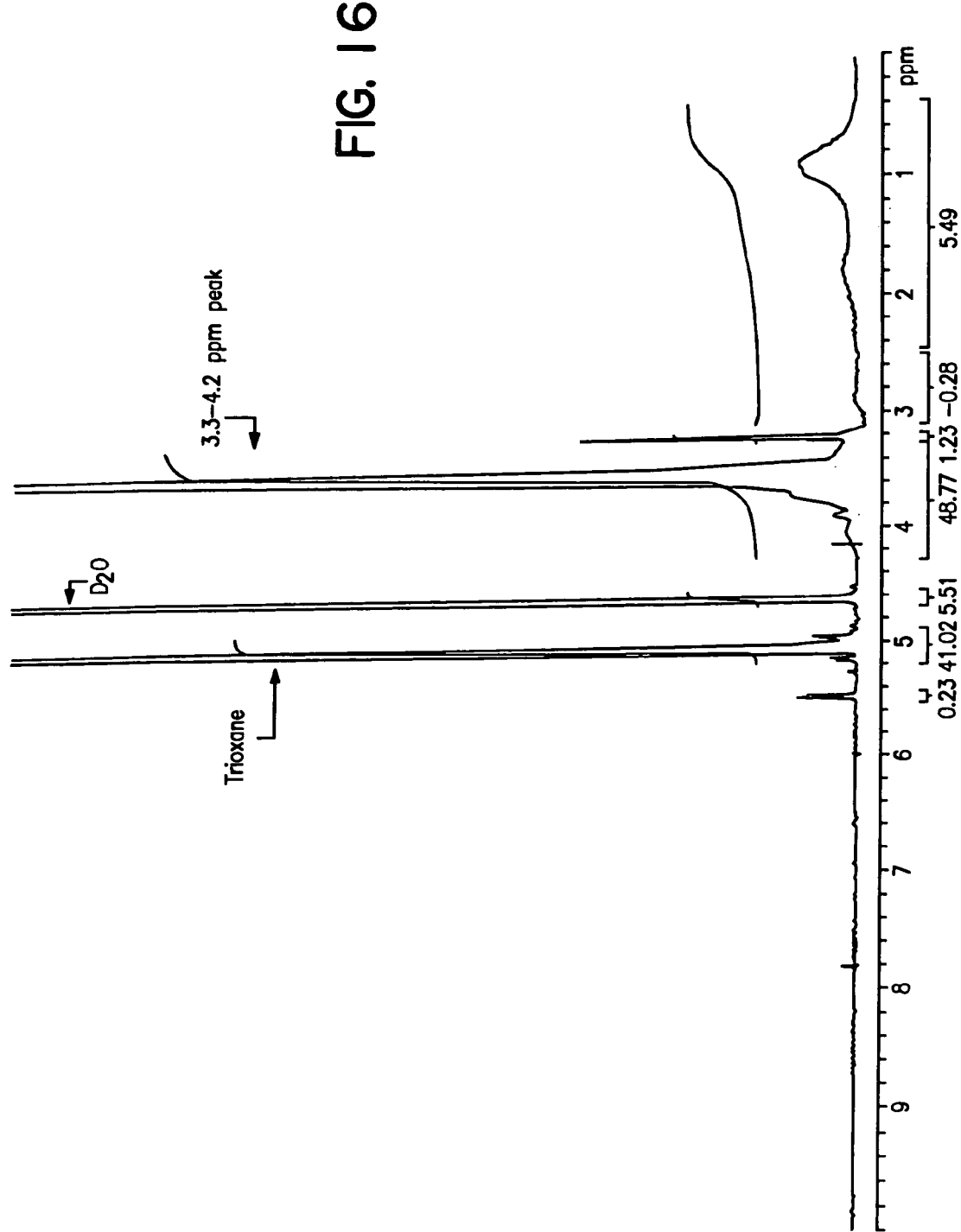
FIG. 16 is the H-NMR chart for the polycarboxylic acid copolymer obtained in Example 8 and purified thereafter when the proton NMR measurement was conducted according to the NMR-PEG content measurement method.
Figure 17:
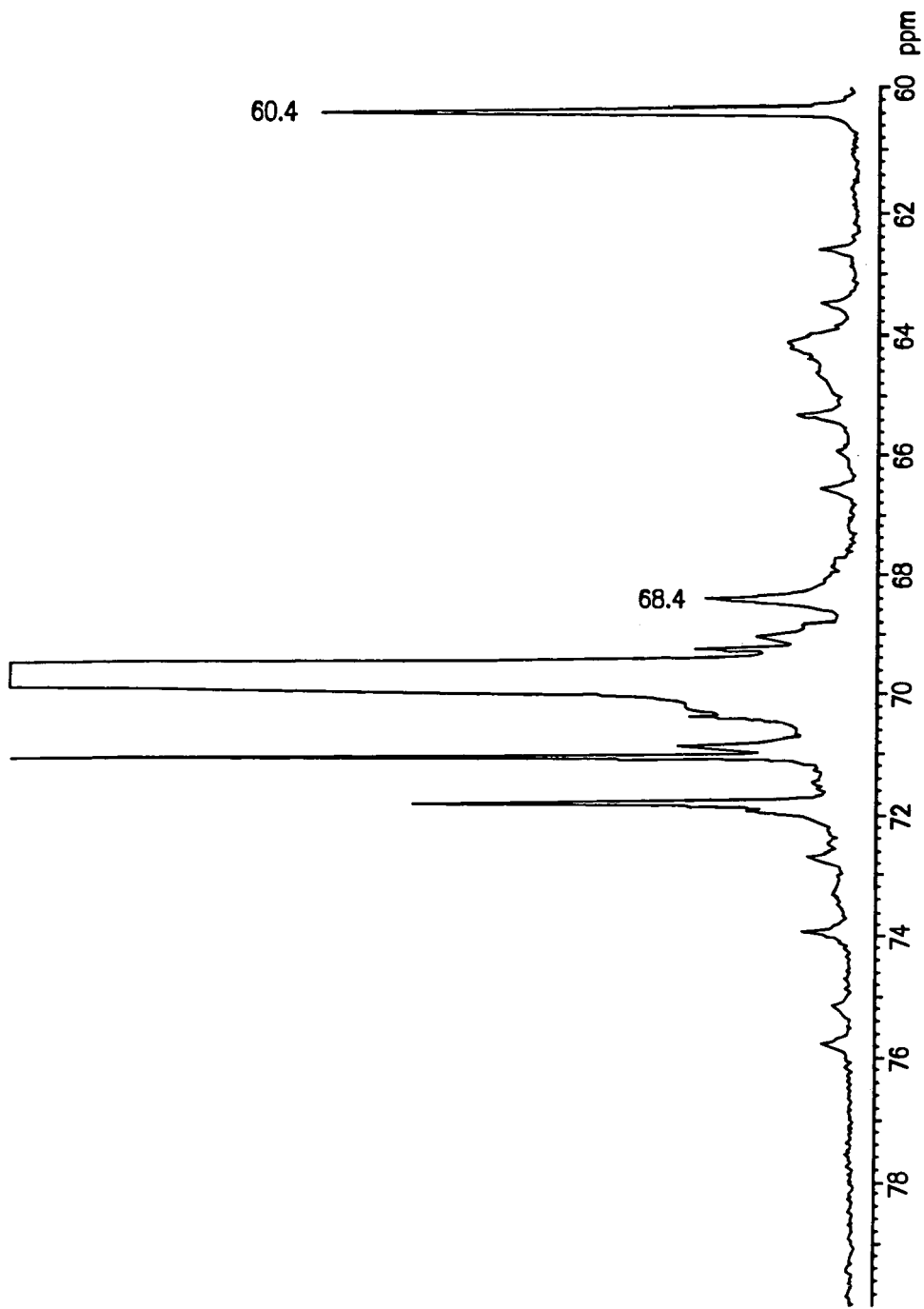
FIG. 17 is an enlargement of the 60 to 80 ppm section of FIG. 12.

The GPC chart, with peak data, for the unpurified polymer is shown in FIG. 7, and the GPC chart, with peak data, for the purified polymer (purified product) is shown in FIG. 8. The H-NMR chart for the unpurified polymer is shown in FIG. 9, and the H-NMR chart for the purified product is shown in FIG. 10. The C-NMR chart for the unpurified polymer is shown in FIG. 11, and the C-NMR chart for the purified product is shown in FIG. 12. The IR chart for the unpurified polymer is shown in FIG. 13, and the IR chart for the purified product is shown in FIG. 14. The potentiometric titration curve used in determining the TCAV of the unpurified polymer is shown in FIG. 15. The H-NMR chart used in determining the NMR-PEG content of the purified product is shown in FIG. 16. An enlargement of the 60 to 80 ppm portion of FIG. 12 is shown in FIG. 17.

<Purification Conditions>

The polymer purification condition 2 described herein was used.

<Elemental Analysis>

Unpurified: H, 8.5% by weight, C, 50.8% by weight, N, 1.1% by weight

Purified product: H, 8.6% by weight, C, 52.3% by weight, N, 1.2% by weight

The nitrogen ascribable to the polyethyleneimine-EO adduct macromer was detected.

<Pyrolysis GC-MASS>

Purified product: Methacrylic acid, hydroxyethyl methacrylate, ethoxyethyl methacrylate, polyethylene glycol (n=2 to 4), 1,4-dioxane, 9-crown-3 ether, 12-crown-4-ether, morpholine, 4-(2-hydroxyethyl)morpholine, 4-(2-aminoethyl)morpholine and the like were detected.

Based on the detection of morpholine and derivatives thereof, it could be confirmed that there existed a functional group resulting from addition of ethylene oxide to polyalkyleneimine. Accordingly, the copolymerization of the polyethyleneimine-EO adduct macromer could be confirmed. Based on the detection of ethoxyethyl methacrylate and polyethylene glycol (n=2 to 4), the copolymerization of polyethylene glycol monomethacrylate could be confirmed.

<GPC>

Unpurified: Mw 12,300, Mn 7,900, Mp 9,300
Purified product: Mw 15,600, Mn 8,900, Mp 13,900

For the purified product, it could be confirmed that the residual monomer peaks had been diminished.

<H-NMR>

From FIG. 9 and FIG. 10, an —N—CH— peak ascribable to the polyethyleneimine-EO adduct macromer could be confirmed.

<C-NMR>

From FIG. 11 and FIG. 12, a peak ascribable to carbon atoms adjacent to the nitrogen atoms in the polyethyleneimine-EO adduct macromer could be confirmed. Any peak ascribable to amide C=O groups was not found. Peaks were confirmed at 60.4 and 68.4 ppm.

<IR>

The results of IR analysis are shown in Table 12. Any stretching vibration ascribable to amide C=O could not be found.

TABLE 12

| Absorption range | | Vibration of bonding |
|---|---|---|
| Unpurified | Purified product | |
| 3371 cm$^{-1}$ | 3366 cm$^{-1}$ | OH and NH stretching vibrations |
| 2870 cm$^{-1}$ | 2869 cm$^{-1}$ | CH stretching vibration |
| 1719 cm$^{-1}$ | 1718 cm$^{-1}$ | C=O stretching vibration (ester) |
| 1568 cm$^{-1}$ | 1579 cm$^{-1}$ | C=O stretching vibration (carboxylic acid salt) |
| 1454 cm$^{-1}$ | 1451 cm$^{-1}$ | CH bending vibration |

TABLE 12-continued

| Absorption range | | |
|---|---|---|
| Unpurified | Purified product | Vibration of bonding |
| 1351 cm$^{-1}$ | — | CH bending vibration |
| 1107 cm$^{-1}$ | 1110 cm$^{-1}$ | C—O—C stretching vibrations (ether) |
| 1040 cm$^{-1}$ | around 1040 cm$^{-1}$ | NH bending vibration |

<TCAV>
Copolymer solid content: 38.5% by weight, amount sampled: 1.1256 g
Amount of sodium hydroxide required from the first inflection point to the second inflection point: 13.161 mL
Initial pH 2.60, pH at the first inflection point 3.50, pH at the second inflection point 9.94
fn: 1.003, TCAV: 65.8 mg KOH/g <NMR-PEG Content>
Weight of the purified product sampled: 0.0441 g
Weight of trioxane sampled: 0.0455 g
Integrated value ratio in NMR, trioxane/peak at 3.3 to 4.2 ppm: 0.8781
Heavy water: 1.2413 g
Calibration curve substance: Polymer A described hereinabove was used.
Weight ratio of —OCH$_2$CH$_2$— in polymer A: 55.180% by weight
Calibration curve constructed: [Y]=0.851[X]–0.0031 [X]: Integrated value ratio in NMR
[Y]: Weight ratio trioxane/polymer A
(NMR-PEG content)=0.0455×0.5518/0.0441/(0.851×0.8781 –0.0031)×100=76.5% by weight Mortar testing was carried out using the following copolymers A, B C and D in combination with the copolymer of Example 8.
Copolymer A: PGM25/sodium methacrylate=80/20% by weight, weight average molecular weight 20,000
Copolymer B: PGM 100/sodium methacrylate=90/10% by weight, weight average molecular weight 50,000
Copolymer C: IPN 50/sodium maleate=85/15% by weight, weight average molecular weight 30,000
Copolymer D: IPN 25/sodium acrylate=90/10% by weight, weight average molecular weight 25,000.
PGM 25: Methoxypolyethylene glycol monomethacrylate (average number of moles of ethylene oxide added 25)
PGM 100: Methoxypolyethylene glycol monomethacrylate (average number of moles of ethylene oxide added 100)
IPN 50: Polyethylene glycol mono(3-methyl-3-butenyl)ether (average number of moles of ethylene oxide added 50)
IPN 25: Polyethylene glycol mono(3-methyl-3-butenyl)ether (average number of moles of ethylene oxide added 25)

Mortar Test
800 g of Taiheiyo ordinary portland cement (trademark, product of Taiheiyo Cement) and 400 g of Toyoura silica sand were subjected to dry mixing in a mortar mixer (trademark: N-50, product of Tesco) at a low rotation speed for 30 seconds. Then, 240 g of water with the copolymer of Example 8 and the above copolymer in a ratio indicated in Table 13 as incorporated therein was added to the dry-mixed mixture of cement and sand, and mortar was prepared by 5 minutes of kneading at a high rotation speed.

The mortar was poured into a hollow cylinder (diameter 55 mm, height 50 mm). Then, the hollow cylinder was lifted up vertically, and the diameter of the mortar spread on the table was measured in two directions and the average value was reported as the flow value. The results are shown in Table 13.

TABLE 13

| | | Copolymer mixing ratio (weight %) | Total amount of copolymers used (weight %/cement) | Flow value (mm) |
|---|---|---|---|---|
| Copolymer of Ex. 8 | Copolymer A | 50/50 | 1.5 | 102 |
| | Copolymer B | 50/50 | 1.5 | 98 |
| | Copolymer C | 50/50 | 1.5 | 95 |
| | Copolymer D | 50/50 | 1.5 | 102 |

In Table 13, the total amount used is the sum of the solid matters in the respective copolymers relative to cement.

It was confirmed that satisfactory flow values could be obtained even in combined use with other polycarboxylic acid polymers.

EXAMPLE 19

A glass-made reaction apparatus equipped with a thermometer, stirrer, dropping device, nitrogen inlet tube and reflux condenser was charged with 185.8 g of deionized water, the reaction system was heated to 65° C. in a nitrogen atmosphere and 3.1 g of 30% aqueous solution of hydrogen peroxide was added. To this, a mixed solution of 530.0 g of an 80% aqueous solution of polyalkylene glycol monoalkenyl ether monomer (herein after referred to as "IPN-25") obtained by adding 25 moles of ethyleneoxide to 3-methyl-3-buten-1-ol, 1.2 g of L-ascorbic acid and 3.9 g of 1-octanethiol and a mixed solution of 71.3 g of acrylic acid and 38.7 g of deionized water were added dropwise over 3 hours. After completion of the dripping, the mixture was matured at 65° C. for the succeeding 1.5 hours to drive the polymerization reaction to completion and the reaction mixture was adjusted to pH=7 with 30% aqueous solution of sodium hydroxide whereby an aqueous solution of a polycarboxylic acid copolymer with a weight average molecular weight of 21,900 was obtained.

EXAMPLE 20

A glass-made reaction apparatus equipped with a thermometer, stirrer, dropping device, nitrogen inlet tube and reflux condenser was charged with 271.4 g of an 80% aqueous solution of IPN-25 and 218.2 g of deionized water, the reaction system was heated to 65° C. in a nitrogen atmosphere and 2.6 g of a 30% aqueous solution of hydrogen peroxide was added. To this, a mixed solution of 271.4 g of an 80% aqueous solution of IPN-25, 1.0 g of L-ascorbic acid and 2.6 g of 1-octanethiol and a mixed solution of 56.9 g of 2-hydroxyethyl acrylate, 19.8 g of acrylic acid and 13.3 g of deionized water were added dropwise over 3 hours. After completion of the dripping, the mixture was matured at 65° C. for the succeeding 1.5 hours to drive the polymerization reaction to completion and the reaction solution was adjusted to pH 7 with a 30% aqueous solution of sodium hydroxide whereby an aqueous solution of a polycarboxylic acid copolymer with a weight average molecular weight of 23,600 was obtained.

COMPARATIVE EXAMPLE 2

A glass-made reaction apparatus equipped with a thermometer, stirrer, dropping device, nitrogen inlet tube and reflux condenser was charged with 185.5 g of deionized water, the reaction system was heated to 65° C. in a nitrogen atmosphere and 3.1 g of a 30% aqueous solution of hydrogen peroxide was added. To this, a mixed solution of 529.9 g of an 80% aqueous solution of IPN-25, 1.2 g of L-ascorbic acid and 4.0 g of 3-mercaptopropionic acid and a mixed solution of 71.3 g of acrylic acid and 38.7 g of deionized water were added dropwise over 3 hours. After completion of the dripping, the mixture was matured at 65° C. for the succeeding 1.5 hours to drive the polymerization reaction to completion and the reaction mixture was adjusted to pH 7 with a 30% aqueous solution of sodium hydroxide whereby an aqueous solution of a polycarboxylic acid copolymer with a weight average molecular weight of 21,500 was obtained.

COMPARATIVE EXAMPLE 3

A glass-made reaction apparatus equipped with a thermometer, stirrer, dropping device, nitrogen inlet tube and reflux condenser was charged with 271.8 g of an 80% aqueous solution of IPN-25 and 218.1 g of deionized water, the reaction system was heated to 65° C. in a nitrogen atmosphere and 2.6 g of a 30% aqueous solution of hydrogen peroxide was added. To this, a mixed solution of 271.8 g of an 80% aqueous solution of IPN-25, 1.0 g of L-ascorbic acid and 1.9 g of 3-mercaptopropionic acid and a mixed solution of 57.0 g of 2-hydroxyethyl acrylate, 19.8 g of acrylic acid and 13.2 g of deionized water were added dropwise over 3 hours. After completion of the dripping, the mixture was matured at 65° C. for the succeeding 1.5 hours to drive the polymerization reaction to completion and the reaction mixture was adjusted to pH 7 with a 30% aqueous solution of sodium hydroxide whereby an aqueous solution of a polycarboxylic acid copolymer with a weight average molecular weight of 23,600 was obtained.

Evaluation Methods (1) Mortar Preparation Method 1,080 g of Taiheiyo ordinary portland cement (trademark, product of Taiheiyo Cement) and 1,350 g of standard sand for cement strength testing (JIS R 5201) were subjected to dry mixing in a mortar mixer (trademark: N-50, product of Tesco) at a low rotation speed for 10 seconds. Then, 324 g of water with the polycarboxylic acid copolymer produced in Example 9 or 19 or in Comparative Example 2 as incorporated therein was added to the dry-mixed mixture of cement and sand, and mortar was prepared by 5 minutes of mixing at a low rotation speed. The polycarboxylic acid copolymer of each Example or the copolymer of the Comparative Example was incorporated in an amount such that the solid matter weight percentage thereof relative to the cement weight (hereinafter referred to as "amount of addition") amounted to the value shown in Table 14. The conditions of dry mixing and mixing in the mortar mixer were made equal in preparing the respective mortar mixes.

(Flow Measurement Method)

After 6.5 minutes from the start of dry mixing, the mortar prepared was poured into a mini slump cone (bottom=100 mm in diameter, top=50 mm in diameter, height=150 mm) placed on a stainless steel plate. Then, 10 minutes after the start of dry mixing, the mini slump cone was lifted up vertically, and the diameters of the mortar spread on the stainless steel plate was measured in two directions perpendicular to each other, and the average value thereof was reported as the flow value (mm).

(Amount of Addition Determination Method)

Flow measurements were carried out while varying the amount of addition, and the amount of addition at which the flow value amounted to 190 to 200 mm was determined. The results are shown in Table 14.

(Paste Preparation Method)

600 g of Taiheiyo ordinary portland cement (trademark, product of Taiheiyo Cement) was placed in a mortar mixer (trademark: N-50, product of Tesco), and dry mixing was carried out at a low rotation speed for 10 seconds. Then, 180 g of water with the polycarboxylic acid copolymer produced in Example 9 or 19 or Comparative Example 2 incorporated therein at the determined amount of addition shown in Table 14 was added to the dry-mixed cement over 5 minutes, and mixing was conducted at a low rotation speed for 1 minute. Then, the rotation was stopped, that portion of cement adhering to the wall surface was scraped down in 30 seconds, the low rotation speed mixing was then further conducted and, after 5 minutes, the mixing was finished. A 400-cc portion of the paste prepared was placed into a disposable beaker with a diameter of 8 cm, and the viscosity was measured using a Helipath rotational viscometer (Brookfield DV-II/spindle A91/10 rotations). On that occasion, the position of the spindle was adjusted at 3.5 cm from the bottom. The measurement was carried out in a room where the temperature was controlled at 23° C. so that the site of viscosity measurement with the paste or the temperature might not exert any influence. After 10 minutes from the start of dry mixing, the measurement with the Helipath rotational viscometer was started, and the change in viscosity was followed with time. The paste viscosity and paste condition after 3 minutes are shown in Table 14.

TABLE 14

| | | Ex. 9 | Ex. 19 | Compar. Ex. 2 |
|---|---|---|---|---|
| Polycarboxylic acid copolymer | Chain transfer agent | 1-Octanethiol | 1-Octanethiol | 3-Mercaptopropionic acid |
| | Weight average molecular weight | 36300 | 21900 | 21500 |
| Mortar | Amount of addition (weight %/cement) | 0.183 | 0.13 | 0.127 |
| | Flow value (mm) | 199 | 192 | 193 |
| Cement paste | Amount of addition (weight %/cement) | 0.183 | 0.13 | 0.127 |
| | Paste viscosity after 3 minutes (mPa · s) | 1120 | 2880 | 8320 |
| | Paste condition | Homogeneous, no floating on water | Homogeneous, no floating on water | Cement sediment on the bottom, a slight degree of floating on water |

When the paste viscosities were compared between the copolymer of Comparative Example 2, which was synthesized using the hydrophilic chain transfer agent 3-mercaptopropionic acid, and the copolymer of Example 9 or 19, which was synthesized using the hydrophobic chain transfer agent 1-octanethiol, it was 8.320 (mPa·s) for the copolymer of Comparative Example 2 while it was very low, namely 1.120-2.880, for the copolymer of Example 9 or 19. This indicated that the copolymers containing a hydrophobic group introduced by using the hydrophobic chain transfer agent gave considerably lower levels of paste viscosity as compared with the copolymer of Comparative Example 2 containing no such hydrophobic group. It was also found that the paste condition is homogeneous as compared with Comparative Example and no floating on water is observed with the copolymers of Examples.

INDUSTRIAL APPLICABILITY

The polycarboxylic acid copolymer of the present invention, which has the above-mentioned constitution, can render cement compositions or the like excellent in water reducing capacity and workability and can improve the strength and durability of the hardening products therefrom, when it is used as a component of cement additives, so that it can suitably be applied to cement paste, mortar, concrete and the like, in particular to ultrahigh strength concrete.

The invention claimed is:

1. A cement additive which comprises the polycarboxylic acid copolymer obtained by a method of producing a polycarboxylic acid copolymer comprising copolymerizing monomer components comprising a monomer (A) having an oxyalkylene group and an unsaturated carboxylic acid monomer (B) using a hydrophobic chain transfer agent, the monomer (A) having an oxyalkylene group is an unsaturated alcohol-polyalkylene glycol adduct represented by the following formula (2);

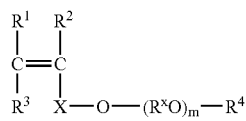

(2)

wherein in the above formula (2), $R^1$ and $R^3$ are the same or different and each represents a hydrogen atom or a methyl group, $R^2$ represents a methyl group, $R^4$ represents a hydrogen atom or a hydrocarbon group containing 1 to 20 carbon atoms, $R^x$ may be the same or different and each represents an alkylene group containing 2 to 18 carbon atoms, and m represents the average number of moles of the oxyalkylene group represented by $R^xO$ as added and is a number of 1 to 300; X represents a divalent alkylene group containing 1 to 5 carbon atoms or a direct bond between the carbon atom and oxygen atom linked by X in the case where the group $R^1R^3C{=}CR^2X{-}$ is a vinyl group;
and the hydrophobic chain transfer agent is a thiol compound having a hydrocarbon group containing not less than 3 carbon atoms.

2. The cement additive according to claim 1, which further comprises an oxyalkylene antifoaming agent.

3. The cement additive according to claim 1, wherein the hydrophobic chain transfer agent is at least one thiol chain transfer agent selected from the group consisting of butanethiol, octanethiol, decanethiol, dodecanethiol, hexadecanethiol, octadecanethiol, cyclohexyl mercaptan, thiophenol, octyl thioglycolate, octyl 2-mercaptopropionate, octyl 3-mercaptopropionate, 2-ethylhexyl mercaptopropionate, 2-mercaptoethyl octanoate, 1,8-dimercapto-3,6-dioxaoctane, decanetrithio 1 and dodecyl mercaptan.

4. The cement additive according to claim 3, which further comprises an oxyalkylene antifoaming agent.

5. The cement additive according to claim 1,
wherein the unsaturated alcohol-polyalkylene glycol adduct is at least one compound selected from the group consisting of vinyl alcohol-alkylene oxide adducts, methallyl alcohol-alkylene oxide adducts, 3-buten-1-ol-alkylene oxide adducts, isoprene alcohol (3-methyl-3-buten-1-ol)-alkylene oxide adducts, 3-methyl-2-buten-1-ol-alkylene oxide adducts, 2-methyl-3-buten-2-ol-alkylene oxide adducts, 2-methyl-2-buten-1-ol-alkylene oxide adducts and 2-methyl-3-buten-1-ol-alkylene oxide adducts.

6. The cement additive according to claim 2,
wherein the unsaturated alcohol-polyalkylene glycol adduct is at least one compound selected from the group consisting of vinyl alcohol-alkylene oxide adducts, methallyl alcohol-alkylene oxide adducts, 3-buten-1-ol-alkylene oxide adducts, isoprene alcohol (3-methyl-3-buten-1-ol)-alkylene oxide adducts, 3-methyl-2-buten-1-ol-alkylene oxide adducts, 2-methyl-3-buten-2-ol-alkylene oxide adducts, 2-methyl-2-buten-1-ol-alkylene oxide adducts and 2-methyl-3-buten-1-ol-alkylene oxide adducts.

7. The cement additive according to claim 3,
wherein the unsaturated alcohol-polyalkylene glycol adduct is at least one compound selected from the group consisting of vinyl alcohol-alkylene oxide adducts, methallyl alcohol-alkylene oxide adducts, 3-buten-1-ol-alkylene oxide adducts, isoprene alcohol (3-methyl-3-buten-1-ol)-alkylene oxide adducts, 3-methyl-2-buten-1-ol-alkylene oxide adducts, 2-methyl-3-buten-2-ol-alkylene oxide adducts, 2-methyl-2-buten-1-ol-alkylene oxide adducts and 2-methyl-3-buten-1-ol-alkylene oxide adducts.

8. The cement additive according to claim 4,
wherein the unsaturated alcohol-polyalkene glycol adduct is at least one compound selected from the group consisting of vinyl alcohol-alkylene oxide adducts, methallyl alcohol-alkylene oxide adducts, 3-buten-1-ol-alkylene oxide adducts, isoprene alcohol (3-methyl-3-buten-1-ol)-alkylene oxide adducts, 3-methyl-2-buten-1-ol-alkylene oxide adducts, 2-methyl-3-buten-2-ol-alkylene oxide adducts, 2-methyl-2-buten-1-ol-alkylene oxide adducts and 2-methyl-3-buten-3-buten-1-ol-alkylene oxide adducts.

9. The cement additive according to claim 1,
wherein the unsaturated alcohol-polyalkylene glycol adduct is a 3-methyl-3-buten-1-ol-alkylene oxide adduct.

10. The cement additive according to claim 2,
wherein the unsaturated alcohol-polyalkylene glycol adduct is a 3-methyl-3-buten-1-ol-alkylene oxide adduct.

11. The cement additive according to claim 3,
wherein the unsaturated alcohol-polyalkylene glycol adduct is a 3-methyl-3-buten-1-ol-alkylene oxide adduct.

12. The cement additive according to claim 4,
wherein the unsaturated alcohol-polyalkylene glycol adduct is a 3-methyl-3-buten-1-ol-alkylene oxide adduct.

* * * * *